US010414000B2

(12) United States Patent
Tsukui

(10) Patent No.: US 10,414,000 B2
(45) Date of Patent: Sep. 17, 2019

(54) LASER WELDING APPARATUS

(71) Applicant: TOYOTA JIDOSHA KABUSHIKI KAISHA, Toyota-shi, Aichi-ken (JP)

(72) Inventor: Akira Tsukui, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 380 days.

(21) Appl. No.: 15/385,086

(22) Filed: Dec. 20, 2016

(65) Prior Publication Data

US 2017/0182599 A1 Jun. 29, 2017

(30) Foreign Application Priority Data

Dec. 24, 2015 (JP) ................................. 2015-252139

(51) Int. Cl.
| | | |
|---|---|---|
| *B23K 26/70* | (2014.01) | |
| *B23K 26/082* | (2014.01) | |
| *B23K 26/24* | (2014.01) | |
| *B23K 26/073* | (2006.01) | |
| *B23K 26/28* | (2014.01) | |
| *B23K 101/38* | (2006.01) | |

(52) U.S. Cl.
CPC .......... *B23K 26/704* (2015.10); *B23K 26/073* (2013.01); *B23K 26/082* (2015.10); *B23K 26/28* (2013.01); *B23K 2101/38* (2018.08)

(58) Field of Classification Search
CPC ......... B23K 26/70; B23K 26/08; B23K 26/24
USPC ............ 219/121.63, 121.64, 121.61, 121.62, 219/121.83
See application file for complete search history.

(56) References Cited

U.S. PATENT DOCUMENTS

| | | | | |
|---|---|---|---|---|
| 4,655,590 A | * | 4/1987 | Aagano ................ | G02B 27/108 |
| | | | | 219/121.76 |
| 2005/0067681 A1 | * | 3/2005 | De Villeneuve ........ | H01L 23/04 |
| | | | | 257/678 |
| 2011/0284508 A1 | * | 11/2011 | Miura .................. | B23K 31/125 |
| | | | | 219/121.64 |
| 2015/0260985 A1 | | 9/2015 | Kitamura et al. | |

(Continued)

FOREIGN PATENT DOCUMENTS

| | | |
|---|---|---|
| JP | 2012-110905 A | 6/2012 |
| JP | 2013-220462 A | 10/2013 |
| JP | 2014-057986 A | 4/2014 |

(Continued)

*Primary Examiner* — Samuel M Heinrich
(74) *Attorney, Agent, or Firm* — Sughrue Mion, PLLC

(57) ABSTRACT

A laser welding apparatus according to the present invention includes a diffractive optical element, an incident-point changing unit, and a controller. The diffractive optical element includes a first region where there is formed a diffraction grating that radiates a radiated beam having a first distribution profile of a power density that is different from a distribution profile of a power density of the incident beam. The diffractive optical element further includes a second region that has a surface profile different from a surface profile of the first region, and radiates a radiated beam having a second distribution profile of the power density that is different from the first distribution profile of the power density. The controller carries out a joining control to move at least one point in the incident point across a boundary between the first region and the second region during the emission of the laser beam.

23 Claims, 29 Drawing Sheets

(56) References Cited

U.S. PATENT DOCUMENTS

2015/0360320 A1  12/2015  Yoshida et al.

FOREIGN PATENT DOCUMENTS

| JP | 2015-174100 A | 10/2015 |
| JP | 2015-208761 A | 11/2015 |
| JP | 2016-002562 A | 1/2016 |

* cited by examiner

FIG. 25

LASER WELDING APPARATUS

INCORPORATION BY REFERENCE

The disclosure of Japanese Patent Application No. 2015-252139 filed on Dec. 24, 2015 including the specification, drawings and abstract is incorporated herein by reference in its entirety.

BACKGROUND OF THE INVENTION

1. Field of the Invention

The present invention relates to a laser welding apparatus. More specifically, the present invention relates to a laser welding apparatus to carry out laser welding with a laser beam radiated after the laser beam enters a diffractive optical element (DOE).

2. Description of Related Art

Laser welding using a laser beam is carried out for joining plural members into a single welded structural body. An example of productions joined by such laser welding may include batteries. In general, batteries are configured to include electrode bodies formed of positive and negative electrode plates inside cases. In a producing process of such batteries, after the electrode bodies are housed inside case bodies from openings thereof, a joining step to seal the openings of the case bodies with sealing plates, and then joining the case body and the sealing plates together by laser welding is carried out in some cases. In the joining step, the laser welding is carried out along welding lines at position where the openings of the case bodies and side surfaces of the sealing plates face each other.

For example, Japanese Patent Application Publication No. 2013-220462 describes a technique to join a case body and a sealing plate together by irradiating a welding line between the case body and the sealing plate with a low-density laser beam having a lower power density and high-density laser beams each having a higher power density than the low-density laser beam. In JP 2013-220462 A, while both the case body and the sealing plate are broadly irradiated with the low-density laser beam, the high-density laser beams are radiated such that spots of the high-density laser beams are located within a spot of the low-density laser beam. The aforementioned low-density laser beam and high-density laser beams are embodied by beam-formation of a single laser beam with a DOE. After the temperature is increased to some extent by the low-density laser beam, the high-density laser beams can be applied. Through this configuration, it is possible to prevent rapid increase in temperature at an irradiated portion with the high-density laser beams, thereby preventing bumping or the like at the welded portion. Subsequently, the low-density laser beam is applied to the irradiated portion irradiated with the high-density laser beams. Through this configuration, it is possible to prevent rapid decrease in temperature at the irradiated portion with the high-density laser beam, thus suppressing generation of cracks or the like. It is described that, accordingly, it is possible to suppress generation of welding defects.

In laser welding, it is preferable to carry out a more flexible control depending on the condition of joint target portions, or in order to form a desired joined portion in a shorter time.

SUMMARY OF THE INVENTION

The present invention provides a laser welding apparatus capable of carrying out laser welding through a more flexible control.

A laser welding apparatus is a laser welding apparatus that irradiates a welding point with a laser beam so as to form a joined portion where joint target members are joined together at an irradiation position with the laser beam, and the laser welding apparatus includes: an emitter that emits the laser beam, the laser beam emitted from the emitter being defined as an incident beam; a diffractive optical element that radiates a radiated beam toward the irradiation position from an incident point of the incident beam; an incident-point changing unit that changes a position of the incident point; and a controller that controls the emitter and the incident-point changing unit, wherein the diffractive optical element includes a first region and a second region that are adjacently disposed, the first region is a region in which a diffraction grating is formed, the diffraction grating radiating the radiated beam having a first distribution profile of a power density that is different from a distribution profile of a power density of the incident beam, the second region is a region that has a surface profile different from a surface profile of the first region, and radiates the radiated beam having a second distribution profile of a power density that is different from the first distribution profile of the power density, and the controller carries out a joining control to control the incident-point changing unit to move at least one point in the incident point across a boundary between the first region and the second region during the emission of the laser beam from the emitter.

The laser welding apparatus is capable of switching the irradiation pattern formed at the irradiation position to the irradiation pattern having a different distribution profile of the power density during the emission of the laser beam. It is possible to set the power density at any part in the irradiation position to be at any level without changing the output of the laser beam or the like. Through this, it is possible to carry out the laser welding through a more flexible control, and form the joined portion in a shorter time at the same time.

In the aforementioned laser welding apparatus, the second region may be a region in which no diffraction grating is formed. This is because it is possible to produce the diffractive optical element capable of forming the irradiation pattern having various distribution profiles of the power densities at a more inexpensive cost by reducing the region where the diffraction grating is formed. In addition, in the area where no diffraction grating is formed, it is possible to irradiate the irradiation position with the incident beam emitted from the emitter and entering the diffractive optical element without changing the distribution profile of the power density; therefore, it is possible to set the power density at the concerned position to be the maximum.

In the aforementioned laser welding apparatus, the first region may be a region that radiates the radiated beam including parts having a maximum power density in the first distribution profile of the power density within an outer edge region different from a central region that is a part having a maximum power density in the second distribution profile of the power density. This is because it is possible to selectively use the irradiation pattern attaining a greater molten amount of the outer edge region than molten amount of the central region, and the irradiation pattern attaining a greater molten amount of the central region than molten amount of the outer edge region.

In the aforementioned laser welding apparatus, in the joining control, it may be configured that the controller controls the welding point at the irradiation position to be located within the central region, controls the incident-point changing unit to set the position of the incident point to be closer to the second region than the position of the incident point before a predetermined initial time passes is after the initial time passes from a start of emission of the laser beam from the emitter, and controls the irradiation position not to move relative to the joint target members during the emission of the laser beam from the emitter. In the spot welding, it is possible to suppress generation of defects due to laser-passing caused by the laser beam transmitted through the gap at the welding point of the joint target members, and applied to the member disposed on the opposite side to the laser beam irradiation side of the joint target members.

In the aforementioned laser welding apparatus, the laser welding apparatus may further include a moving unit that moves at least one of the irradiation position and the joint target members relative to the other thereof, wherein in the joining control, the controller may carry out a scan control to control the moving unit to move the irradiation position such that a welding line formed by plural continuous welding points extends through the central region. This is because, in the laser welding carried out along the welding line, it is possible to form the irradiation pattern having various distribution profiles of the power densities at any irradiation position on the welding line.

In the aforementioned laser welding apparatus, in the joining control, the controller may control the incident-point changing unit to set the position of the incident point to be closer to the second region than the position of the incident point before a predetermined initial time passes is after the initial time passes from a start of emission of the laser beam from the emitter. Since no molten portion is formed at the start time of the joining control, a gap is likely to be present at a position of the welding point of the joint target members located at the start position. Hence, it is possible to suppress generation of defects caused by the laser-passing through the gap at the above start position.

In the aforementioned laser welding apparatus, the second region may be a region where a central spot is formed in the central region by the radiated beam, the first region may be a region where a first outer edge spot and a second outer edge spot are formed in the outer edge region by the radiated beam, the first outer edge spot and the second outer edge spot respectively forming apexes of a triangle together with the central spot, and in the scan control, the controller may control such that an intermediate part between the first outer edge spot and the second outer edge spot, and the central spot are brought to pass through the welding point on the welding line in the order of the intermediate part between the first outer edge spot and the second outer edge spot, and the central spot. This is because it is possible to carry out the scan control while forming the molten portion by the first outer edge spot and the second outer edge spot, and securely charging the gap frontward of the central spot with this molten portion. Through this, it is possible to suppress the laser-passing in the scan control.

In the aforementioned laser welding apparatus, the second region may be a region where the central spot is formed in the central region by the radiated beam, the first region may be a region where the four outer edge spots that respectively form apexes of a rectangle surrounding the central spot are formed in the outer edge region by the radiated beam, and in the scan control, the controller may control such that an intermediate part between a first outer edge spot and a second outer edge spot that are adjacently arranged among the outer edge spots, the central spot, and an intermediate part between a third outer edge spot and a fourth outer edge spot that are the outer edge spots other than the first outer edge spot and the second outer edge spot are respectively brought to pass through the welding point on the welding line in the order of the intermediate part between the first outer edge spot and the second outer edge spot that are adjacently arranged among the outer edge spots, the central spot, and the intermediate part between the third outer edge spot and the fourth outer edge spot that are the outer edge spots other than the first outer edge spot and the second outer edge spot. This is because it is possible to carry out the scan control while forming the molten portion by the first outer edge spot and the second outer edge spot, and securely charging the gap frontward of the central spot with the molten portion. Through this, it is possible to suppress the laser-passing in the scan control. In addition, it is possible to suppress, by the third outer edge spot and the fourth outer edge spot, rapid decrease in temperature of the molten portion formed by the passing of the central spot. Through this, it is possible to suppress cracks or the like caused by the rapid decrease in temperature of the molten portion.

In the aforementioned laser welding apparatus, the second region may be a region where the central spot is formed in the central region by the radiated beam, the first region may be a region where a first outer edge spot and a second outer edge spot located at a different position from that of the first outer edge spot are formed in the outer edge region by the radiated beam, and in the scan control, the controller may control the central spot to move along the welding line, may control the first outer edge spot to move frontward of the central spot along a first outer edge track that is a track parallel with the welding line, and may control the second outer edge spot to move rearward of the central spot along a second outer edge track that is a track parallel with the welding line. This is because it is possible to carry out the scan control while forming the molten portion by the first outer edge spot, and securely charging the gap frontward of the central spot with this molten portion. Through this, it is possible to suppress the laser-passing in the scan control. In addition, it is possible to suppress, by the second outer edge spot, rapid decrease in temperature of the molten portion formed by the passing of the central spot. Through this, it is possible to suppress cracks or the like caused by the rapid decrease in temperature of the molten portion.

In the aforementioned laser welding apparatus, before the joining control is carried out, the controller may carry out a tentative-fixing control to irradiate a part of each tentative-fixed position on the welding line with the laser beam so as to form a tentative-fixed portion at the tentative-fixed position, and in the tentative-fixing control, the controller may control the incident-point changing unit to set the position of the incident point to be within the first region. This is because it is possible to suppress deviation between the joint target members during the joint control with the formation of the tentative-fixed portion, thereby forming the proper joined portion through the joining control. With respect to the formation of the tentative-fixed portions, it is possible to suppress defects caused by the laser-passing by using the laser welding apparatus to form the joined portion.

In the aforementioned laser welding apparatus, the laser welding apparatus may further include a gap-outputting unit that detects a gap at the welding point on the welding line formed by bringing the joint target members to face each other and outputs the detection of the gap, wherein in the joining control, when the gap at the welding point detected by the gap-outputting unit is equal to a predetermined gap threshold value or more, the controller may carry out a laser control to control the incident-point changing unit to set the position of the incident point to be closer to the first region than the position of the incident point is when the outputted gap is less than the gap threshold value. The joined portion tends to be properly formed by setting the power density in the outer edge region to be greater, and setting the power density in the central region to be smaller as the gap is greater. On the other hand, the joined portion tends to be properly formed by setting the power density in the outer edge region to be smaller, and setting the power density in the central region to be greater as the gap is smaller. Specifically, it is possible to properly form the joined portion by using the irradiation pattern having the distribution profile of the power density defined depending on the dimension of the gap.

In the aforementioned laser welding apparatus, when the welding line is in a rectangular shape as a whole, the controller may start the scan control from a start position, the start position being the welding point located in a longer side of the welding line, and after the start, the controller may carry out the scan control along the welding line by one round to the start position. Deformation of the joint target members tends to be smaller by starting formation of the joined portion from the welding point located in a longer side of the welding line rather than by starting formation of the joined portion from the welding point located in a shorter side of the welding line. Through this, it is possible to properly form the joined portion while suppressing deformation of the joint target members.

In the aforementioned laser welding apparatus, the emitter may adjust a laser output value that is an output value of the emitted laser beam during the emission of the laser beam. This is because it is possible to carry out the laser welding while adjusting a maximum value and a minimum value of the power density in the irradiation pattern.

According to one aspect of the present invention, it is possible to provide the laser welding apparatus capable of carrying out the laser welding through a more flexible control.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 25 is a drawing showing irradiation patterns according to Variations;

DETAILED DESCRIPTION OF EMBODIMENTS

Hereinafter, preferable embodiments for embodying the present invention will be described in details with reference to drawings.

First Embodiment

Figure 1:
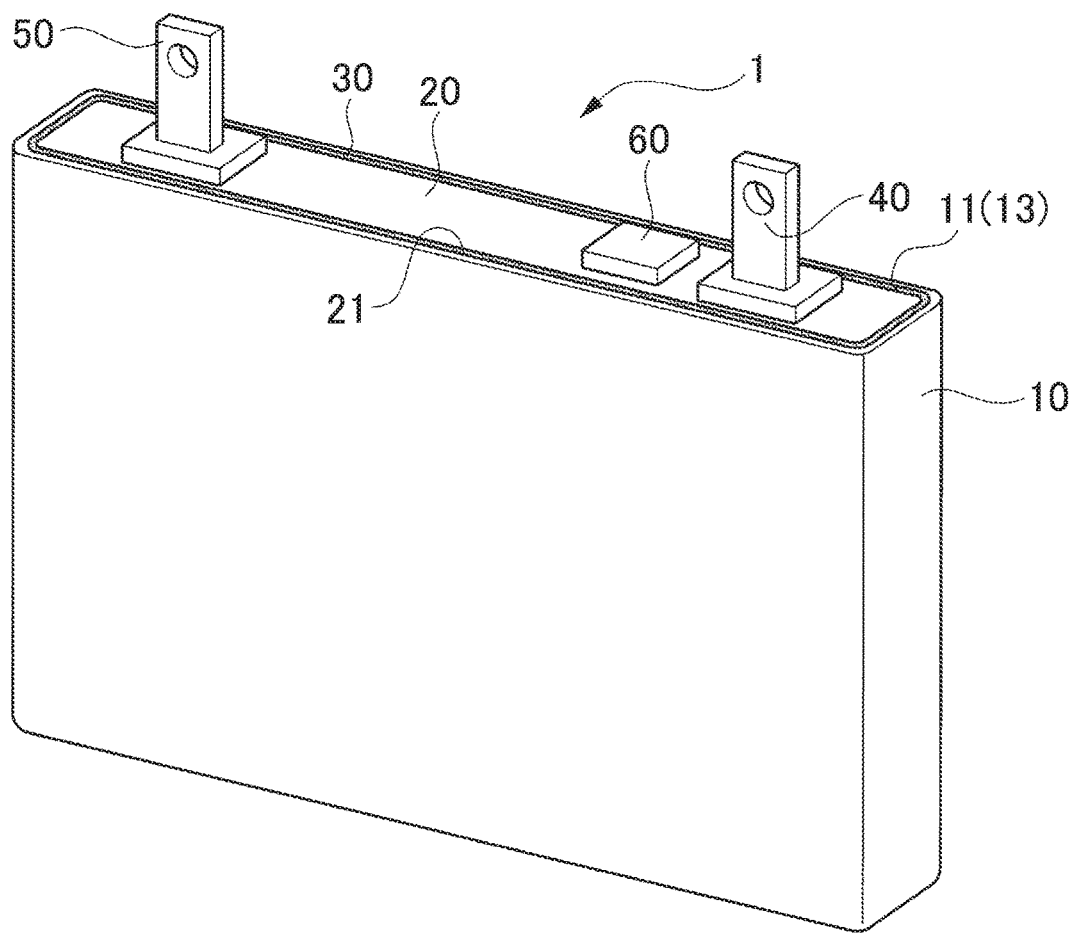
FIG. 1 is a perspective view of a battery according to a first embodiment.

FIG. 1 shows a perspective view of an appearance of a battery 1 that is a joining target of laser welding according to the present embodiment. As shown in FIG. 1, the battery 1 has an appearance in a flat form. As shown in FIG. 1, the battery 1 includes a positive electrode terminal 40 and a negative electrode terminal 50. The battery 1 is a secondary battery rechargeable via the positive electrode terminal 40 and the negative electrode terminal 50. As the battery 1, lithium ion secondary batteries and nickel-hydrogen storage cells may be exemplified.

The battery 1 includes a case body 10. For the purpose of recharging, an electrode body formed of positive and negative electrode plates, an electrolytic solution, and the like are housed inside the case body 10. An opening 11 used for housing the electrode body inside the case body is formed on an upper part of the case body 10. The opening 11 of the case body 10 is sealed by a sealing plate 20 in FIG. 1. In the present embodiment, materials of the case body 10 and the sealing plate 20 are both aluminum.

The positive electrode terminal 40 and the negative electrode terminal 50 are provided to the sealing plate 20. The sealing plate 20 is provided with a solution-filler-port sealing member 60 to seal a solution-filler port through which the inside is charged with the electrolytic solution. The solution-filler-port sealing member 60 is attached after the inside of the case body 10 is charged with the electrolytic solution from the solution-filler port.

In the battery 1 of the present embodiment, the case body 10 and the sealing plate 20 are joined together by the laser welding. Specifically, the case body 10 and the sealing plate 20 are joined together by fitting the sealing plate 20 in the opening 11 of the case body 10, and carrying out the laser welding to irradiate a welding line between the case body 10 and the sealing plate 20 with the laser beam.

A joined portion 30 is formed on the welding line between the case body 10 and the sealing plate 20 by one round by the laser welding. Specifically, in the apparent view of the battery 1 as shown in FIG. 1, the opening 11 (inner wall surface 13) of the case body 10 and a side surface 21 of the sealing plate 20 are indicated by references for convenience of explanation. However, in actual, the opening 11 (inner wall surface 13) of the case body 10 and the side surface 21 of the sealing plate 20 are not present on an outer side of the battery 1 because they are melted and mixed together in the vicinity of the opening 11 and the side surface 21 into the joined portion 30.

Figure 2:
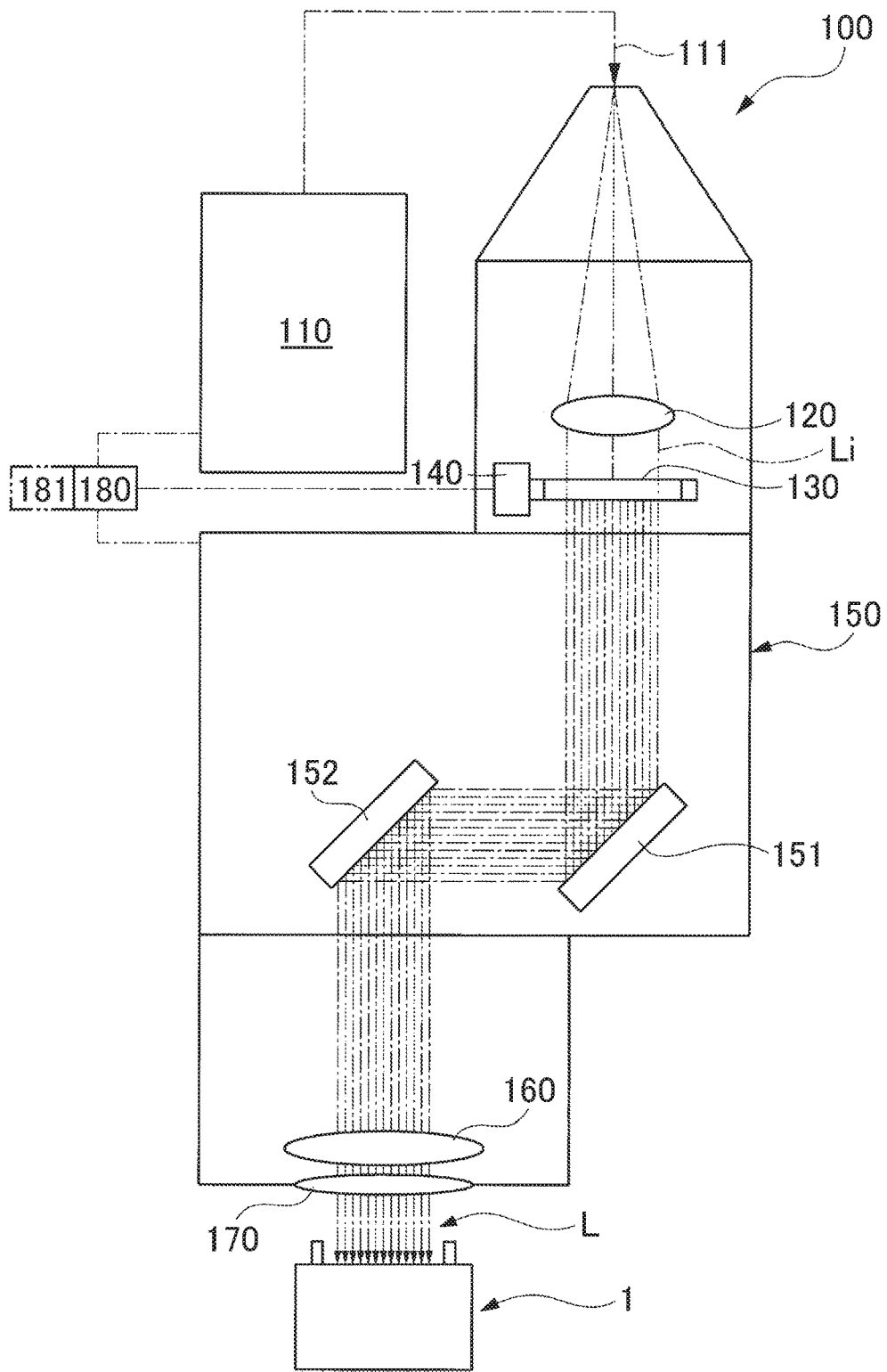
FIG. 2 is a schematic view of a configuration of a laser welding apparatus according to the first embodiment.

With reference to FIG. 2, a welding apparatus 100 that carries out the laser welding of the present embodiment will be described. FIG. 2 is a schematic view of a configuration of the welding apparatus 100 to irradiate the battery 1 with a laser beam L. As shown in FIG. 2, the welding apparatus 100 includes a laser oscillator 110, a collimating lens 120, a diffractive optical element (DOE) 130, a Galvano scanner 150, an Fθ lens 160, and a protective lens 170.

The laser oscillator 110 is an emitter capable of generating a laser beam and emitting the generated laser beam. The collimating lens 120, the diffractive optical element 130, the Galvano scanner 150, the Fθ lens 160, and the protective lens 170 are arranged in an optical path of the laser beam emitted from the laser oscillator 110 in this order. The welding apparatus 100 is capable of projecting the laser beam toward the battery 1 from a lower surface of the protective lens 170.

The collimating lens 120 is capable of adjusting the laser beam emitted from the laser oscillator 110 and entering through an optical fiber 111 to be in a parallel state. The diffractive optical element 130 is capable of adjusting an irradiation pattern of the laser beam. Specifically, the diffractive optical element 130 is capable of radiating the laser beam having entered as a laser beam having a distribution profile of the power density different from that of the laser beam at the moment of entering. In FIG. 2, the laser beam before entering the diffractive optical element 130 is indicated as an incident beam Li. The laser beam L irradiating the battery 1 is a radiated laser beam resulted from the incident beam Li radiated from an incident point of the diffractive optical element 130.

The diffractive optical element 130 is attached to a sliding unit 140. The sliding unit 140 is capable of slidingly moving the diffractive optical element 130 relative to the incident beam Li. The diffractive optical element 130 and the sliding unit 140 will be described later in details.

The Galvano scanner 150 includes a pair of reflecting mirrors (Galvano mirrors) 151,152. An angle of each reflecting mirror 151, 152 is adjusted by rotating the reflecting mirror 151, 152 by a motor. The Fθ lens 160 is used for correcting a scan speed of the laser beam to be constant.

Figure 3:
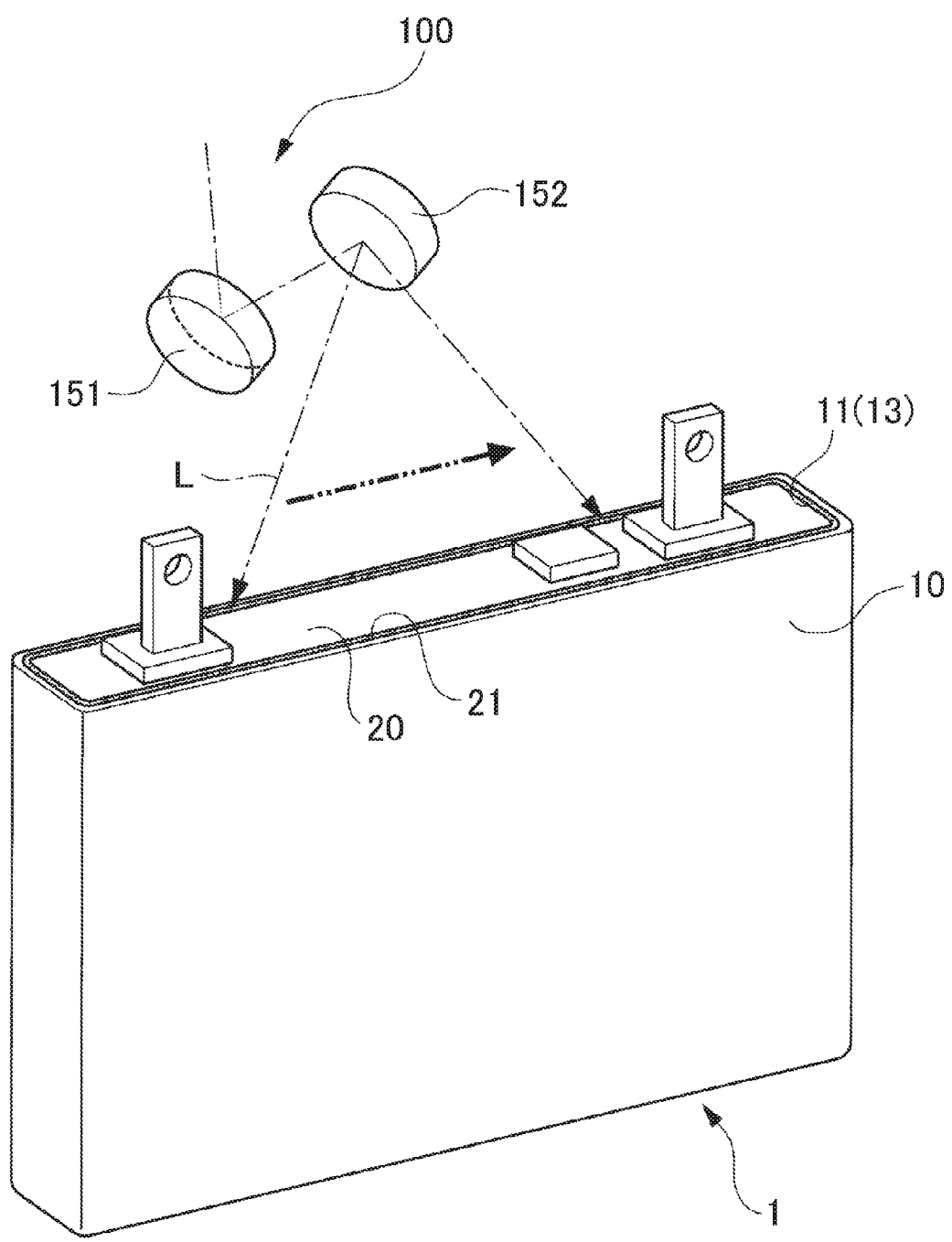
FIG. 3 is a drawing explaining a laser beam scan method by using the welding apparatus according to the first embodiment.

The Galvano scanner 150 is capable of accurately irradiating a predetermined position with the laser beam L by rotating of the reflecting mirrors 151, 152. This means that the Galvano scanner 150 is capable of irradiating any welding point with the laser beam L by rotating the reflecting mirrors 151, 152. The Galvano scanner 150 may be a scanning unit capable of scanning the welding line formed by plural continuous welding points with the laser beam L at a high speed. As shown in FIG. 3, the welding apparatus 100 of the present embodiment is capable of irradiating a formation position of the joined portion 30 (welding line) of the battery 1 with the laser beam L by one round by rotating the reflecting mirrors 151, 152.

The welding apparatus 100 includes a controller 180 to control each component. The controller 180 is capable of controlling emission of the laser beam via the laser oscillator 110. The controller 180 controls a slide movement via the sliding unit 140. The controller 180 further controls scanning with the laser beam L via the Galvano scanner 150.

Figure 4:
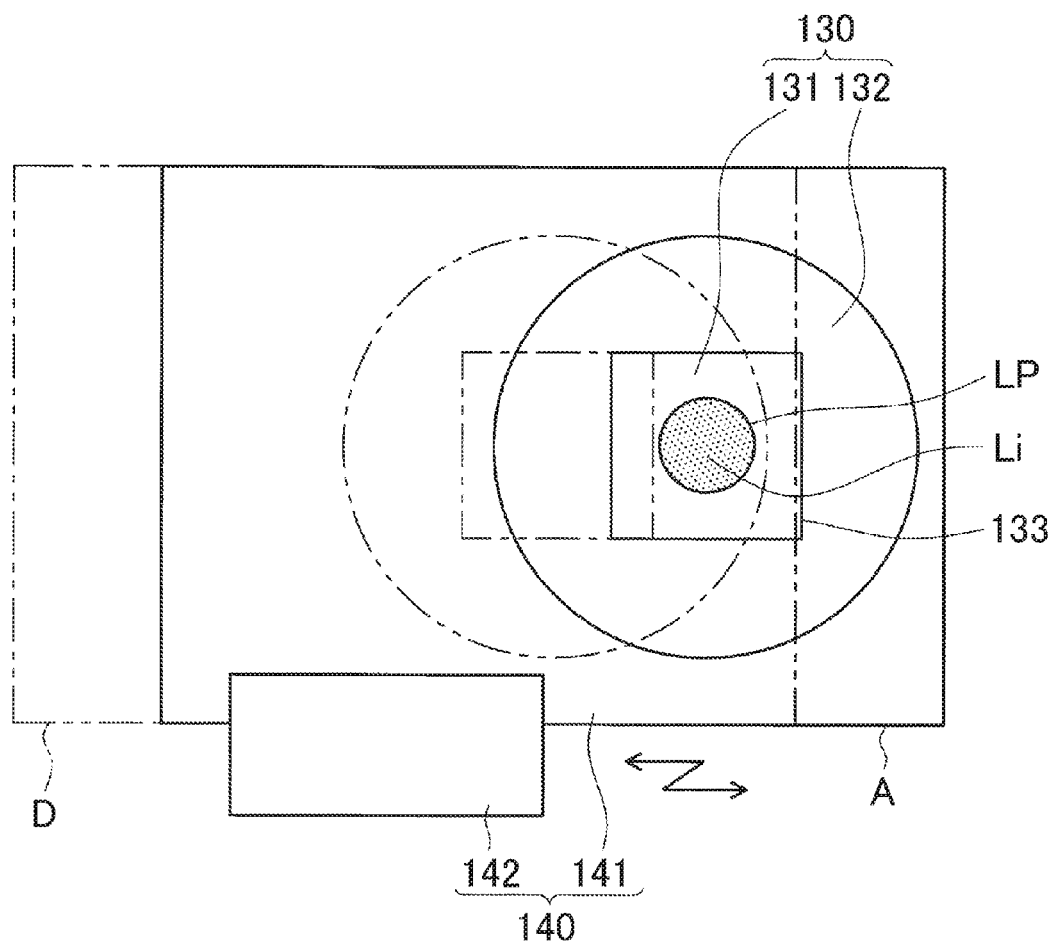
FIG. 4 is a plan view of a diffractive optical element and a sliding unit.

FIG. 4 shows a plan view of the diffractive optical element 130 and the sliding unit 140 of the welding apparatus 100. In FIG. 4, the incident beam Li enters the diffractive optical element 130 from the front of the depth direction of the drawing. FIG. 4 shows an incident point LP where the incident beam Li has entered. In the present embodiment, the incident point LP is not a point at a zero-dimension, but a point having some area.

As shown in FIG. 4, the diffractive optical element 130 includes a formation region 131 and a non-formation region 132. The formation region 131 is a region having a square outer shape, and disposed at a center of the diffractive optical element 130. The non-formation region 132 is a region located around the square formation region 131 in a manner as to surround this formation region 131. Hence, in the diffractive optical element 130, the formation region 131 and the non-formation region 132 are adjacently located as shown in FIG. 4. One side of a boundary between the formation region 131 and the non-formation region 132 formed along four sides of the outer shape of the formation region 131 is shown as a boundary 133 in FIG. 4. The diffractive optical element 130 is configured by a material through which the laser beam can be transmitted in both the formation region 131 and the non-formation region 132. An example of the material of the diffractive optical element 130 may include quartz glass, for example.

The formation region 131 of the diffractive optical element 130 is a region where a diffraction grating is formed. Hence, in the formation region 131, while the incident beam Li enters the formation region 131, the incident beam Li can be radiated from the incident point LP so as to form an irradiation pattern derived from an interference fringe by diffraction of the laser beam at the irradiation position.

Meanwhile, in the diffractive optical element 130 of the present embodiment, the non-formation region 132 is a region where no diffraction grating is formed. Hence, in the non-formation region 132, when the incident beam Li enters the non-formation region 132, the incident beam Li can be transmitted through the incident point LP so as to form an irradiation pattern at the irradiation position. In the present embodiment, even if the incident point LP is located within the non-formation region 132, the laser beam transmitted through the incident point LP is a radiated beam radiated from the incident point LP.

As shown in FIG. 4, the sliding unit 140 includes a movable part 141 and a fixed part 142. The movable part 141 is slidingly movable relative to the fixed part 142. In the sliding unit 140 of the present embodiment, the movable part 141 is movable within a plane of the diffractive optical element 130.

As shown in FIG. 4, the diffractive optical element 130 is fixed to the movable part 141. Hence, the sliding unit 140 can slidingly move the diffractive optical element 130 in the plane. The sliding unit 140 of the present embodiment is slidingly movable in a range from a slide position A indicated by a solid line to a slide position D indicated by an alternate long and two short dashed line, in FIG. 4. Through this configuration, the sliding unit 140 of the present embodiment is capable of moving the incident point LP on the diffractive optical element 130.

The slide position A as indicated by the solid line in FIG. 4 is in a state in which the incident point LP of the incident beam Li is located at a center in the formation region 131 of the diffractive optical element 130. This means that at the slide position A, the incident beam Li enters only the formation region 131 of the diffractive optical element 130. For example, the incident beam Li enters only the formation region 131 of the diffractive optical element 130 until at least one point in the incident point LP comes out from the formation region 131 during the slide movement from the slide position A to the slide position D.

Meanwhile, at the slide position D as indicated by the alternate long and two short dashed line, the incident point LP of the incident beam Li is in a state in which the incident point LP is located in the non-formation region 132 of the diffractive optical element 130. Specifically, the incident beam Li enters only the non-formation region 132 of the diffractive optical element 130 at the slide position D. For example, during the slide movement from the slide position A to the slide position D, the incident beam Li enters only the non-formation region 132 of the diffractive optical element 130 after the entire incident point LP comes out from the formation region 131.

From the slide position A to the slide position D, it is possible to set the sliding unit 140 in a state in which the incident beam Li enters both the formation region 131 and the non-formation region 132 of the diffractive optical element 130. For example, during the slide movement from the slide position A to the slide position D, while at least one point in the incident point LP comes out from the formation region 131 and the incident point LP completely comes into the non-formation region 132, the incident beam Li enters both the formation region 131 and the non-formation region 132. Specifically, in a state in which the incident point LP overlaps the boundary 133 between the formation region 131 and the non-formation region 132, the incident beam Li enters both the formation region 131 and the non-formation region 132.

Figure 5:
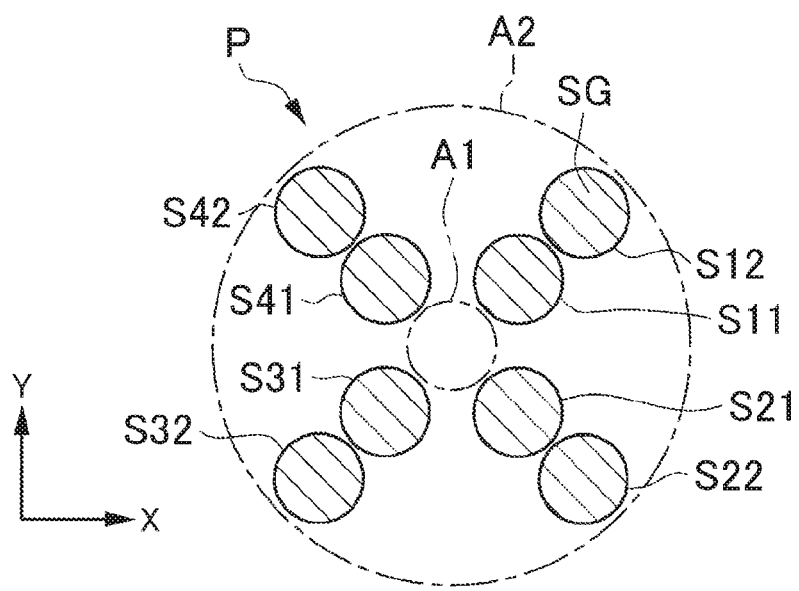
FIG. 5 is a drawing showing an irradiation pattern of the laser beam formed with the incident point located in a formation region of a diffractive optical element.
Figure 6:
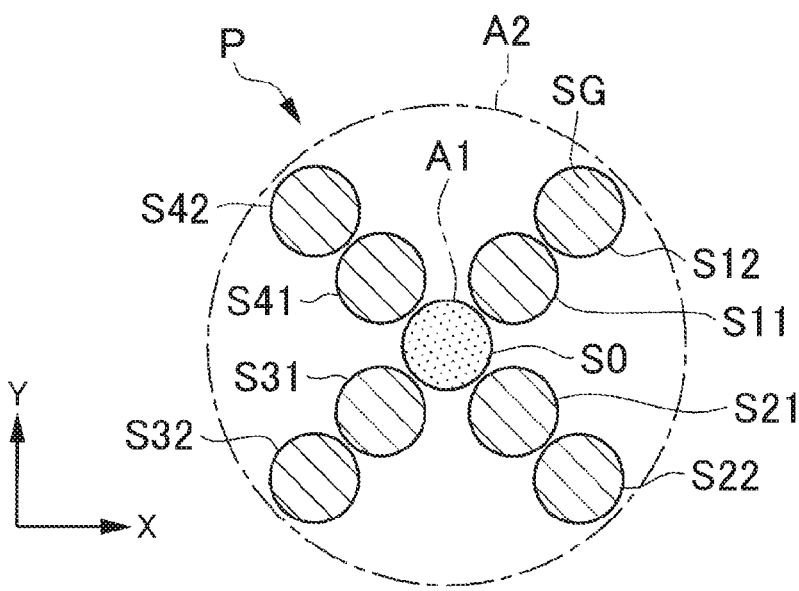
FIG. 6 is a drawing showing the irradiation pattern of the laser beam formed with the incident point overlapping a boundary between the formation region and the non-formation region of the diffractive optical element.
Figure 7:
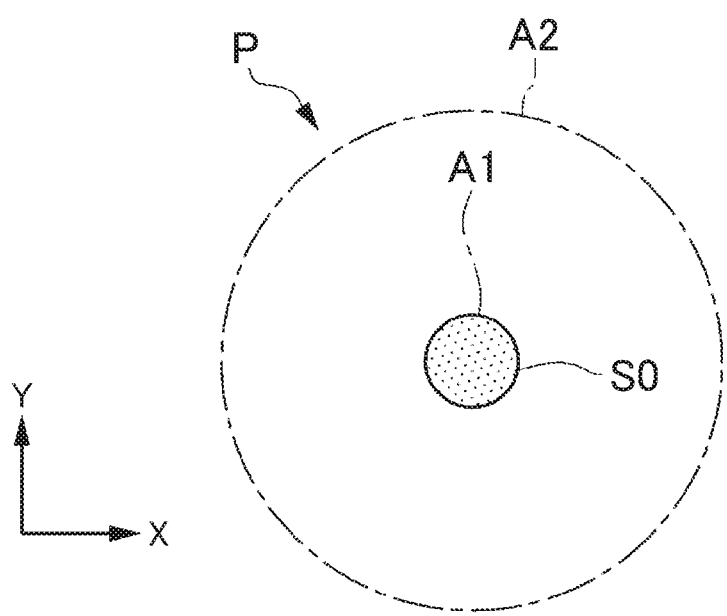
FIG. 7 is a drawing showing the irradiation pattern of the laser beam formed with the incident point located in the non-formation region of the diffractive optical element.

An irradiation pattern P formed by the incident beam Li having entered the diffractive optical element 130 is shown in each of FIG. 5, FIG. 6, and FIG. 7. Each irradiation pattern P as shown in FIG. 5, FIG. 6, and FIG. 7 is formed on respective upper surfaces of the case body 10 and the sealing plate 20 that are the irradiation position with the laser beam L radiated from the incident point LP.

Specifically, FIG. 5 shows the irradiation pattern P of the laser beam L formed while the incident point LP is located within the formation region 131. As shown in FIG. 5, the irradiation pattern P formed while the incident point LP is located within the formation region 131 includes an outer edge spot group SG indicated by oblique-line hatching. The outer edge spot group SG is configured by eight outer edge spots S11, S12, S21, S22, S31, S32, S41, S42. All outer edge spots of the outer edge spot group SG are located within an outer edge region A2 located around a central region A1 in the irradiation pattern P. As shown in FIG. 5, in the state in which the incident point LP is located within the formation region 131, the irradiation pattern P has no spot in the central region A1. Specifically, the formation region 131 of the diffractive optical element 130 of the present embodiment is a region that radiates the radiated beam such that parts having the maximum power density are located within the outer edge region A2 when the incident beam Li enters.

FIG. 6 shows the irradiation pattern P of the laser beam L formed while the incident point LP overlaps the boundary 133 between the formation region 131 and the non-formation region 132. As shown in FIG. 6, the irradiation pattern P formed while the incident point LP overlaps the boundary 133 is configured by the outer edge spot group SG as indicated by the oblique-line hatching and a central spot S0 as indicated by dot-hatching. The central spot S0 is located within the central region A1 in the irradiation pattern P.

FIG. 7 shows the irradiation pattern P of the laser beam L formed while the incident point LP is located within the non-formation region 132. As shown in FIG. 7, the irradiation pattern P formed while the incident point LP is located within the non-formation region 132 is configured by the central spot S0 as indicated by the dot-hatching. As shown in FIG. 7, the irradiation pattern P formed while the incident point LP is located within the non-formation region 132 has no spot in the outer edge region A2. In the present embodiment, the central region A1 is defined as a position where the central spot S0 is formed. Hence, in the present embodiment, the non-formation region 132 of the diffractive optical element 130 is a region that radiates the radiated beam such that the central spot S0 becomes a part having the maximum power density when the incident beam Li enters.

The outer edge spot group SG as indicated by the oblique-line hatching is formed by the incident beam Li having entered the formation region 131 of the diffractive optical element 130. In other words, the outer edge spot group SG is formed by the laser beam L that is the incident beam Li radiated in the formation region 131. Specifically, in the formation region 131 of the diffractive optical element 130 of the present embodiment, a diffraction grating that generates the outer edge spot group SG in the outer edge region A2 is formed due to interference fringe formed by diffracting the incident beam Li.

In the formation region 131, regardless of the position of the incident point LP, the diffraction grating is formed such that a diffracted beam of a first order or more of the incident beam Li having entered the formation region 131 forms the respective spots of the outer edge spot group SG. Specifically, either when the incident point LP is located at the center of the formation region 131 or when the incident point LP is located in the vicinity of an end of the formation region 131, the respective spots of the outer edge spot group SG are formed by the laser beam L radiated from the incident point LP in the formation region 131.

Meanwhile, the central spot S0 as indicated by the dot-hatching is formed by the laser beam L (zero-order beam) that is the incident beam Li having entering the non-formation region 132 of the diffractive optical element 130 and having transmitted through the non-formation region 132 at the incident point LP.

As shown in FIG. 5 and FIG. 6, the outer edge spot group SG in the irradiation pattern P is radially arranged around the central spot S0 located in the central region A1. Specifically, the outer edge spots S11, S12 of the outer edge spot group SG are arranged on an upper right of the central spot S0. The outer edge spots S21, S22 are arranged on a lower right of the central spot S0. The outer edge spots S31, S32 are arranged on a lower left of the central spot S0. The outer edge spots S41, S42 are arranged on an upper left of the central spot S0.

The outer edge spots S11, S12 on the upper right and the outer edge spots S41, S42 on the upper left are respectively arranged in a positional relation in which a triangle having apexes defined by one of the outer edge spots S11, S12 and one of the outer edge spots S41, S42 together with the central spot S0 is formed. The outer edge spots S11, S12 on the upper right and the outer edge spots S21, S22 on the lower right are respectively arranged in a positional relation in which a triangle having apexes defined by one of the outer edge spots S11, S12 and one of the outer edge spots S21, S22 together with the central spot S0 is formed. The outer edge spots S21, S22 on the lower right and the outer edge spots S31, S32 on the lower left are respectively arranged in a positional relation in which a triangle having apexes defined by one of the outer edge spots S21, S22 and one of the outer edge spots S31, S32 together with the central spot S0 is formed. The outer edge spots S31, S32 on the lower left and the outer edge spots S41, S42 on the upper left are respectively arranged in a positional relation in which a triangle having apexes defined by one of the outer edge spots S31, S32 and one of the outer edge spots S41, S42 together with the central spot S0 is formed. Specifically, for example, the outer edge spot S11 and the outer edge spot S41 along with the central spot S0 are arranged at respective positions corresponding to apexes of a triangle.

In addition, the outer edge spots S11, S12 on the upper right, the outer edge spots S21, S22 on the lower right, the outer edge spots S31, S32 on the lower left, and the outer edge spots S41, S42 on the upper left are arranged in a positional relation in which a rectangle is formed having each apex defined by one spot of each pair of the outer edge spots. Furthermore, the outer edge spot group SG is arranged in a manner as to surround the central spot S0 by the rectangle.

Gaps are provided respectively between the left outer edge spots S31, S32, S41, S42 and the right outer edge spots S11, S12, S21, S22 of the outer edge spot group SG. In addition, gaps are also provided respectively between the upper outer edge spots S11, S12, S41, S42 and the lower outer edge spots S21, S22, S31, S32. The respective gaps between the left outer edge spots and the right outer edge spots in the outer edge spot group SG, and the respective gaps between the upper outer edge spots and the lower outer edge spots in the outer edge spot group SG are set to be equal to or more than a gap provided to the welding line described later.

The central spot S0 and each outer edge spot of the outer edge spot group SG in the irradiation pattern P are not zero-order spots, but have some areas. In the present embodiment, each spot of the outer edge spot group SG has the same area as that of the central spot S0. Specifically, a sum of the areas of the respective spots of the outer edge spot group SG is eight times as large as the area of the central spot S0.

The sliding unit 140 of the present embodiment can switch the irradiation pattern P to each irradiation pattern P as shown in FIG. 5, FIG. 6, and FIG. 7 by sliding movement. Specifically, the sliding unit 140 varies the position of the incident point LP of the incident beam Li on the diffractive optical element 130, thereby respectively setting the outer edge spot group SG and the central spot S0 to emerge or not to emerge in the irradiation pattern P. Through this configuration, it is possible to vary the irradiation pattern P.

Figure 8:
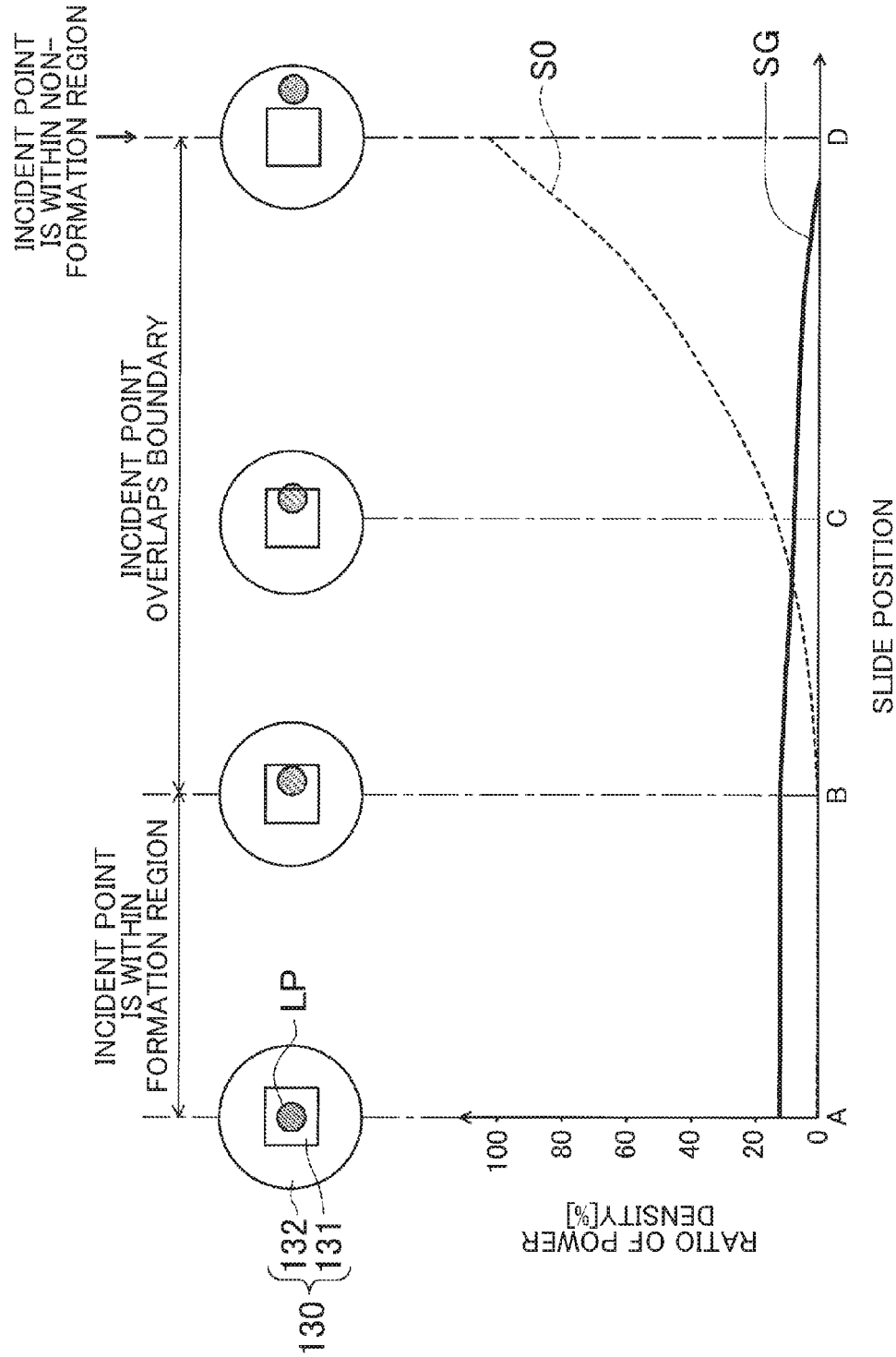
FIG. 8 is a drawing showing a relation between a slide position of the sliding unit and ratios of power densities in the irradiation pattern.

FIG. 8 is a graph showing a relation between the slide position of the sliding unit 140 and the power density. A horizontal axis of FIG. 8 represents the slide position of the sliding unit 140. A vertical axis of FIG. 8 represents a ratio of the power density.

In addition, FIG. 8 shows a graph of a ratio of the power density of the outer edge spot group SG as indicated by a solid line, and a graph of a ratio of the power density of the central spot S0 as indicated by a broken line. The graph of the ratio of the power density of the outer edge spot group SG indicated by the solid line shows a ratio of the power density of one of the eight spots configuring the outer edge spot group SG.

As shown in FIG. 8, the left end of the horizontal axis represents that the sliding unit 140 is located at the slide position A. The right end of the horizontal axis represents that the sliding unit 140 is located at the slide position D. A slide position B indicated in the horizontal axis represents that the sliding unit 140 is located at a boundary between a state in which the incident point LP is located within the formation region 131 and a state in which the incident point LP overlaps the boundary 133.

Within a range where the slide position is located more leftward than the slide position B, that is, the incident point LP is located within the formation region 131, the irradiation pattern P as shown in FIG. 5 is formed. Within a range where the slide position is located more rightward than the slide position B, that is, the incident point LP overlaps the boundary 133, the irradiation pattern P as shown in FIG. 6 is formed. Specifically, at the slide position C within a range where the incident point LP of FIG. 8 overlaps the boundary 133, the irradiation pattern P as shown in FIG. 6 is formed. In addition, at the slide position D within a range where the incident point LP is located within the non-formation region 132, the irradiation pattern P as shown in FIG. 7 is formed.

As shown in the graphs of FIG. 8, the power density of the outer edge spot group SG becomes maximum within a range from the slide position A to the slide position B. This is because the incident beam Li enters only the formation region 131 of the diffractive optical element 130 regardless of the slide position of the sliding unit 140 within the range from the slide position A to the slide position B. Within the range from the slide position A to the slide position B, the ratio of the power density of a single spot of the outer edge spot group SG is approximately 12.5% because the outer edge spot group SG is configured by eight spots.

The power density of the outer edge spot group SG becomes gradually decreased from the slide position B toward the slide position D, and becomes zero at the slide position D. This is because an overlapping area between the incident point LP and the formation region 131 becomes smaller as the slide position comes closer to the slide position D. Hence, the ratio of the incident beam Li entering the formation region 131 becomes smaller. At the slide position D, the entire incident point LP is located out of the formation region 131 of the diffractive optical element 130, so that no incident beam Li enters the formation region 131.

Meanwhile, the power density of the central spot S0 is zero within the range from the slide position A to the slide position B. This is because, within the range from the slide position A to the slide position B, the entire incident point LP is out of the non-formation region 132 of the diffractive optical element 130, and no incident beam Li enters the non-formation region 132. The power density of the central spot S0 gradually becomes increased from the slide position B toward the slide position D, and becomes a maximum of 100% at the slide position D. As the slide position comes closer to the slide position D, an overlapping area between the incident point LP and the non-formation region 132 becomes greater. Hence, the ratio of the incident beam Li entering the non-formation region 132 becomes greater. At the slide position D, the entire incident point LP is located within the non-formation region 132 of the diffractive optical element 130, so that the incident beam Li enters only the non-formation region 132.

As apparent from FIG. 8, the welding apparatus 100 of the present embodiment can control the ratio between the power density of the outer edge spot group SG and the power density of the central spot S0 in the irradiation pattern P by the slide movement of the sliding unit 140. Through this, the welding apparatus 100 is capable of varying the distribution profile of the power density in the irradiation pattern P.

Figure 9:
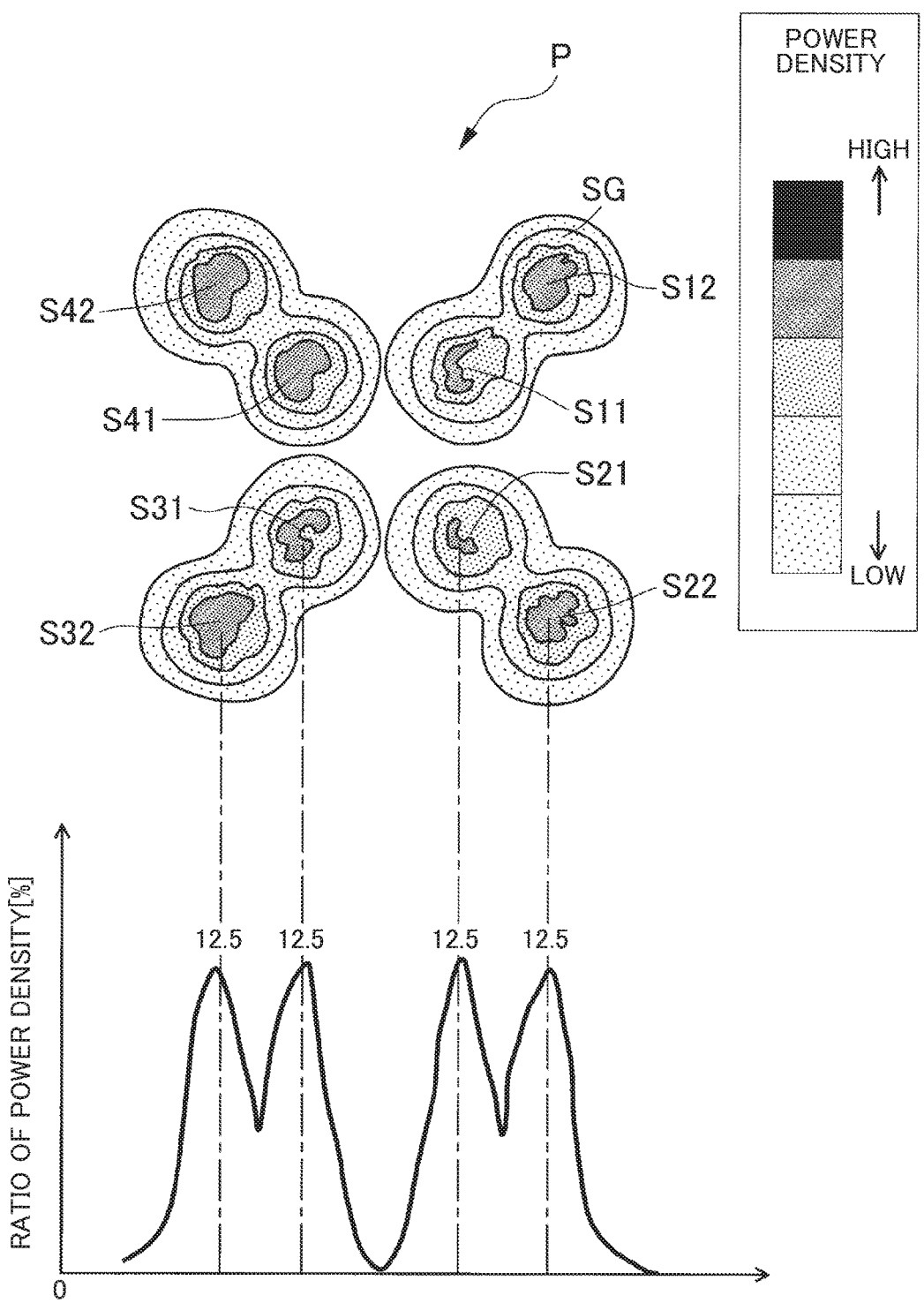
FIG. 9 is a drawing showing ratios of the power densities in the irradiation pattern when the slide position is located at a position where the incident point to be located in the formation region of the diffractive optical element.

Specifically, for example, FIG. 9 shows ratios of the power densities of the respective spots in the irradiation pattern P if the sliding unit 140 is located at the slide position A. As shown in FIG. 9, as aforementioned, the ratio of the power density of each spot of the outer edge spot group SG is approximately 12.5% because the outer edge spot group SG is configured by eight spots. It is obvious from FIG. 9 that no central spot S0 emerges in the irradiation pattern P regarding the slide position A. This means that the power density at the central spot S0 is zero.

Figure 10:
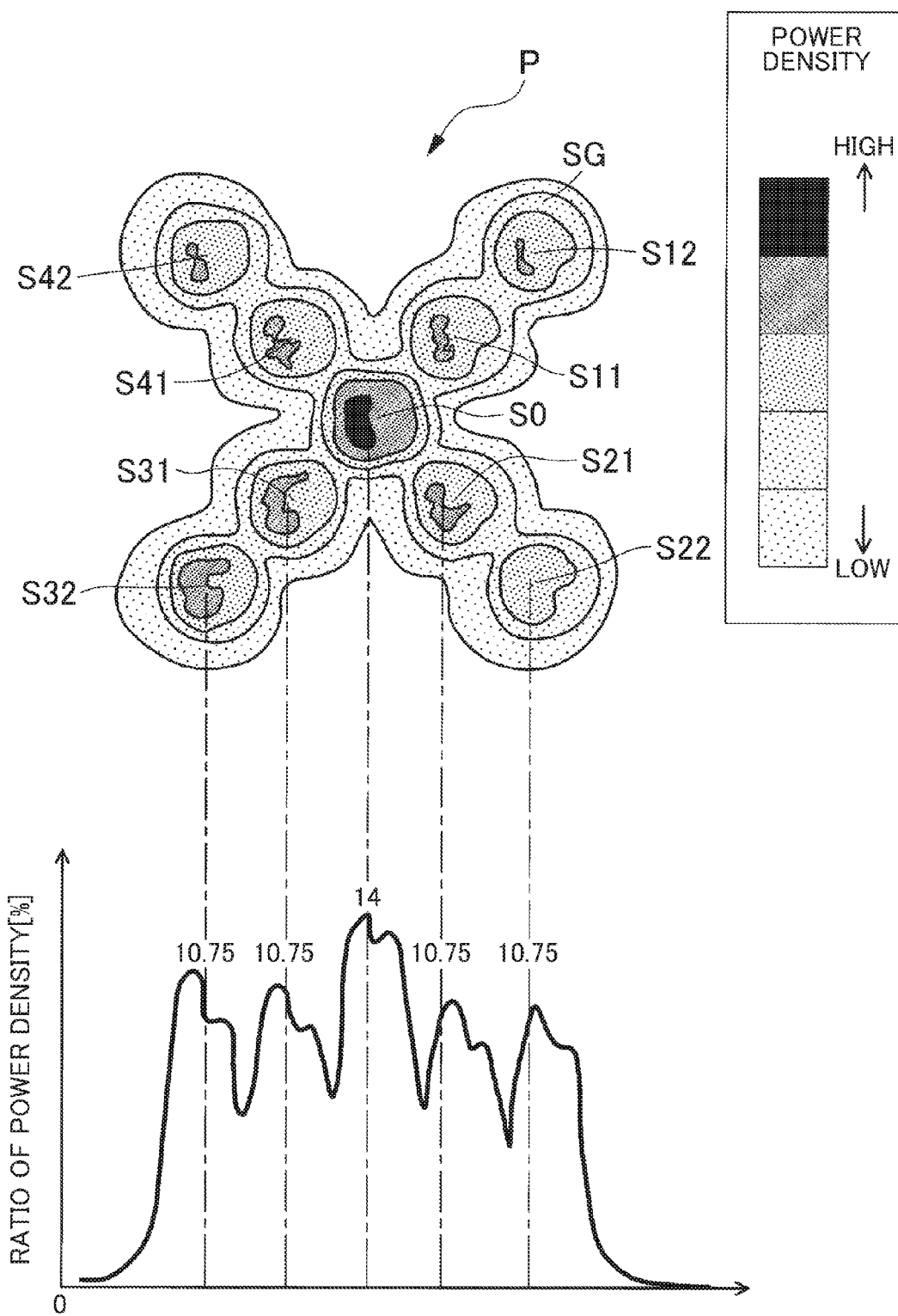
FIG. 10 is a drawing showing ratios of the power densities in the irradiation pattern when the slide position is located at a position where the incident point overlaps a boundary between the formation region and the non-formation region of the diffractive optical element.

On the other hand, FIG. 10 shows ratios of the power densities of the respective spots in the irradiation pattern P if the sliding unit 140 is located at the slide position C. Different from the case at the slide position A as shown in FIG. 9, the central spot S0 emerges if the slide position is located at the slide position C as shown in FIG. 10. The ratio of the power density of the central spot S0 becomes maximum. At the slide position C, the ratio of the power density of each spot of the outer edge spot group SG becomes decreased more than that at the slide position A. This is because, at the slide position C, the overlapping area between the incident point LP and the formation region 131 is smaller than that at the slide position A, and thus the ratio of the incident beam Li entering the formation region 131 is decreased.

It is found that the distribution profile of the power density in FIG. 10 is different from that in FIG. 9. Specifically, the distribution profile of the power density of the irradiation pattern P regarding the slide position A as shown in FIG. 9 has a power density of 0% at the central spot S0, and has a power density of approximately 12.5% at each spot of the outer edge spot group SG. To the contrary, the distribution profile of the power density of the irradiation pattern P regarding the slide position C has a power density of approximately 14% at the central spot S0, and has a power density of approximately 10.75% at each spot of the outer edge spot group SG.

Consequently, if the sliding unit 140 slidingly moves from the slide position A to the slide position C, the distribution profile of the power density of the irradiation pattern P varies. Reversely, if the sliding unit 140 slidingly moves from the slide position C to the slide position A, the distribution profile of the power density of the irradiation pattern P also varies. This means that the welding apparatus 100 of the present embodiment is capable of varying the distribution profile of the power density of the irradiation pattern P through the slide movement of the sliding unit 140 during the irradiation with the laser beam L.

The configuration of varying the distribution profile of the power density of the irradiation pattern P is not limited to change from the state in which the incident point LP is located within the formation region 131 to the state in which the incident point LP overlaps the boundary 133, and vice versa through the slide movement of the sliding unit 140. This means that if the slide movement of the sliding unit 140 is carried out within the range in which the incident point LP overlaps the boundary 133, it is also possible to vary the distribution profile of the power density of the irradiation pattern P. Specifically, if the position of the incident point LP is changed within the range in which the incident point LP overlaps the boundary 133, the position of each spot of the irradiation pattern P is not changed, but the distribution profile of the power density can be varied. In other words, the welding apparatus 100 of the present embodiment is capable of varying the distribution profile of the power density of the irradiation pattern P by moving the sliding unit 140 such that at least one point in the incident point LP moves across the boundary 133 of the diffractive optical element 130. Through this configuration, the welding apparatus 100 of the present embodiment is capable of flexibly controlling the distribution profile of the power density of the irradiation pattern P.

In the present embodiment, the joined portion 30 (FIG. 1) is formed to the battery 1 by carrying out the joining step using the aforementioned welding apparatus 100. The controller 180 of the welding apparatus 100 carries out a joining control on the laser oscillator 110 to emit the laser beam L in the joining step. During the joining control, the controller 180 of the present embodiment controls the sliding unit 140 to slidingly move. In the joining control, the controller 180 of the present embodiment further carries out a scan control to control the Galvano scanner 150 to scan the welding line with the laser beam.

Figure 11:
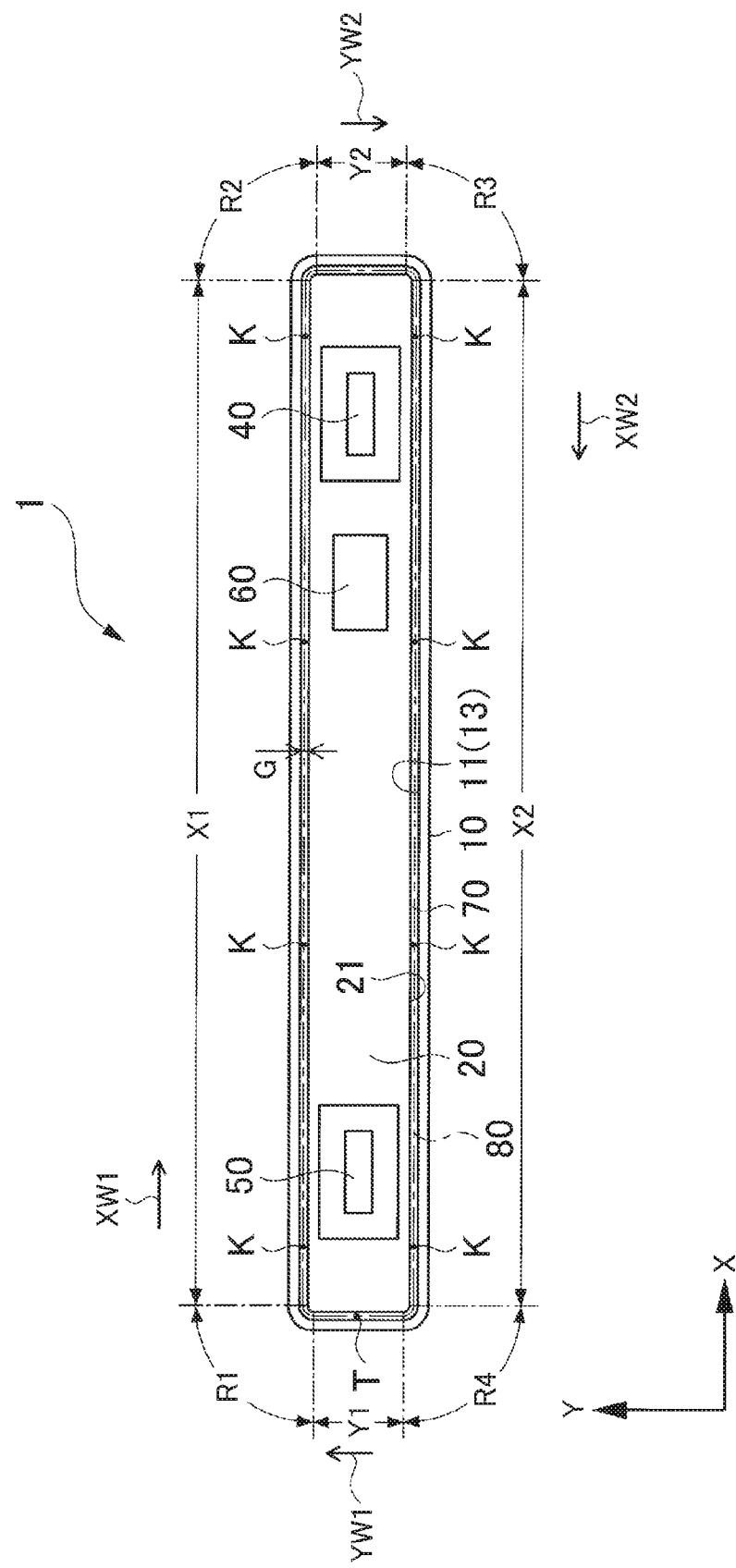
FIG. 11 is a plan view of the battery used for explaining a scan control of the laser beam in a joining control according to the first embodiment.

FIG. 11 is a plan view of the battery 1 before the joining step. In the battery 1 as shown in FIG. 11, the joined portion 30 (FIG. 1) is no yet formed. FIG. 11 shows a state in which the sealing plate 20 is inserted in the opening 11 of the case body 10. Hence, the inner wall surface 13 of the opening 11 of the case body 10 and the side surface 21 of the sealing plate 20 are in a state of facing each other. In the joining step of the present embodiment, the laser welding is carried out along the welding line 80 of a facing portion 70 at which the inner wall surface 13 of the case body 10 and the side surface 21 of the sealing plate 20 face each other.

As shown in FIG. 11, the facing portion 70 before the joining step has a gap G between the inner wall surface 13 of the opening 11 of the case body 10 and the side surface 21 of the sealing plate 20. This gap G is used for smoothly inserting the sealing plate 20 into the opening 11 of the case body 10.

As shown in FIG. 11, the battery 1 in a flat form has a longitudinal direction along the X axis direction that extends in a lateral direction, and a shorter-length direction along the Y axis direction that extends in a vertical direction. Hence, the welding line 80 has substantially a rectangular shape having a longitudinal direction extending in the X axis direction, and having a shorter-length direction extending in the Y axis direction. The welding line 80 includes longitudinal sections X1, X2 that are straight sections extending parallel with the X axis direction. The welding line 80 includes short-length sections Y1, Y2 that are straight sections extending parallel with the Y axis direction. In addition, the welding line 80 includes curved sections R1, R2, R3, R4 each of which connects corresponding two straight sections.

In the joining step of the present embodiment, the laser welding to scan the welding line 80 with the laser beam by one round in a clockwise direction from a start position T as indicated on the short-length section Y1 is carried out by using the welding apparatus 100. Hence, the controller 180 carries out the joining control to control the laser oscillator 110 to emit the laser beam, and in this joining control, also carries out the scan control to control the Galvano scanner 150 to scan the welding line 80 with the laser beam. The start position T is one of plural continuous welding points formed on the welding line 80.

In the scan control, the controller 180 carries out a positive short-length scan control to control the Galvano scanner 150 to scan the short-length section Y1 with the laser beam from the start position T in an arrow direction YW1 that is a positive direction of the Y axis. In the scan control, the controller 180 also carries out a positive longitudinal scan control to control the Galvano scanner 150 to scan the longitudinal section X1 with the laser beam in an arrow direction XW1 that is a positive direction of the X axis. In the scan control, the controller 180 further carries out a negative short-length scan control to control the Galvano scanner 150 to scan the short-length section Y2 with the laser beam in an arrow direction YW2 that is a negative direction of the Y axis. In addition, in the scan control, the controller 180 also carries out a negative longitudinal scan control to control the Galvano scanner 150 to scan the longitudinal section X2 with the laser beam in an arrow direction XW2 that is a negative direction of the X axis.

In the above first positive short-length scan control, a part of the short-length section Y1 located on the longitudinal section X2 side from the start position T is irradiated with no laser beam. Hence, in the scan control, after the negative longitudinal scan control, in order to irradiate the part of the short-length section Y1 located on the longitudinal section X2 side from the start position T with the laser beam, the positive short-length scan control to scan the concerned section with the laser beam in the arrow direction YW1 is carried out once again.

The controller 180 carries out the first to the fourth curved-scan controls to cause the Galvano scanner 150 to scan the respective curved sections R1, R2, R3, R4 with the laser beam between each two sequential controls of the positive short-length scan control, the positive longitudinal scan control, the negative short-length scan control, the negative longitudinal scan control, and the positive short-length scan control. Specifically, in the scan control, the controller 180 of the present embodiment carries out the positive short-length scan control, the first curved-scan control, the positive longitudinal scan control, the second curved-scan control, the negative short-length scan control, the third curved-scan control, the negative longitudinal scan control, the fourth curved-scan control, and the positive short-length scan control in this order.

The vicinity of an end position of the scan control may moderately overlap the vicinity of the start position T. This is because the case body 10 can be continuously joined to the sealing plate 20 along the welding line 80. Hence, in the second positive short-length scan control, the Galvano scanner 150 may be controlled to continuously carry out the scan with the laser beam to some extent after the scan reaches the start position T.

In the joining control of the present embodiment, as the irradiation patterns P with the laser beam, the irradiation patterns P as shown in FIG. 5 and FIG. 6 are used. The X axis and the Y axis are respectively indicated in each of FIG. 5 and FIG. 6. The welding apparatus 100 of the present embodiment applies the laser beam having the irradiation pattern P as shown in each of FIG. 5 and FIG. 6 at a rotational position where the battery 1 as shown in FIG. 11 coincides with the X axis and the Y axis. Specifically, the welding apparatus 100 applies the laser beam such that the rotational position of the battery 1 coincides with the rotational position of the irradiation pattern P in each scan control. More specifically, when the irradiation pattern P as shown in FIG. 5 is used, the sliding unit 140 is set at the slide position A. When the irradiation pattern P as shown in FIG. 6 is used, the sliding unit 140 is set at the slide position C. In the present embodiment, whichever irradiation pattern P is formed, it is controlled that the welding line 80 extends through a center of the central region A1 of the irradiation pattern P.

Figure 12:
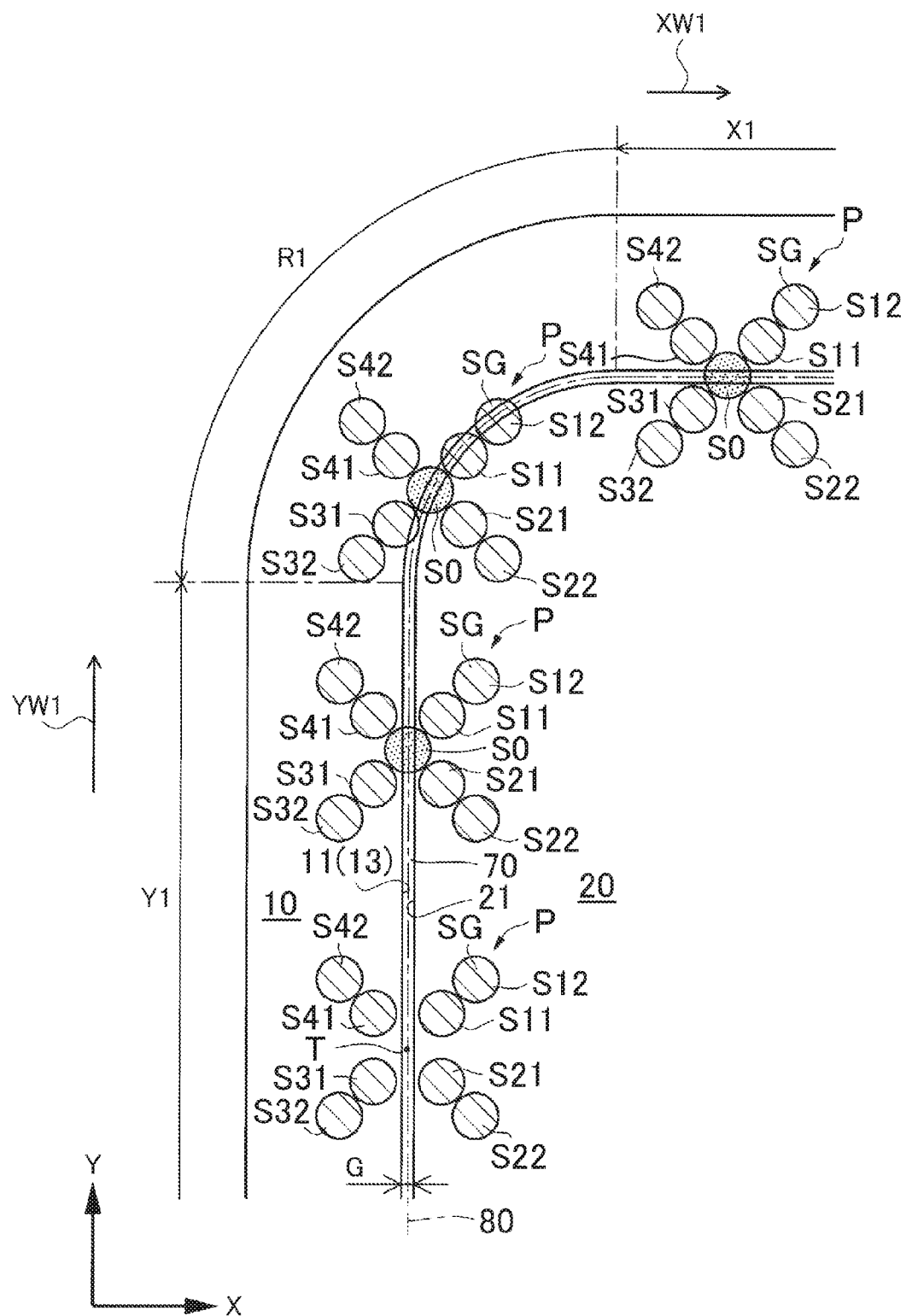
FIG. 12 is a partial plan view of the battery in the vicinity of a start position of the joining control.

FIG. 12 is a plan view partially showing the vicinity of the start position T of the battery 1. FIG. 12 shows the irradiation pattern P of the laser beam applied along the welding line 80 at respective positions. Specifically, at the start position T where the joining control is started, the controller 180 controls the sliding unit 140 to be set at the slide position A so as to form the irradiation pattern P having only the outer edge spot group SG at the start position T.

As shown in FIG. 12, the outer edge spot group SG at the start position T is formed on the case body 10 and on the sealing plate 20. Specifically, at the start position T, the outer edge spots S31, S32, S41, S42 of the outer edge spot group SG are formed on the case body 10, and the outer edge spots S11, S12, S21, S22 are formed on the sealing plate 20, respectively.

After the joining control is started, the controller 180 of the present embodiment controls the sliding unit 140 to be set at the slide position A until a predetermined initial time passes, and then controls the sliding unit 140 to slidingly move to the slide position C at the moment when the initial time passes. Specifically, after the initial time passes, the position of the incident point LP on the diffractive optical element 130 is controlled to be closer to the non-formation region 132, compared with the position thereof before the initial time passes. In other words, after the initial time passes, the area of the incident point LP overlapping the formation region 131 of the diffractive optical element 130 is set to be smaller than the area thereof before the initial time passes. Through this configuration, the laser beam having the irradiation pattern P regarding the slide position A is applied to the position of the start position T until the initial time passes, and then the laser beam having the irradiation pattern P regarding the slide position C is applied after the initial time passes. The controller 180 controls the slide movement of the sliding unit 140 without stopping emission of the laser beam from the laser oscillator 110. Through this, the welding apparatus 100 of the present embodiment can vary the distribution profile of the power density of the irradiation pattern P in a shorter time, thus reducing time required for the laser welding.

At the moment when the initial time passes, the controller 180 controls the sliding unit 140 to slidingly move from the slide position A to the slide position C, and controls the Galvano scanner 150 to start the scan with the laser beam. As shown in FIG. 12, in the irradiation pattern P as shown in the vicinity of the end point of the short-length section Y1 located at a forward position from the start position T in the arrow direction YW1, the central spot S0 as well as the outer edge spot group SG are formed. The central spot S0 is formed on the welding line 80.

In the joining control, while the sliding unit 140 is controlled to be set at the slide position C, the positive short-length scan control, the first curved-scan control, the positive longitudinal scan control, the second curved-scan control, the negative short-length scan control, the third curved-scan control, the negative longitudinal scan control, the fourth curved-scan control, and the positive short-length scan control are carried out in this order. Through this configuration, in the joining step, it is possible to carry out the laser welding along the welding line 80 by one round.

Figure 13:
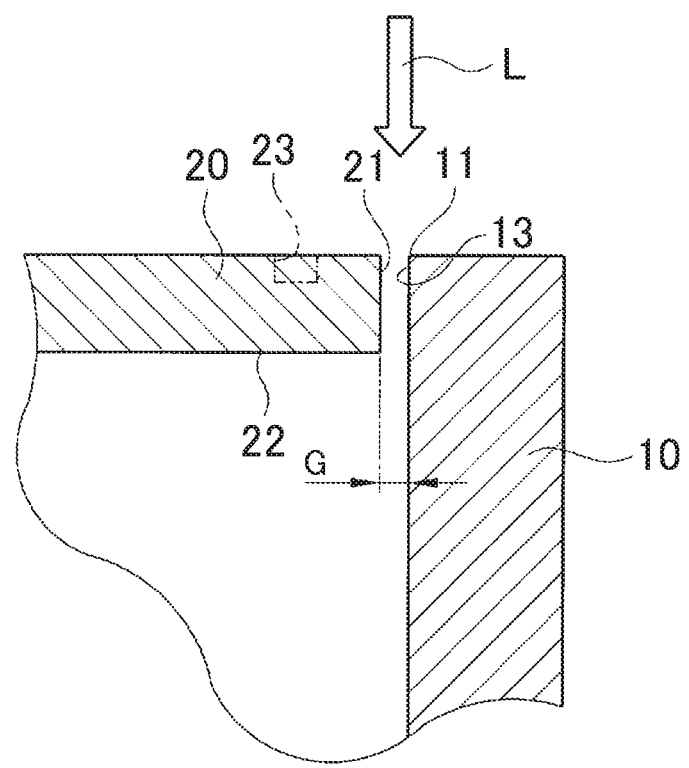
FIG. 13 is a sectional view of a straight section before the joining control is carried out.

FIG. 13 shows a sectional view of the short-length sections Y1, Y2, and the longitudinal sections X1, X2. As obvious from FIG. 13, if the gap G is present, and the gap G is irradiated with the laser beam L, the laser beam L might pass through the gap G, that is, a laser-passing might occur. If the laser-passing occurs, the electrode body and others housed inside the case body 10 might be damaged.

To cope with this, in the present embodiment, at the start position T, the joining control is started while the sliding unit 140 is set at the slide position A. As aforementioned, at the slide position A, the laser beam is applied to the case body 10 and the sealing plate 20, but no laser beam is applied to the gap G present in the welding line 80. Hence, until the initial time when the sliding unit 140 is set at the slide position A passes, it is configured to prevent occurrence of the laser-passing of the laser beam regarding the irradiation pattern P.

In the present embodiment, the initial time is defined to be an approximate time period required for a molten portion formed by the outer edge spot group SG to reach the gap G, and the gap G is charged with this molten portion. The initial time may be predefined by previously conducting tests.

After the initial time passes, when the sliding unit 140 is set at the slide position C and the central spot S0 is formed on the welding line 80, the molten portion is already present at a position corresponding to the central spot S0, and thus there exists no gap G. Specifically, after the initial time passes, and when the sliding unit 140 is set at the slide position C, it is configured to prevent occurrence of the laser-passing of the laser beam regarding the irradiation pattern P.

In the positive short-length scan control after the initial time passes, it is controlled that an intermediate part between first and second outer edge spots that form apexes of a triangle together with the central spot S0, and the central spot S0 are respectively brought to pass through each welding point of the welding line 80 in the order of the intermediate part between first and second outer edge spots that form apexes of the triangle together with the central spot S0, and the central spot S0. Specifically, in the positive short-length scan control, the intermediate part between the outer edge spots S11, S12 that are the first outer edge spot and the outer edge spots S41, S42 that are the second outer edge spot are first brought to pass through the welding point on the welding line 80. The central spot S0 is then brought to pass through the welding point on the welding line 80 through which the intermediate part between the outer edge spots S11, S12 and the outer edge spots S41, S42 have already passed. This means that in the positive short-length scan control, the outer edge spots S11, S12, S41, S42 are formed at a frontward position of the central spot S0 in the scan direction in the arrow direction YW1. The outer edge spots S41, S42 are formed at a position on the case body 10 frontward of the central spot S0, and the outer edge spots S11, S12 are formed at a position on the sealing plate 20 frontward of the central spot S0.

Accordingly, in the positive short-length scan control, a part of the case body 10 located frontward of the central spot S0 is melted by the outer edge spots S41, S42, and a part of the sealing plate 20 located frontward of the central spot S0 is melted by the outer edge spots S11, S12 at the same time. In the positive short-length scan control, it is possible to carry out the scan with the laser beam while charging the gap G frontward of the central spot S0. Accordingly, in the positive short-length scan control after the initial time passes, it is configured to prevent occurrence of the laser-passing of the laser beam regarding the irradiation pattern P.

The positive longitudinal scan control, the negative short-length scan control, and the negative longitudinal scan control that are the scan control in the other straight sections are carried out in the same manner as that of the above positive short-length scan control. Specifically, for example, in the positive longitudinal scan control, the intermediate part between the outer edge spots S11, S12 of the first outer edge spot and the outer edge spots S21, S22 of the second outer edge spot that form apexes of a triangle together with the central spot S0 is first brought to pass through each welding point on the welding line 80. The central spot S0 is then brought to pass through the welding point on the welding line 80 through which the intermediate part between the outer edge spots S11, S12 and the outer edge spots S21, S22 already having passed. In the positive longitudinal scan control, the outer edge spots S11, S12, S21, S22 are also formed frontward of the central spot S0 in the scan direction of the laser beam. In addition, in the positive longitudinal scan control, the outer edge spots S11, S12 are formed on the case body 10, and the outer edge spots S21, S22 are formed on the sealing plate 20. Accordingly, in every straight section, it is configured to prevent occurrence of the laser-passing of the laser beam regarding the irradiation pattern P.

In the positive short-length scan control of the present embodiment, the intermediate part between each two adjacent first and second outer edge spots among the outer edge spots that respectively form apexes of a rectangle surrounding the central spot S0 is brought to pass through the welding point on the welding line 80. The central spot S0 is then brought to pass through the welding point on the welding line 80 through which the intermediate part of the first and the second outer edge spots has already passed. Subsequently, the intermediate part between the third and the fourth outer edge spots other than the first and the second outer edge spots among the outer edge spots that respectively form the apexes of the rectangle is brought to pass through the welding point on the welding line 80 through which the central spot S0 has already passed. Specifically, in the positive short-length scan control, the intermediate part between the outer edge spots S11, S12 of the first outer edge spot and the outer edge spots S41, S42 of the second outer edge spot is first brought to pass through the welding point on the welding line 80. The central spot S0 is then brought to pass through the welding point on the welding line 80 through which the intermediate part between the outer edge spots S11, S12 and the outer edge spots S41, S42 has already passed. Subsequently, the intermediate part between the outer edge spots S21, S22 that are the third outer edge spots and the outer edge spots S31, S32 that are the fourth outer edge spots is brought to pass through the welding point on the welding line 80 through which the central spot S0 has already passed. Specifically, in the positive short-length scan control, the outer edge spots S11, S12, S41, S42 are formed at frontward positions of the central spot S0, and the outer edge spots S21, S22, S31, S32 are formed at rearward positions of the central spot S0. Furthermore, the outer edge spots S31, S32 are formed on a part of the case body 10 located rearward of the central spot S0, and the outer edge spots S21, S22 are formed on a part of the sealing plate 20 located rearward of the central spot S0, respectively.

Through this configuration, in the positive short-length scan control, it is possible to suppress rapid decrease in temperature of the case body 10 located rearward of the central spot S0 by the outer edge spots S31, S32. It is also possible to suppress rapid decrease in temperature of the sealing plate 20 located rearward of the central spot S0 by the outer edge spots S21, S22. Accordingly, in the positive short-length scan control, by suppressing the rapid decrease in temperature of the molten portion formed after the central spot S0 passes, it is possible to carry out the laser beam scan while suppressing generation of cracks or the like. In other words, it is possible to suppress occurrence of the laser-passing by using the outer edge spots located frontward of the central spot S0, and also suppress generation of cracks or the like by using the outer edge spots located rearward of the central spot S0.

The positive longitudinal scan control, the negative short-length scan control, and the negative longitudinal scan control that are the scan control in the other straight sections are carried out in the same manner as that in above positive short-length scan control. Specifically, for example, in the positive longitudinal scan control, the intermediate part between the outer edge spots S11, S12 that are the first outer edge spot and the outer edge spots S21, S22 that are the second outer edge spot is first brought to pass through each welding point on the welding line 80. The central spot S0 is then brought to pass through the welding point on the welding line 80 through which the intermediate part of the outer edge spots S11, S12 and the outer edge spots S21, S22 has already passed. Subsequently, the intermediate part between the outer edge spots S31, S32 that are the third outer edge spots and the outer edge spots S41, S42 that are the fourth outer edge spots is brought to pass through the welding point on the welding line 80 through which the central spot S0 has already passed. Specifically, the outer edge spots S11, S12, S21, S22 are formed at frontward positions of the central spot S0, and the outer edge spots S31, S32, S41, S42, are formed at rearward positions of the central spot S0. Furthermore, the outer edge spots S41, S42 are formed on a part of the case body 10 rearward of the central spot S0, and the outer edge spots S31, S32 are formed on a part of the sealing plate 20 rearward of the central spot S0. Through this, in every straight section, it is configured to suppress the laser-passing of the laser beam regarding the irradiation pattern P as well as suppress rapid decrease in temperature of the molten portion, thus preventing generation of cracks or the like.

In the positive short-length scan control, the positive longitudinal scan control, the negative short-length scan control, and the negative longitudinal scan control of the present embodiment, as aforementioned, the sliding unit 140 is set at the slide position C, thereby irradiating the welding line 80 where the joined portion 30 is formed with the laser beam having a higher power density. Hence, it is possible to form the molten portion having a deeper depth in a shorter time. Consequently, it is possible to increase the scan speed of the laser beam in the positive short-length scan control, the positive longitudinal scan control, the negative short-length scan control, and the negative longitudinal scan control. Accordingly, it is possible to suppress generation of defects due to the laser-passing as well as carry out the laser welding in the joining step in a shorter time.

As shown in FIG. 12, in the curved section R1, the outer edge spot S12 located at a head position of the outer edge spot group SG in the scan direction of the laser beam passes across the gap G. In the curved section R1, as shown in a sectional view of FIG. 14, there is provided a supporting surface 12 at a downward position of the inner wall surface 13 of the opening 11 of the case body 10 in a manner as to protrude inward of the inner wall surface 13. The supporting surface 12 is a surface used for receiving an inner surface 22 of the sealing plate 20 fitted into the opening 11 of the case body 10.

In the curved section R1, even if the laser beam L regarding the outer edge spots S12 of the outer edge spot group SG enters the gap G, the laser beam L having entered irradiates the supporting surface 12 of the case body 10. Through this, in the present embodiment, in the curved section R1, it is also configured to prevent occurrence of the laser-passing of the laser beam regarding the irradiation pattern P.

The configuration is the same in the curved sections R2, R3, R4 other than the curved section R1. Superficially, in the curved sections R2, R3, R4, it is also configured that the outer edge spot located at the head of the outer edge spot group SG in the scan direction of the laser beam passes across the gap G. Hence, in each of the curved sections R2, R3, R4, as shown in a sectional view of FIG. 14, there is also provided the supporting surface 12 at a downward position of the inner wall surface 13 of the opening 11 of the case body 10 in a manner as to protrude inward of the inner wall surface 13. Through this, in the curved sections R2, R3, R4, it is also configured to prevent occurrence of the laser-passing of the laser beam regarding the irradiation pattern P.

No laser beam scan is carried out from the start of the joining control until the initial time passes, and the laser beam scan is started after the initial time passes. However, the laser beam scan may be started before the initial time passes.

However, while the sliding unit 140 is set at the slide position A, no central spot S0 is formed on the welding line 80, and thus a longer time tends to be required for forming the molten portion having a sufficient depth than the case in which the sliding unit 140 is set at the slide position C. Hence, if the laser beam scan is started before the initial time passes, the scan speed of the laser beam before the initial time passes may be slower than the scan speed after the initial time passes.

On the other hand, after the initial time passes and the sliding unit 140 is brought to slidingly move to the slide position C, the scan speed of the laser beam may be set to be faster than that before. This makes the time required for the joining control shorter. Specifically, in the welding apparatus 100, in order to carry out the joining control in a shorter time, while the sliding unit 140 is set at the slide position C, the scan speed of the laser beam may be set to be faster than the scan speed while the sliding unit 140 is set at the slide position A.

In addition, if the sliding unit 140 is controlled to slidingly move from the slide position A to the slide position C after the laser beam scan is started, the laser beam scan may once be stopped before the sliding movement, and the laser beam scan may be re-started after the sliding movement is completed. However, the sliding unit 140 may be controlled to slidingly move from the slide position A to the slide position C while the laser beam scan is carried out. If the laser beam scan is stopped, the time required for the joining control becomes longer by the time spent on stopping the scan. Hence, the incident point LP is changed while the laser beam scan is carried out at the same time, thereby reducing the time required for the joining control.

Figure 14:
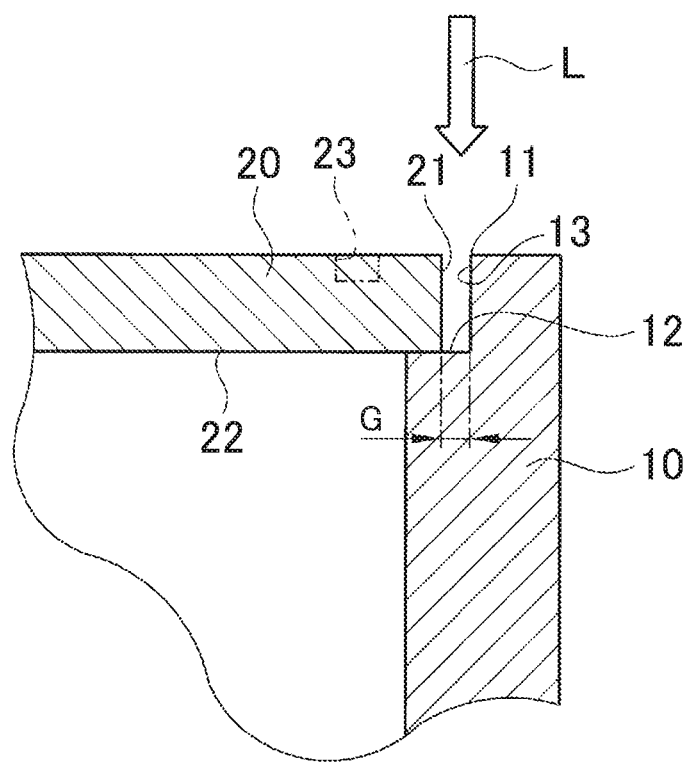
FIG. 14 is a sectional view of a curved section before the joining control is carried out.

In the present embodiment, no supporting surface 12 as shown in the sectional view of FIG. 14 is required to any part in every straight section of the case body 10. Accordingly, in the present embodiment, a case body having a simple form having no protrusion such as the supporting surface 12 in the straight sections may be used as the case body 10. For example, if the case body 10 is formed by using a mold, this mold can be produced at a lower cost.

If parts where the supporting surfaces 12 are formed and parts where no supporting surfaces 12 are formed are both present on the welding line 80, the joined portion 30 might not be evenly formed across the parts having the supporting surface 12 and the parts having no supporting surface 12. This is because a heat capacity becomes different between the parts having the supporting surfaces 12 and the parts having no supporting surfaces 12. This means that, in the present embodiment, it is possible to evenly form the joined portion 30 in the longitudinal sections X1, X2 and the short-length sections Y1, Y2 that are straight sections.

As indicated by alternate long and two short dashes lines in FIG. 13 and FIG. 14, a groove 23 may be formed on the upper surface of the sealing plate 20. The groove 23 may be formed on the upper surface of the sealing plate 20 along the side surface 21 by one round. This is because amount of heat provided to the sealing plate 20 by the irradiating laser beam in the joining control can be suppressed from being transferred to the inside of the sealing plate 20. Specifically, the vicinity of the side surface 21 of the sealing plate 20 can be appropriately heated and melted by the laser beam.

In the above description, the sliding unit 140 is set at the slide position A after the joining control is started until the initial time passes. However, the slide position of the sliding unit 140 until the initial time passes is not limited to the slide position A, but may be any slide position in which the incident point LP is located within the formation region 131. This is because, in the state in which the incident point LP is located within the formation region 131, the distribution profile of the power density of the irradiation pattern P of the laser beam becomes the same as that in the state in which the sliding unit 140 is located at the slide position A.

In the above description, after the initial time passes, the sliding unit 140 is set at the slide position C. However, the slide position of the sliding unit 140 after the initial time passes is not limited to the slide position C, but may be any slide position within a range in which the incident point LP overlaps the boundary 133. If there is any other slide position more preferable for the distribution profile of the power density of the irradiation pattern P formed than the slide position C, it is preferable to set the sliding unit 140 at the slide position.

The joining control may be executed with the case body 10 fixed. This is because the case body 10 is fixed so as to accurately carry out the laser beam scan along the welding line 80. The case body 10 can be fixed by holding the outer side surfaces of the case body 10 from the X axis direction and Y axis direction in FIG. 11.

In the welding apparatus 100 of the present embodiment, as the diffractive optical element 130, one that includes the formation region 131 and the non-formation region 132 is used. The distribution profile of the power density of the irradiation pattern P becomes different depending on the state in which the incident point LP is located in the formation region 131 or the state in which the incident point LP overlaps the boundary 133. Specifically, the present embodiment realizes the diffractive optical element 130 capable of varying the irradiation pattern P to have several different distribution profiles of the power densities while reducing the area where the diffraction grating is formed. Accordingly, it is possible to attain reduction in cost for the diffractive optical element 130.

When the sliding unit 140 is set at the slide position A, it is possible to radiate a radiated beam having a higher power density to the outer edge spot group SG of the outer edge region A2 rather than to the central spot S0 of the central region A1. When the sliding unit 140 is set at the slide position C, it is possible to radiate a radiated beam having a higher power density to the central spot S0 of the central region A1 rather than to the outer edge spot group SG of the outer edge region A2 in the irradiation position. This means that, by setting the sliding unit 140 at the slide position A, it is possible to increase melting amount in the outer edge region A2. On the other hand, by setting the sliding unit 140 at the slide position C, it is possible to increase melting amount in the central region A1. In the present embodiment, it is possible to carry out the laser welding by selectively increasing the melting amount in the central region A1 or increasing the melting amount in the outer edge region A2.

The present inventors have conducted the following test so as to verify advantageous effects of the joining control by using the welding apparatus 100 according to the present embodiment. The present test was conducted on Embodiment Example and Comparative Examples 1, 2 different from the present embodiment.

Specifically, in respective Embodiment Example and Comparative Examples 1, 2, the laser welding was carried out through respective different joining controls in the above short-length section Y1 of the battery 1. In Embodiment Example, the joining control was carried out such that the sliding unit 140 was set at the slide position A until the initial time passed, and the sliding unit 140 was set at the slide position C after the initial time passed. Specifically, in Embodiment Example, the joining control was carried out while at least one point in the incident point LP was moved across the boundary 133 by controlling the sliding unit 140. In the joining control in Embodiment Example, no laser beam scan was carried out until the initial time passed, and the laser beam scan was started after the initial time passed.

Meanwhile, in Comparative Example 1, the joining control was carried out such that the sliding unit 140 was set at the slide position A from the start to the completion of the control. In Comparative Example 2, the joining control was carried out such that the sliding unit 140 was set at the slide position C from the start to the completion of the control. In each of Comparative Examples 1, 2, the joining control was carried out while the incident point LP is fixed relative to the diffractive optical element 130 without slidingly moving the sliding unit 140. In each of Comparative Examples 1, 2, as with the Embodiment Example, no laser beam scan was carried out until the initial time passed, and the laser beam scan was started after the initial time passed.

Figure 15:
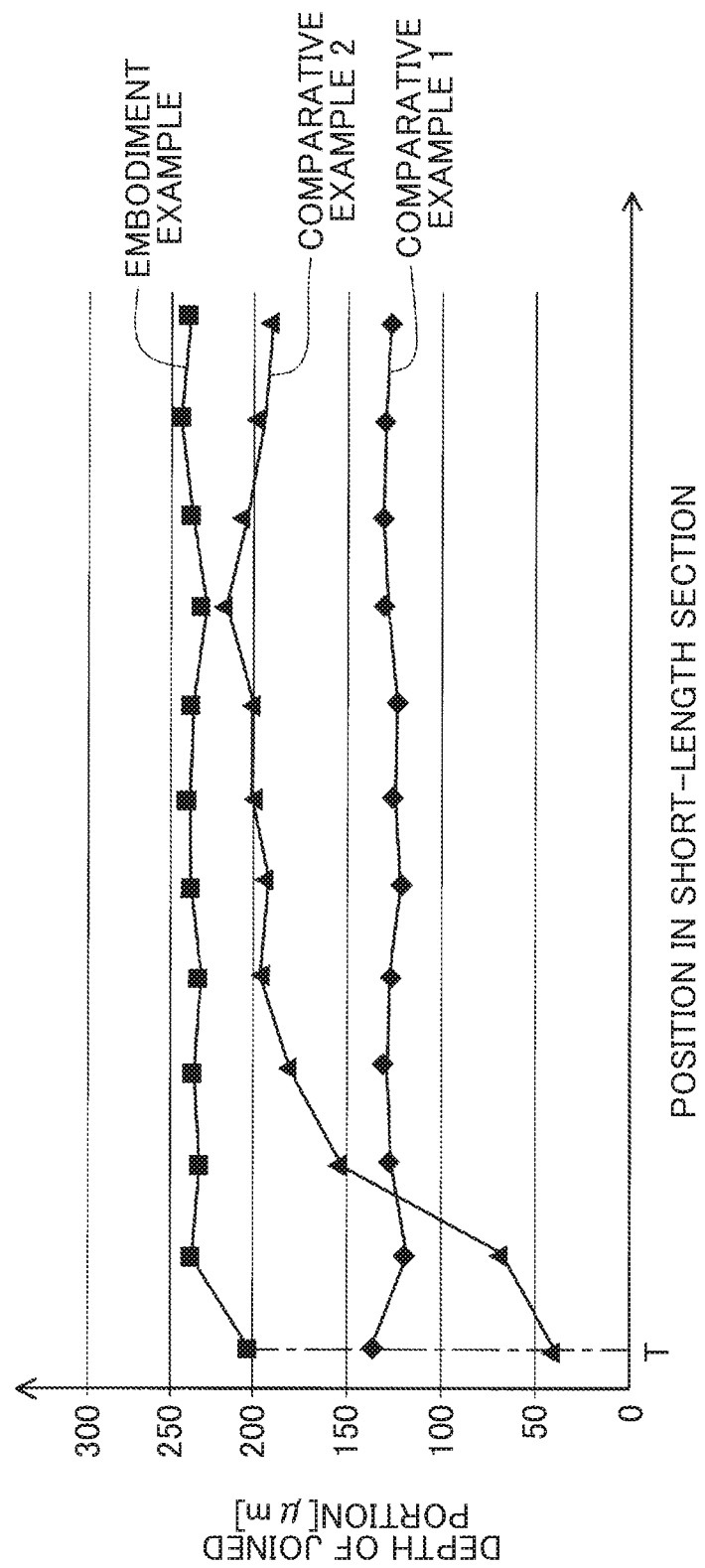
FIG. 15 is a drawing showing depths of the respective joined portions formed in Embodiment Examples and Comparative Examples.

FIG. 15 shows results of the present test. In FIG. 15, a horizontal axis indicates a location in the short-length section Y1, and a more rightward position in the horizontal axis indicates a more downstream in the laser beam scan direction. The start position T at which the joining control was started is indicated in the horizontal axis. A vertical axis indicates a depth of each joined portion formed by irradiation with the laser beam. The depth of each joined portion was obtained by observing a section of the joined portion formed after each joining control of Embodiment Example and the Comparative Examples 1, 2 was carried out.

As shown in FIG. 15, in Embodiment Example, the joined portion having a deeper depth than those in Comparative Examples 1, 2 was formed across the entire short-length section Y1 where the joining control was carried out. This means that in the Embodiment Example, at the initial time when the joining control was started, the vicinity of the welding line 80 could be melted down to a sufficient depth by the outer edge spot group SG. In addition, during the laser beam scan after the initial time passed, the laser beam scan was carried out in a manner as to form the central spot S0 having a higher power density on the welding line 80 that was the formation position of the joined portion.

In the Embodiment Example, as aforementioned, before the initial time passed, the sliding unit 140 was set at the slide position A so as to irradiate the gap G with no laser beam. Hence, the laser-passing at the gap G was suppressed before the initial time passed. As aforementioned, after the initial time passed, the molten portion was formed at a frontward position in the scan direction of the central spot S0 by the outer edge spot group SG. Hence, in the Embodiment Example, after the initial time passed, the laser-passing at the gap G was also suppressed.

To the contrary, it is found that, across the entire short-length section Y1, the joined portion formed in the Comparative Example 1 had a depth as shallow as approximately half of the depth of the joined portion of Embodiment Example. This is because, in Comparative Example 1, the welding line 80 that was the formation position of the joined portion was irradiated with no laser beam. In Comparative Example 1, the sliding unit 140 was set at the slide position A from the start to the completion of the joining control. Accordingly, in Comparative Example 1, the laser-passing at the gap G was suppressed.

In the Comparative Example 2, the joined portion had a shallower depth in the vicinity of the start position T. This is because the sliding unit 140 was set at the slide position C from the start of the joining control, and the power density at the outer edge spot group SG was lower, so that the vicinity of the welding line 80 was not sufficiently melted. In Comparative Example 2, the depth of the joined portion gradually became deeper as the laser beam scan progressed, and thereafter, the joined portion having substantially a constant depth was formed. It is found that the depth of the joined portion at the concerned position was not so deep as that in Embodiment Example, but was moderately deep. However, in Comparative Example 2, the sliding unit 140 was set at the slide position C even at the start time of the joining control. Hence, in Comparative Example 2, the laser-passing at the gap G occurred from the start of the joining control.

In the present test, it is verified that the laser-passing can be appropriately suppressed in the Embodiment Example according to the present embodiment. In the Embodiment Example according to the present embodiment, the joined portion having a deeper depth than those in both Comparative Examples 1, 2 was formed across the entire short-length section Y1 in which the joining control was carried out. Accordingly, in the present test, in Embodiment Example according to the present embodiment, it is verified that it is possible to increase the scan speed of the laser beam scan to be faster than those in both Comparative Examples 1, 2, and form the joined portion having a desired depth.

As described above in details, in the present embodiment, the joining step of joining the case body 10 and the sealing plate 20 together is carried out by using the welding apparatus 100. The welding apparatus 100 includes the diffractive optical element 130 and the sliding unit 140. The diffractive optical element 130 includes the formation region 131 and the non-formation region 132 that are adjacently disposed. The sliding unit 140 is controlled to change the position of the incident point LP of the incident beam Li entering the diffractive optical element 130, thereby varying the distribution profile of the power density of the irradiation pattern P. In this manner, it is possible to carry out the laser welding through a flexible control. While controlling the laser oscillator 110 to emit the laser beam, the controller 180 of the welding apparatus 100 controls the sliding unit 140 to slidingly move from the slide position A to the slide position C. Specifically, while the laser oscillator 110 emits the laser beam, at least one point in the incident point LP is moved across the boundary 133 by controlling the sliding unit 140. Through this, it is possible to suppress generation of defects as well as to form the joined portion in a shorter time.

Second Embodiment

The second embodiment will be described, hereinafter. In the present embodiment, different from the first embodiment, before the joining step, a tentative-fixing step of previously forming tentative-fixed portions on the welding line is carried out. A battery as a joining target is the same as that in the first embodiment. In the present embodiment, the following procedure will be taken: 1. Tentative-fixing step, and 2. Joining step.

"1. Tentative-fixing step" will be described, hereinafter. The present step is carried out prior to "2. Joining step". The present step is carried out while the sealing plate 20 is inserted in the opening 11 of the case body 10, as shown in FIG. 11. In the present step, a part of the welding line 80 is irradiated with the laser beam so as to melt a portion irradiated with the laser beam into a tentative-fixed portion. In the present embodiment, the tentative portions are formed at eight positions in total that are indicated by tentative positions K in FIG. 11. The case body 10 and the sealing plate 20 are partially joined together at the tentative positions K at which the tentative-fixed portions are formed.

In the present step, the aforementioned welding apparatus 100 is also used. In the present step, the controller 180 of the welding apparatus 100 is configured to carry out a tentative-fixing control. The controller 180 also controls the laser oscillator 110 to emit the laser beam. The controller 180 controls the Galvano scanner 150 in a manner as to irradiate each tentative position K with the laser beam. In the tentative-fixing control of the present embodiment, the controller 180 carries out no laser beam scan via the Galvano scanner 150 during the irradiation of the laser beam. However, the laser beam scan may be carried out in the vicinity of each tentative position K along the welding line 80 within a shorter range than the welding line 80.

In addition, in the tentative-fixing control, the controller 180 of the present embodiment controls the sliding unit 140 to be set at the slide position A. Specifically, in the present embodiment, during execution of the tentative-fixing control, the sliding unit 140 carries out no sliding movement.

The irradiation pattern P formed in the tentative-fixing control includes only the outer edge spot group SG as shown in FIG. 5 since the sliding unit 140 is set at the slide position A. Hence, in the tentative-fixing control, no central spot S0 is formed at the tentative position K. This means that, in the tentative-fixing control, it is configured to prevent occurrence of the laser-passing of the laser beam regarding the irradiation pattern P.

After "1. Tentative-fixing step", "2. Joining step" is carried out. In the present embodiment, "2. Joining step" is carried out in the same manner as that in the first embodiment. In other words, this step is carried out through the joining control to carry out the laser welding along the welding line 80 by one round using the welding apparatus 100. This means that, in the joining step of the present embodiment, it is also possible to suppress generation of defects due to the laser-passing or the like, and carry out the laser welding at the same time in a shorter time.

In the joining control, as aforementioned, the scan with the laser beam is carried out along the welding line 80 by one round. For example, in the case of using the sealing plate 20 having a thinner thickness and a smaller strength, if the joining step is carried out without carrying out the tentative-fixing step, the sealing plate 20 might be deformed while the laser beam scan is carried out along the welding line 80. This deformation of the sealing plate 20 is caused by local temperature increase due to laser beam irradiation, or because the sealing plate 20 is pulled by the joined portion 30 that is formed.

For example, if the sealing plate 20 becomes deformed, the side surface 21 of the sealing plate 20 comes apart from the inner wall surface 13 of the opening 11 of the case body 10 at the facing portion 70 where the joined portion 30 is not formed yet. If the side surface 21 of the sealing plate 20 comes apart from the inner wall surface 13 of the opening 11 of the case body 10, a molten portion is not properly formed by the irradiation with the laser beam at a position where the inner wall surface 13 deviates from the side surface 21; thus, joint defects might be caused at the position.

To cope with this, in the present embodiment, the tentative-fixing step is carried out before the joining step so as to partially join the case body 10 and the sealing plate 20 together. In the joining step, it is configured to suppress deviation between the inner wall surface 13 of the opening 11 of the case body 10 and the side surface 21 of the sealing plate 20 during the laser beam scan along the welding line 80 by one round. Through this configuration, it is possible to properly form the joined portion 30 in an annular shape along the welding line 80 by one round in the joining step.

FIG. 11 shows the tentative positions K at eight positions in total. However, the tentative positions K may be provided at any positions, and the number thereof may be any number. If there are the longitudinal sections X1, X2 as with the present embodiment, deviation between the inner wall surface 13 of the opening 11 of the case body 10 and the side surface 21 of the sealing plate 20 tends to occur at a position far from the start position T at which the joining control is started. Hence, the plural tentative positions K may be provided in the longitudinal sections X1, X2.

In the present embodiment, the welding apparatus 100 may be used in the tentative-fixing step in addition to the joining step. In other words, the tentative-fixing step and the joining step can be carried out by controlling the single welding apparatus 100 to execute the tentative-fixing control and the joining control. This is because the welding apparatus 100 is capable of carrying out the laser welding through the flexible control. Furthermore, it is unnecessary to provide an additional apparatus to carry out the tentative-fixing step.

Figure 16:
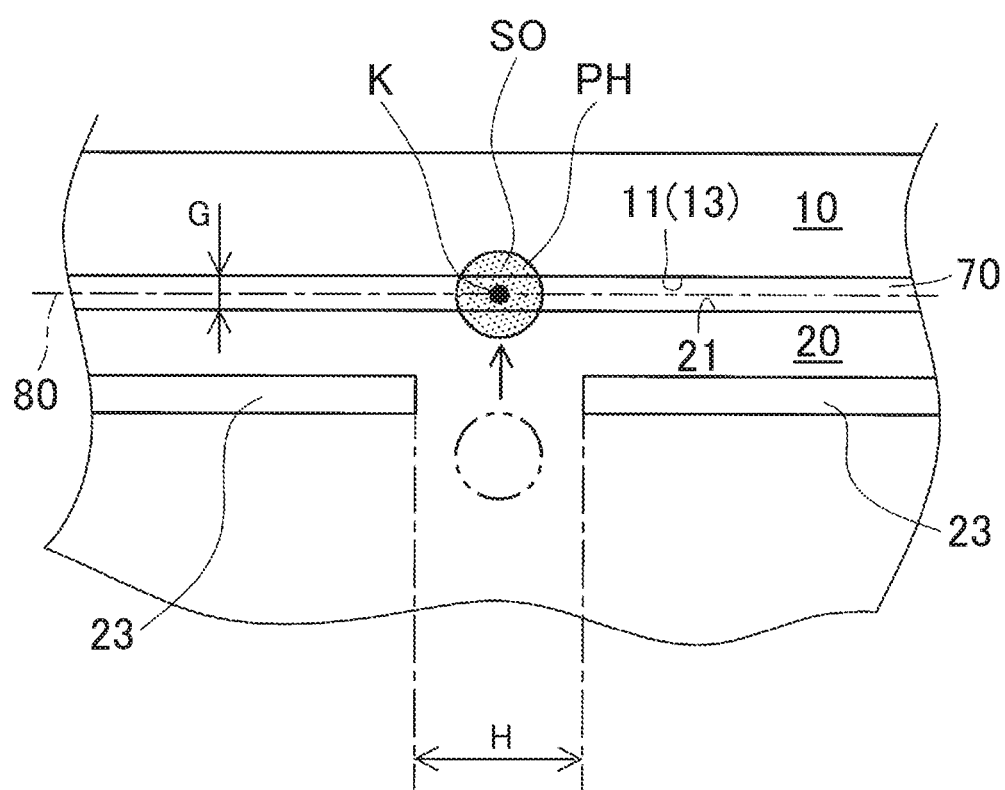
FIG. 16 is a drawing explaining how a tentative-fixed portion is formed by using only a single spot, which is different from the embodiment.

For example, as shown in a plan view of FIG. 16, if the tentative-fixing step is carried out by using an irradiation pattern PH having only the central spot S0, it is impossible to irradiate the tentative position K with the laser beam regarding the irradiation pattern PH at the start time of this irradiation. This is because, at the start time of the irradiation with the laser beam, there exist the gap G in the tentative position K.

Hence, if the irradiation pattern PH is used, as shown by an alternate long and two short dashes line in FIG. 16, at the start time of the irradiation with the laser beam, the laser beam having the irradiation pattern PH should be applied onto the sealing plate 20, for example. After the sealing plate 20 becomes melted, and the molten portion charges the gap G, the laser beam having the irradiation pattern PH should be moved to the tentative position K so as to melt the vicinity of this tentative position K of the case body 10 as well. However, in this case, it is impossible to melt the vicinity of each tentative position K of the case body 10 until the molten portion of the sealing plate 20 charges the gap G; consequently, it takes a longer time for the tentative-fixing step.

To the contrary, in the tentative-fixing step carried out through the tentative-fixing control by using the welding apparatus 100 of the present embodiment, it is possible to irradiate each tentative position K with the laser beam at the start time of the irradiation. This is because the irradiation pattern P as shown in FIG. 5 used in the tentative-fixing control is configured by only the outer edge spot group SG, so that no laser-passing is caused even if the tentative position K is irradiated with the laser beam. It is possible to melt the vicinity of the tentative position K between the case body 10 and the sealing plate 20 by the laser beam having the irradiation pattern P applied to the tentative position K at the start time of the irradiation with laser beam. Hence, in the present embodiment, it is possible to carry out the tentative-fixing step in a shorter time.

As shown in FIG. 16, if the tentative-fixing step is carried out by using the laser beam having the irradiation pattern PH configured by only the central spot S0, it is impossible to form the groove 23 in the vicinity of each tentative position K; therefore, it is required to provide a section H where no groove 23 is formed. If the tentative-fixing step is carried out by using the laser beam having the irradiation pattern PH, as aforementioned, it is necessary to irradiate the sealing plate 20 with the laser beam having the irradiation pattern PH so as to melt the sealing plate 20 at the start time of the laser beam irradiation, and charge the gap G with this molten portion. Consequently, if the groove 23 is formed in the section H, amount of the molten portion of the sealing plate 20 melted by the laser beam having the irradiation pattern PH becomes smaller; thus it takes a longer time to charge the gap G at the tentative position K with the molten portion. It might be impossible to properly charge the gap G at the tentative position K if amount of the molten portion is too small.

In addition, if the section H in which no groove 23 is formed is provided, it might be impossible to evenly form the joined portion 30 during the joining control. Joint defects might be caused at a position corresponding to the above section H. This is because the section H has a different heat capacity from those in the other sections in which the groove 23 is formed.

To the contrary, in the tentative-fixing step carried out through the tentative-fixing control using the welding apparatus 100 of the present embodiment, the laser beam can be applied to the tentative position K at the start time of the laser beam irradiation, and thus it is unnecessary to provide the section H including no groove 23. Hence, the groove 23 can be formed on the sealing plate 20 by one round. Accordingly, it is possible to suppress joint defects as well as to evenly form the joined portion 30 without causing joint defects.

The tentative-fixing control may be carried out with the case body 10 fixed. In the present embodiment, the case body 10 may be held and fixed before the execution of the tentative-fixing control, and after the execution of the joining control, this fixation may be released. Both the tentative-fixing step and the joining step can be carried out at a time with this single holding.

In the above description, in the tentative-fixing control, the sliding unit 140 is set at the slide position A. However, the sliding unit 140 in the tentative-fixing control may be set not only at the slide position A, but also at any slide position within a range in which the incident point LP is located in the formation region 131. In the state in which the incident point LP is located in the formation region 131, the distribution profile of the power density of the irradiation pattern P of the irradiating laser beam becomes the same as that in the state in which the sliding unit 140 is set at the slide position A.

As aforementioned in details, in the present embodiment, in addition to the joining step, the tentative-fixing step is also carried out. In the tentative-fixing step, the welding apparatus 100 is also used, and the tentative-fixing step is carried out by allowing the welding apparatus 100 to carry out the tentative-fixing control. In the tentative-fixing control, the welding apparatus 100 controls the sliding unit 140 to be set at the slide position A, and each tentative position K is irradiated with the laser beam so as to form the tentative-fixed portion. Therefore, no laser-passing occurs in the tentative-fixing control. In addition, it is possible to reduce the time required for the tentative-fixing control. After the tentative-fixing step, the same joining step as that in the first embodiment is carried out through the joining control executed by the controller 180 of the welding apparatus 100. Accordingly, it is possible to suppress generation of defects in the joining control, and also form the joined portion 30 having a higher quality through the joining control.

Third Embodiment

The third embodiment will be described, hereinafter. In the present embodiment, different from the aforementioned embodiments, before the joining step, a gap-detecting step to detect a dimension of a gap between the inner wall surface of the opening of the case body and the side surface of the sealing plate on the welding line is carried out. The battery as a joining target in the joining step is the same as that in the first embodiment. The present embodiment is carried out in the following procedure: 1. Tentative-fixing step, 2. Gap-detecting step, and 3. Joining step.

In the present embodiment, the welding apparatus 100 is used in "1. Tentative-fixing step" and "3. Joining step". The welding apparatus 100 is controlled to execute the tentative-fixing control in "1. Tentative-fixing step", and execute the joining control in "3. Joining step". In the present embodiment, "1. Tentative-fixing step" is the same as that in the second embodiment. However, in the present embodiment, the joining control executed in "3. Joining step" is different from that in the aforementioned embodiments. "3. Joining step" of the present embodiment will be described later in details.

Figure 17:
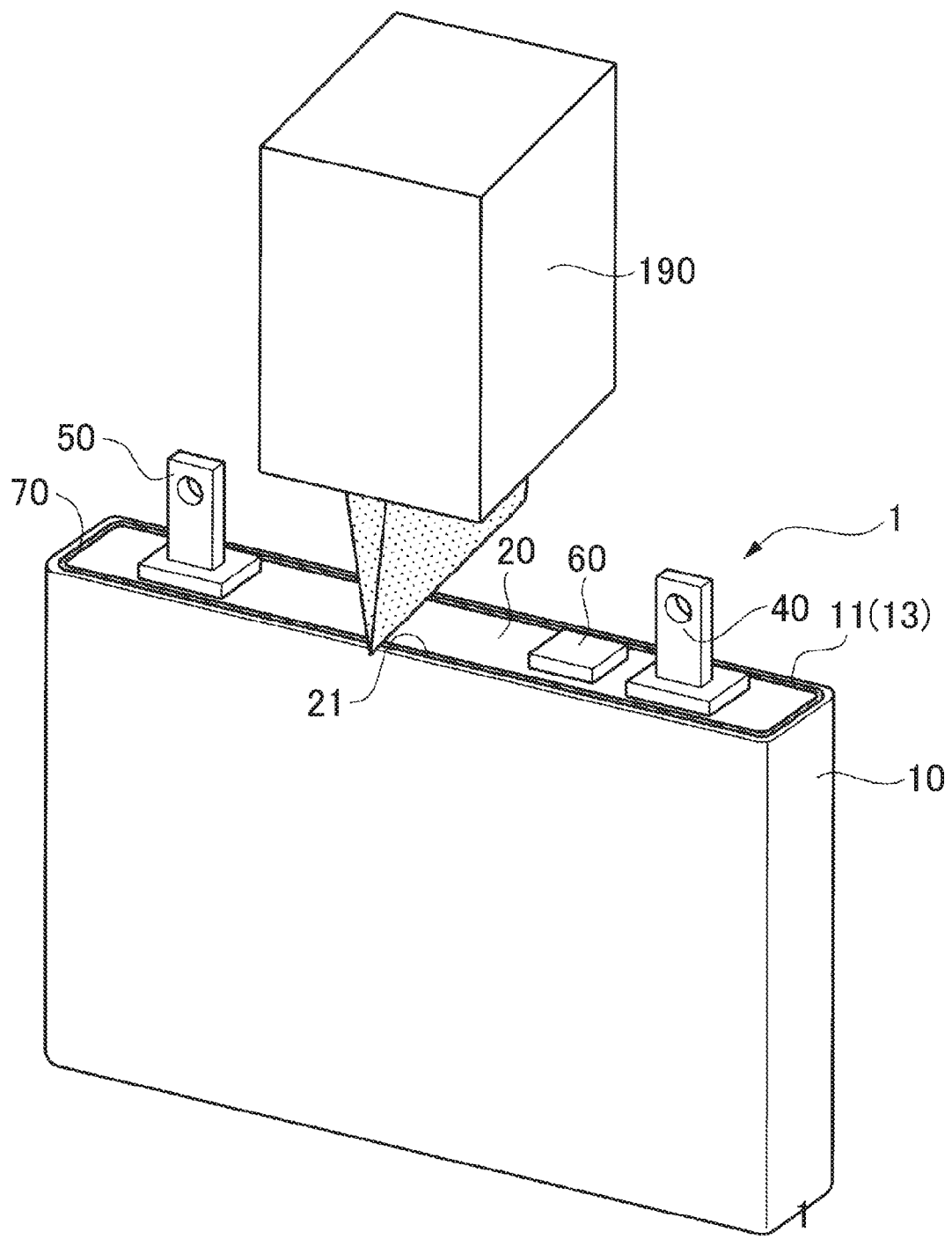
FIG. 17 is a drawing showing a measurement state in which a gap is measured by a laser-displacement sensor in a gap-detecting step of a third embodiment.

In the present embodiment, "2. Gap-detecting step" is carried out before "3. Joining step". "2. Gap-detecting step" will be described, hereinafter. In the present step, a laser-displacement sensor 190 as shown in FIG. 17 is used. The laser-displacement sensor 190 is attached to the welding apparatus 100 of each aforementioned embodiment. Specifically, the welding apparatus 100 of the present embodiment includes the laser-displacement sensor 190 in addition to the configurations described in the aforementioned embodiments. The battery 1 as shown in FIG. 17 is in a state in which no joined portion is formed yet. However, the tentative-fixed portions are already formed.

As shown in FIG. 17, measurement on the battery 1 is carried out by using the laser-displacement sensor 190. A measurement position by the laser-displacement sensor 190 is a center position in the longitudinal direction on the upper surfaces of the case body 10 and the sealing plate 20.

Figure 18:
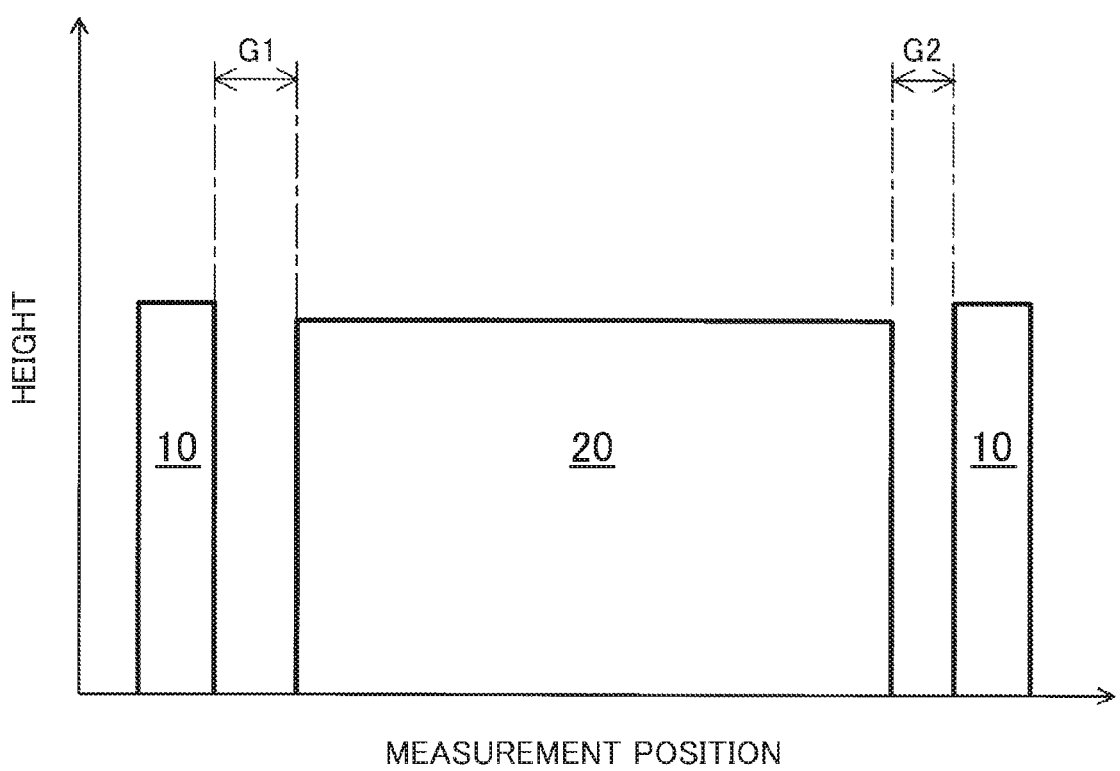
FIG. 18 is a drawing showing measurement results of gaps by using the laser-displacement sensor.

FIG. 18 shows measurement results on the battery 1 by the laser-displacement sensor 190. In FIG. 18, measurement positions are shown on a horizontal axis, and heights are shown on a vertical axis. As shown in FIG. 18, the measurement results represent respective heights up to the upper surfaces of the case body 10 and the sealing plate 20. Portions having lower levels than the respective upper surfaces of the case body 10 and the sealing plate 20 appear between the case body 10 and the sealing plate 20.

Hence, these lower-level portions between the case body 10 and the sealing plate 20 can be detected as gaps G1, G2, respectively. The gap G1 is a gap G at a center of the longitudinal section X1, and the gap G2 is a gap G at a center of the longitudinal section X2. Hence, the respective detected position of the gaps G1, G2 are corresponding to welding points located at respective centers of the longitudinal sections X1, X2 on the welding line 80. It is possible to detect respective dimensions of the gaps G1, G2 based on the measurement results as shown in FIG. 18.

The controller 180 of the welding apparatus 100 in "3. Joining step" first obtains respective detected dimensions of the gaps G1, G2 before the joining control is started. The controller 180 of the welding apparatus 100 of the present embodiment carries out the joining control depending on the obtained dimensions of the gaps G1, G2. Specifically, in the joining control, the controller 180 of the present embodiment carries out a laser control to vary the slide position of the sliding unit 140 depending on the obtained dimensions of the gaps G1, G2.

Figure 19:
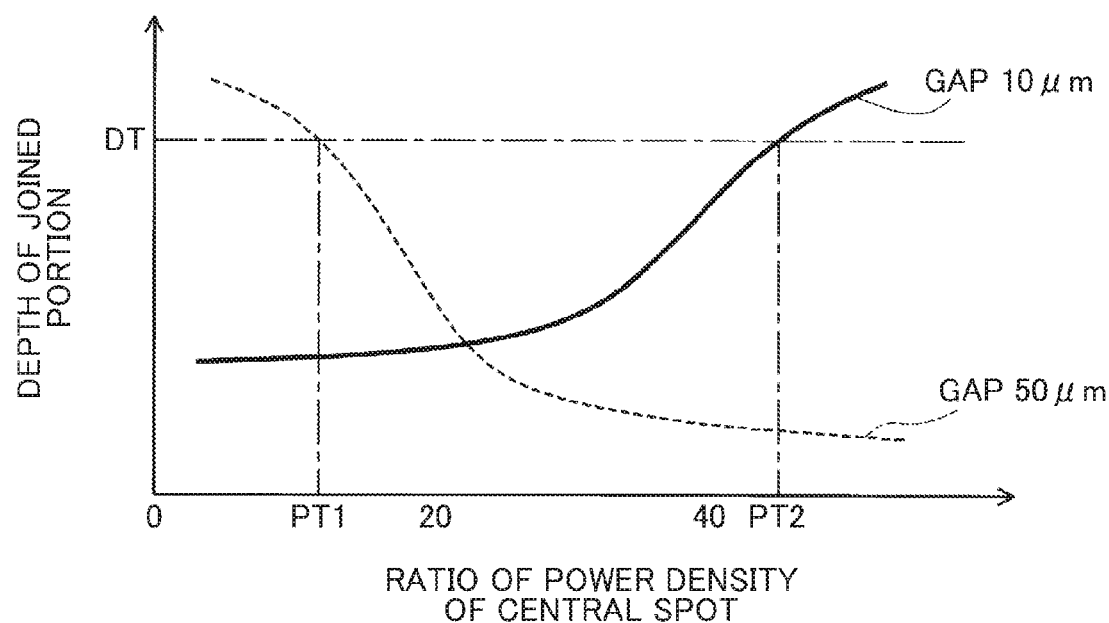
FIG. 19 is a drawing showing a relation between the ratio of the power density of a central spot and a depth of the joined portion for each gap.

Herein, there is a correlation between the dimension of the gap G and the slide position if the gap G and the slide position can properly form the joined portion. Description regarding the correlation will be provided, hereinafter. FIG. 19 shows a graph showing a relation between a ratio of the power density of the central spot S0 and a depth of a formed joined portion. In FIG. 19, a horizontal axis represents the ratio of the power density of the central spot S0, and a vertical axis represents the depth of the joined portion. At an end portion of leftward position of the horizontal axis, a ratio of the power density of the central spot S0 is shown when the slide position of the sliding unit 140 is located near the slide position A. At an end portion of rightward position in the horizontal axis, a ratio of the power density of the central spot S0 is shown when the slide position of the sliding unit 140 is located near the slide position D.

In FIG. 19, a graph of the gap G having a dimension of 10 μm is indicated by a solid line, and a graph of the gap G having a dimension of 50 μm is indicated by a broken line. These graphs were obtained by observing sections of respective joined portions between the case body 10 and the sealing plate 20 provided with the gaps G having the respective dimensions on the welding line 80, and the joined portions were formed by being irradiated with the laser beam for a certain time while the sliding unit 140 was set at different slide positions.

As shown in FIG. 19, it is found that, in the gap G of 10 μm, the joined portion having a deeper depth can be formed as the ratio of the power density of the central spot S0 is higher. Specifically, it is found that, in the gap G of 10 μm, the joined portion having a deeper depth is likely to be formed as the sliding unit 140 is set at a slide position closer to the slide position D.

On the other hand, it is found that, in the gap G of 50 μm, the joined portion having a deeper depth can be formed as the ratio of the power density of the central spot S0 is lower. Specifically, it is found that, in the gap G of 50 μm, the joined portion having a deeper depth is likely to be formed as the sliding unit 140 is set at a slide position closer to the slide position A.

FIG. 19 shows a depth DT of the joint portion. The depth DT is a depth of the joined portion that is required for properly joining the case body 10 and the sealing plate 20 together. Specifically, it is found that, in the gap G of 10 μm, in order to properly form the joined portion, it is preferable to form the irradiation pattern P having a ratio of a power density of the central spot S0 equal to a ratio of PT2 or more represented on the horizontal axis. Hence, the ratio of the power density of the central spot S0 may be defined to be the ratio PT2 or more so as to form the proper joined portion if the gap G is 10 μm.

On the other hand, it is found that, in the gap G of 50 μm, in order to properly form the joined portion, it is preferable to form the irradiation pattern P having a ratio of a power density of the central spot S0 equal to a ratio of PT1 or less represented on the horizontal axis. Hence, the ratio of the power density of the central spot S0 may be defined to be the ratio PT1 or less so as to form the proper joined portion if the gap G is 50 μm.

By obtaining graphs as with FIG. 19 for respective gaps G having different dimensions, it is possible to define the ratio of the power density of the central spot S0 for each gap G having each dimension that can properly form the joined portion.

Figure 20:
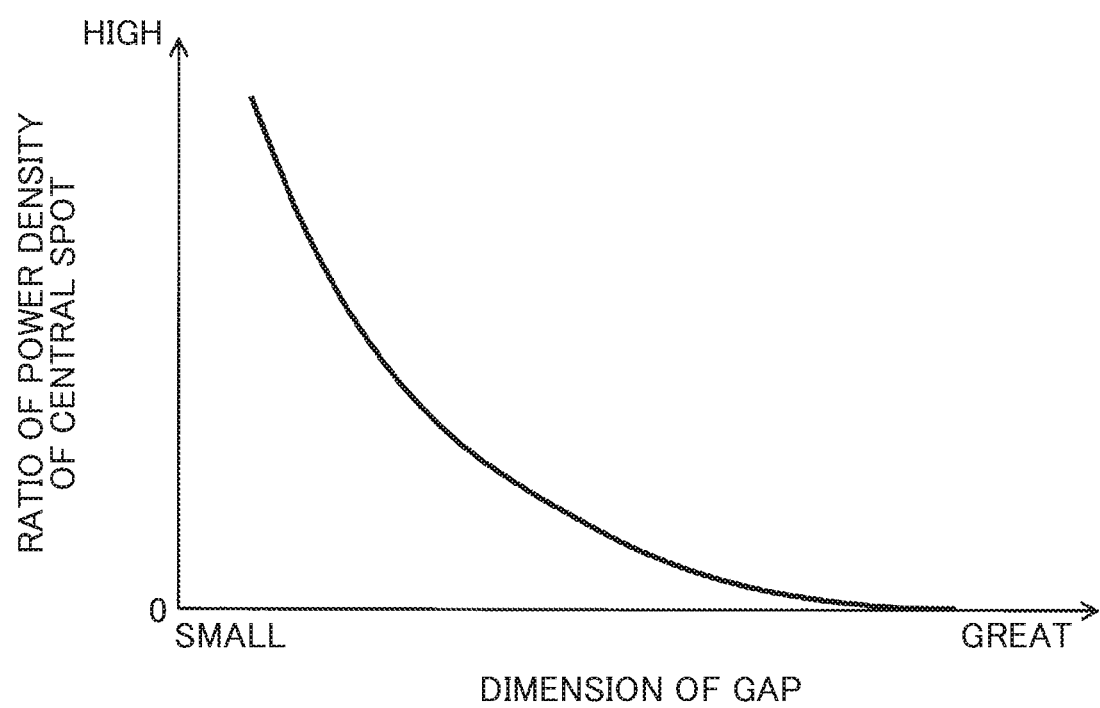
FIG. 20 is a drawing showing a relation between each gap and the ratio of the power density of the central spot so as to form a proper joined portion.

FIG. 20 shows a graph of a relation between the gap G and the ratio of the power density of the central spot S0. FIG. 20 shows the graph formed to define the ratio of the power density of the central spot S0 that can properly form the joined portion depending on each dimension of the gap G.

As shown in FIG. 20, the ratio of the power density of the central spot S0 that can properly form the joined portion becomes smaller as the gap G is greater. Based on this, it is found that it is preferable to set the sliding unit 140 at a slide position closer to the slide position A as the gap G is greater. Specifically, it is found that it is preferable to set the position of the incident point LP at a position closer to the formation region 131 as the gap G is greater. In other words, it is found that it is preferable to set an area of the incident point LP overlapping the formation region 131 of the diffractive optical element 130 to be greater as the gap G is greater. This relation is referred to as a gap-slide position relation.

In the laser control, the controller 180 of the present embodiment controls the sliding unit 140 based on the above gap-slide position relation. Hence, the controller 180 of the present embodiment includes a memory unit 181 as indicated by the alternate long and two short dashed line in FIG. 2, and stores a gap-slide position table as shown in FIG. 21 on the memory unit 181.

Figure 21:
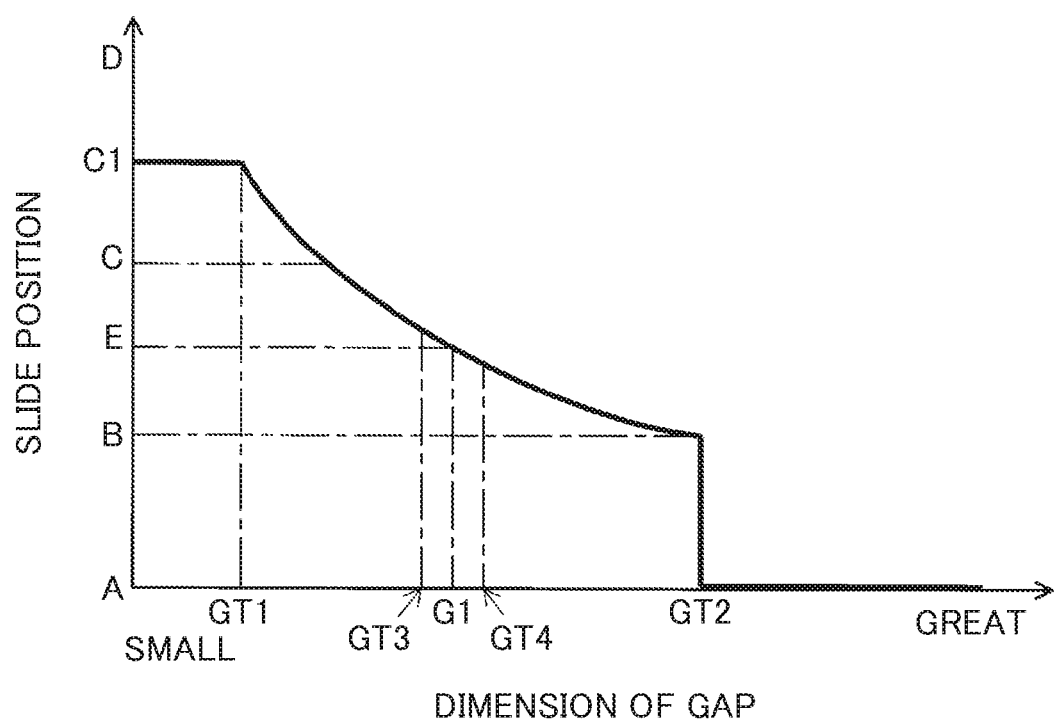
FIG. 21 is a drawing showing a gap-slide position table.

The gap-slide position table as shown in FIG. 21 is generated based on the aforementioned gap-slide position relation. Specifically, the gap-slide position table as shown in FIG. 21 is defined such that the slide position of the sliding unit 140 is closer to the slide position A as the gap G is greater.

The gap-slide position table as shown in FIG. 21 is defined such that if the gap G is equal to a gap GT1 or less represented on the horizontal axis, the slide position is set at a slide position C1. If the sliding unit 140 is set at the slide position D, the irradiation pattern P is configured by only the central spot S0, and thus the laser-passing might be caused even if the gap G is small. Hence, if the gap G is equal to the gap GT1 or less, the sliding unit 140 is set at the slide position C1, thereby charging the gap G frontward of the central spot S0 with the molten portion formed by the outer edge spot group SG.

The gap-slide position table as shown in FIG. 21 is generated such that if the gap G is equal to a gap GT2 or more represented on the horizontal axis, the slide position is set at the slide position A. As aforementioned, within a range from the slide position A to the slide position B where the incident point LP is located within the formation region 131, the incident beam Li enters only the formation region 131 of the diffractive optical element 130. Hence, even if the slide position of the sliding unit 140 is changed within the range where the incident point LP is located within the formation region 131, the irradiation pattern P of the irradiating laser beam becomes the same.

In the joining step in the present embodiment, the controller 180 obtains respective dimensions of the gaps G1, G2 detected in the gap-detecting step before the execution of the joining control. However, the gaps G1, G2 detected in the present embodiment are the respective gaps G in the longitudinal sections X1, X2. Hence, in the short-length sections Y1, Y2 and the curved sections R1, R2, R3, R4 other than the longitudinal sections X1, X2, the joining control is carried out in the same manner as that in the first embodiment. The joining control in the present embodiment is also the same as that in the aforementioned embodiments other than the laser control carried out in the longitudinal sections X1, X2.

Specifically, in the present embodiment, at the start time of the joining control, the controller 180 controls the sliding unit 140 to be set at the slide position A, and as shown in FIG. 12, only the outer edge spot group SG is formed at the start position T. After the initial time passes, the sliding unit 140 is controlled to slidingly move from the slide position A to the slide position C so as to start the positive short-length scan control to scan the short-length section Y1 with the laser beam. Subsequent to the positive short-length scan control, the first curved-scanning control to scan the curved section R1 with the laser beam is carries out.

When the first curved-scanning control is completed, the controller 180 carries out the laser control. Specifically, in the laser control, the sliding unit 140 is controlled to slidingly move from the slide position C to a slide position corresponding to the gap G1. By the completion of the first curved-scanning control, the controller 180 refers to the gap-slide position table (FIG. 21) based on the gap G1, and defines the slide position corresponding to the gap G1.

Through the laser control, the sliding unit 140 is controlled to be set at the slide position corresponding to gap G1, and the longitudinal section X1 is scanned with the laser beam through the positive longitudinal scan control at the same time. In this manner, the proper joined portion 30 can be formed in the longitudinal section X1. This is because it is possible to set the power density of the central spot S0 in the irradiation pattern P to be a power density sufficient for forming the proper joined portion at a position corresponding to the dimension of the gap G1, and carry out the positive longitudinal scan control at the same time. If the slide position defined based on the gap G1 with reference to the gap-slide position table is the slide position C, it is naturally unnecessary to control the sliding unit 140 to slidingly move in the laser control.

At the completion of the positive longitudinal scan control, the controller 180 controls the sliding unit 140 to slidingly move to the slide position C. In addition, while the sliding unit 140 is controlled to be set at the slide position C, the second curved-scanning control, the negative short-length scan control, and the third curved-scanning control are respectively carried out so as to scan the curved section R2, the short-length section Y2, and the curved section R3 with the laser beam, respectively.

At the completion of the third curved-scanning control, the controller 180 carries out the laser control. At the completion of the third curved-scanning control, the sliding unit 140 is controlled to slidingly move from the slide position C to a sliding position corresponding to the gap G2. Hence, by the completion of the third curved-scanning control, the controller 180 refers to the gap-slide position table based on the gap G2 so as to define the slide position corresponding to the gap G2. Through the laser control, the sliding unit 140 is controlled to be set at the slide position corresponding to gap G2, and the longitudinal section X2 is scanned with the laser beam through the negative longitudinal scan control at the same time. Accordingly, the proper joined portion 30 can be formed in the longitudinal section X2 as with the longitudinal section X1.

At the completion of the negative longitudinal scan control, the controller 180 controls the sliding unit 140 to slidingly move to the slide position C. In addition, while the sliding unit 140 is controlled to be set at the slide position C, the fourth curved-scanning control and the positive short-length scan control are respectively carried out so as to scan the curved section R4 and the short-length section Y1 with the laser beam. When the scan control is carried out by one round to the start position T, the joining control is then completed.

Specifically, the welding apparatus 100 of the present embodiment includes the laser-displacement sensor 190 that detects the gaps G1, G2 for the respective welding points at the centers in the longitudinal sections X1, X2 on the welding line 80 and outputs the detection of the gaps G1, G2. In the laser control, the controller 180 refers to the gap-slide position table (FIG. 21) based on the gaps G1, G2 detected by the laser-displacement sensor 190 so as to define the respective slide positions. Specifically, the slide position is defined by considering plural gap threshold values for each gap G1, G2, determining whether each gap G1, G2 is equal to a certain gap threshold value or more and less than another certain gap threshold value represented by the horizontal axis of the gap-slide position table, and then defining a slide position corresponding to a slide position within a range of the above plural determined gap threshold values to which each gap G1, G2 belongs. For example, as shown in FIG. 21, if the gap G1 is within a range of a gap threshold value GT3 or more and less than a gap threshold value GT4, a slide position E corresponding to the range of the gap threshold value GT3 or more and less than the gap threshold value GT4 is determined. For example, in the distribution profile of the power density at the slide position E, the power density of central spot S0 is smaller, and the power density of the outer edge spot group SG is greater than those in the distribution profile of the power density at the slide position C corresponding to a slide position within a range of less than the gap threshold value GT3. For example, in the distribution profile of the power density at the slide position E, the power density of central spot S0 is greater, and the power density of the outer edge spot group SG is smaller than those in the distribution profile of the power density at the slide position A corresponding to a slide position within a range of the gap threshold value GT4 or more. Specifically, in the laser control, the controller 180 of the present embodiment controls the position of the incident point LP such that if the gap G is equal to a predetermined gap threshold value or more, the power density of the central spot S0 becomes smaller, and the power density of the outer edge spot group SG becomes greater than those in the case of having the gap G less than the predetermined gap threshold value. In other words, in the laser control, if the gap G is equal to a predetermined gap threshold value or more, the incident point LP is set at a position closer to the formation region 131 via the sliding unit 140 than that in the case of the gap G less than the gap threshold value. Through this configuration, if the gap G is equal to the predetermined gap threshold value or more, the area of the incident point LP overlapping the formation region 131 of the diffractive optical element 130 is set to be greater than that in the case of the gap G less than the gap threshold value.

To the contrary, in the laser control, the controller 180 controls the position of the incident point LP such that if the gap G is less than the predetermined gap threshold value, the power density of the central spot S0 becomes greater and the power density of the outer edge spot group SG becomes smaller than those in the case of the gap G equal to the predetermined gap threshold value or more. Specifically, in the laser control, if the gap G is less than the predetermined gap threshold value, the incident point LP is set at a position closer to the non-formation region 132 via the sliding unit 140 than that in the case of the gap G equal to the gap threshold value or more. Through this configuration, if the gap G is less than the predetermined gap threshold value, the area of the incident point LP overlapping the formation region 131 of the diffractive optical element 130 is set to be smaller than that in the case of the gap G equal to the gap threshold value or more. In this manner, the welding apparatus 100 is controlled to carry out the laser welding through the flexible control depending on the dimension of gap G.

In the present embodiment, in the above description, the laser control is carried out only in the longitudinal sections X1, X2. However, the laser control may also be carried out in the short-length sections Y1, Y2 other than the longitudinal sections X1, X2. The laser control is also carried out in each short-length section Y1, Y2 so as to form, in each short-length section Y1, Y2, the proper joined portion 30 by the laser beam having the irradiation pattern P of which distribution profile of the power density is formed depending on the dimension of each gap G. If the laser control is also carried out in the short-length sections Y1, Y2, the respective dimensions of the gaps G in the short-length sections Y1, Y2 may be detected in the gap-detecting step.

In the present embodiment, in the above description, in the gap-detecting step, the gap G at the center of each longitudinal section X1, X2 is detected. However, the detection position of the gap G in the gap-detecting step is not limited to the center. It should be noted that the gap G in each longitudinal section X1, X2 is most likely to vary at the center thereof. Hence, if it is desired to detect the gap G at one position in the longitudinal section X1, X2, the center may be used as a detecting position, as with the present embodiment.

In the present embodiment, the tentative-fixing step is not an essential step. This means that only the gap-detecting step and the joining step may be carried out. In the present embodiment, the gap-detecting step is carried out after the tentative-fixing step. This order may be reverse. After the tentative-fixing step, the case body 10 and the sealing plate 20 are fixed to each other via the tentative-fixed portions, so that the dimension of the gap G is prevented from varying. To the contrary, before the tentative-fixed portions are formed, the case body 10 and the sealing plate 20 are not fixed to each other, and thus the gap G might vary. In other words, if the gap-detecting step is carried out before the tentative-fixing step, the dimension of the gap G detected in the gap-detecting step might become different from the dimension of the gap G in the joining step. Accordingly, by carrying out the gap-detecting step after the tentative-fixing step, it is possible to carry out the gap-detecting step to detect the gap G fixed after the tentative-fixing step. Hence, in the present embodiment that carries out the gap-detecting step after the tentative-fixing step, it is possible to more properly form the joined portion 30.

In the present embodiment, the gap-detecting step is carried out by using the laser-displacement sensor 190. However, not limited to the laser-displacement sensor 190, the gap-detecting step may be carried out by using any other measurement equipment. Specifically, the gap-detecting step may be carried out by using a visual system, for example.

In the present embodiment, the laser control is carried out based on the gap-slide position table as shown in FIG. 21. However, if accuracy is not so strictly required for the ratio of the power density of the central spot S0, for example, the sliding unit 140 may be set at either the slide position A or the slide position C based on the obtained dimension of the gap G. Specifically, in the laser control, if the obtained dimension of the gap G is equal to the predetermined gap threshold value or more, the sliding unit 140 may be set at the slide position A, and if the obtained dimension of the gap G is less than the predetermined gap threshold value, the sliding unit 140 may be set at the slide position C. As the gap threshold value in this case, the threshold value of the gap GT2 as represented on the horizontal axis of the gap-slide position table as shown in FIG. 21 may be used, for example.

In the present embodiment, as aforementioned, the laser control is carried out by only moving the position of the incident point LP on the plane of the diffractive optical element 130 through the slide movement of the sliding unit 140. In the laser control, in addition to the slide movement of the sliding unit 140, a laser output value that is an output value of the laser beam emitted from the laser oscillator 110 may be changed.

If the laser control is carried out by changing the slide position of the sliding unit 140 as well as controlling the laser output value of the laser oscillator 110, the slide position and the laser output value by which the proper joined portion 30 can be formed depending on the dimension of the gap G may previously be obtained. In addition, a laser table regarding the slide position and the laser output value depending on the dimension of the gap G may be formed, and this laser table may be stored on the memory unit 181 of the controller 180. In the laser control, the laser table may be referred to depending on the dimension of the gap G obtained in the gap-detecting step, the slide position and the laser output value that are suitable to the detected dimension of the gap G are defined, and the joining step is carried out based on the slide position and the laser output value.

As aforementioned, the laser control is carried out by changing the laser output value of the laser oscillator 110, thereby increasing or decreasing the power density of each spot in the irradiation pattern P as a whole. In other words, it is possible to carry out the laser welding through the more flexible control. For example, it is possible to carry out the joining control in a further shorter time by increasing the laser output value. It is also possible to readily adjust the depth of the joined portion to be formed by increasing or decreasing the laser output value. Therefore, the relation between the dimension of the gap G and the slide position in the laser table is not always required to satisfy the aforementioned gap-slide position relation.

As aforementioned in details, in the present embodiment, the gap-detecting step to detect the gap G between the case body 10 and the sealing plate 20 on the welding line 80 is carried out before the joining step. In the gap-detecting step, the gap G is detected by the laser-displacement sensor 190. In the joining step, the controller 180 of the welding apparatus 100 executes the joining control while executing the laser control to set the sliding unit 140 at the slide position depending on the dimension of the gap G.

Fourth Embodiment

The fourth embodiment will be described, hereinafter. In the present embodiment, as with the third embodiment, the gap-detecting step to detect the dimension of the gap between the inner wall surface of the opening of the case body and the side surface of the sealing plate on the welding line is carried out. However, in the present embodiment, the joining step is carried out while the gap-detecting step is carried out, which is different from the third embodiment in which the gap-detecting step is carried out prior to the joining step.

Figure 22:
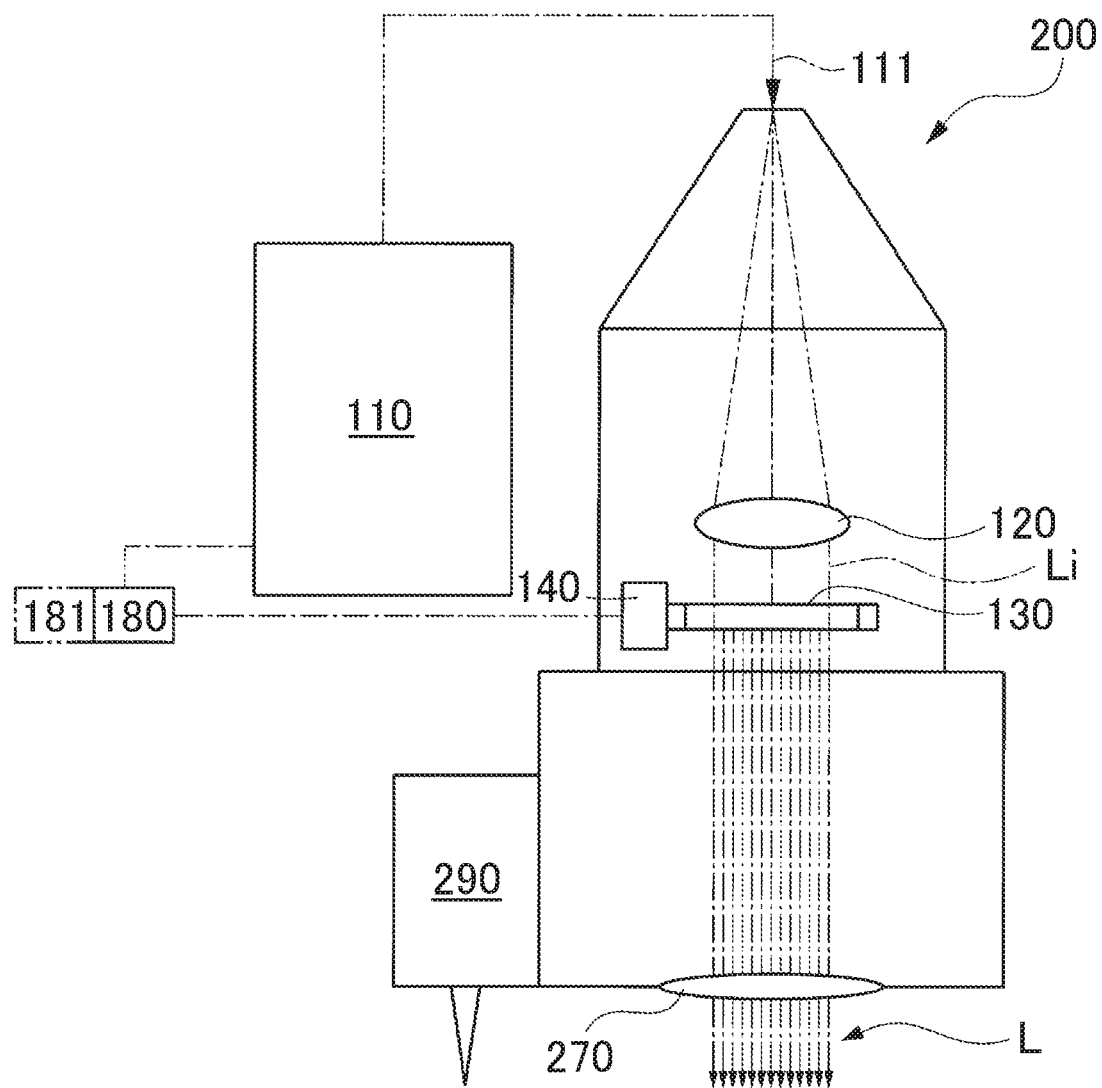
FIG. 22 is a schematic drawing of a configuration of the welding apparatus according to a fourth embodiment.

FIG. 22 shows a welding apparatus 200 according to the present embodiment. The welding apparatus 200 includes the laser oscillator 110, the collimating lens 120, the diffractive optical element 130, and the controller 180 that are the same as those of the welding apparatus 100 according to the first embodiment. The welding apparatus 200 of the present embodiment includes a condensing lens 270 located downstream of the diffractive optical element 130 in the optical path of the laser beam. The controller 180 of the present embodiment also includes the memory unit 181 as indicated by the alternate long and two short dashed line in FIG. 22, and the gap-slide position table as indicated in FIG. 21 is stored on the memory unit 181. The greatest difference of the welding apparatus 200 from the welding apparatus 100 of the aforementioned embodiments is that the welding apparatus 200 includes no Galvano scanner 150, but includes a laser-displacement sensor 290 on the side surface.

Figure 23:
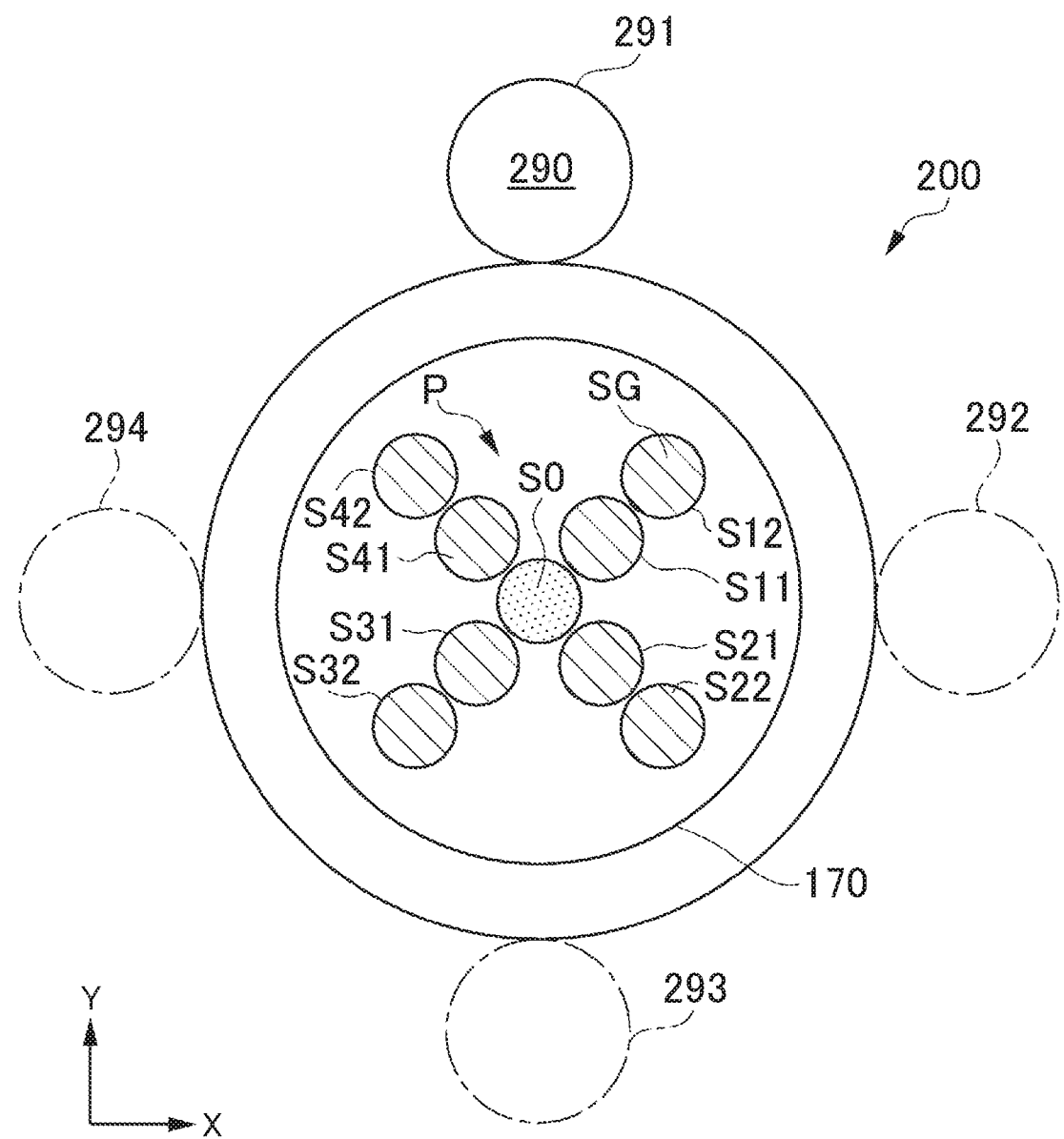
FIG. 23 is a plan view of the welding apparatus according to the fourth embodiment.

FIG. 23 is a plan view of the welding apparatus 200. As shown in FIG. 23, the laser-displacement sensor 290 of the welding apparatus 200 is rotatably movable around the central spot S0 of the irradiation pattern P formed by the welding apparatus 200. Specifically, the laser-displacement sensor 290 is movable by the rotation from a first position 291 as indicated by a solid line, a second position 292, a third position 293, and a fourth position 294 that are respectively indicated by alternate long and two short dashed lines.

In the present embodiment, the welding apparatus 200 is fixed to a front end of a robot arm so as to be movable relative to the battery 1. Specifically, the controller 180 of the welding apparatus 200 of the present embodiment is capable of moving the irradiation pattern P along with the welding apparatus 200 along the welding line 80 during execution of the scan control, which is different from the first embodiment. Specifically, the controller 180 of the present embodiment carries out the positive short-length scan control, the first curved-scanning control, the positive longitudinal scan control, the second curved-scanning control, the negative short-length scan control, the third curved-scanning control, the negative longitudinal scan control, the fourth curved-scanning control, and the positive short-length scan control in this order by movement of the robot arm.

The controller 180 of the present embodiment carries out the laser beam scan along the short-length section Y1 in the positive direction of the Y axis as shown in FIG. 23 in the positive short-length scan control. The controller 180 carries out the laser beam scan along the longitudinal section X1 in the positive direction of the X axis as shown in FIG. 23 in the positive longitudinal scan control. In the negative short-length scan control, the controller 180 carries out the laser beam scan along the short-length section Y2 in the negative direction of the Y axis as shown in FIG. 23. In the negative longitudinal scan control, the controller 180 carries out the laser beam scan along the longitudinal section X2 in the negative direction of the X axis as shown in FIG. 23.

The controller 180 of the present embodiment controls a rotational position of the laser-displacement sensor 290 in the positive short-length scan control, the positive longitudinal scan control, the negative short-length scan control, and the negative longitudinal scan control. Specifically, during the positive short-length scan control, the rotational position of the laser-displacement sensor 290 is set at the first position 291. During the positive longitudinal scan control, the rotational position of the laser-displacement sensor 290 is set at the second position 292. During the negative short-length scan control, the rotational position of the laser-displacement sensor 290 is set at the third position 293. During the negative longitudinal scan control, the rotational position of the laser-displacement sensor 290 is set at the fourth position 294.

The controller 180 of the present embodiment sequentially controls the laser-displacement sensor 290 to detect the dimension of the gap G respectively in the positive short-length scan control, the positive longitudinal scan control, the negative short-length scan control, and the negative longitudinal scan control. In other words, the detection of the dimension of the gap G frontward of the irradiation pattern P is always carried out in the positive short-length scan control, the positive longitudinal scan control, the negative short-length scan control, and the negative longitudinal scan control, respectively. The detection of the gap G by the laser-displacement sensor 290 is carried out with predetermined constant intervals. Hence, the detection of the dimension of the gap G by the laser-displacement sensor 290 is carried out at plural welding points on the welding line 80.

The controller 180 of the present embodiment detects the gap G frontward of the irradiation pattern P, and carries out the laser control based on the detected dimension of the gap G at the same time. The configuration of the laser control is the same as that of the third embodiment. Specifically, in the laser control, the slide position of the sliding unit 140 is controlled based on the gap-slide position table.

Accordingly, it is possible to carry out the joining control while carrying out the laser control through the longitudinal sections X1, X2 and the short-length sections Y1, Y2. Specifically, it is possible to carry out the laser welding through the flexible control. Accordingly, the welding apparatus 200 of the present embodiment is capable of forming the proper joined portion 30 through the longitudinal sections X1, X2 and the short-length sections Y1, Y2 that are the straight sections. Even if variation of the gap G occurs in the middle of any of the straight sections, it is possible to carry out the laser welding while controlling the position of the sliding unit 140 to be set at a slide position depending on the dimension of the varied gap G.

As aforementioned, in the present embodiment, the joining step is carried out while carrying out the gap-detecting step to detect the gap G between the case body 10 and the sealing plate 20 on the welding line 80. The welding apparatus 200 carries out the detection of the gap G frontward of the irradiation pattern P, and at the same time, carries out the joining control while carrying out the laser control to control the sliding unit 140 to be set at the slide position depending on the dimension of the gap G.

Fifth Embodiment

The fifth embodiment will be described, hereinafter. In the present embodiment, the configuration of the welding apparatus and others are the same as that of the second embodiment. As with the second embodiment, in the present embodiment, the tentative-fixing step is also carried out. However, in the present embodiment, the joining control and the scan control are started from the longitudinal section, which is different from the second embodiment in which the joining control and the scan control are started from the short-length section.

Figure 24:
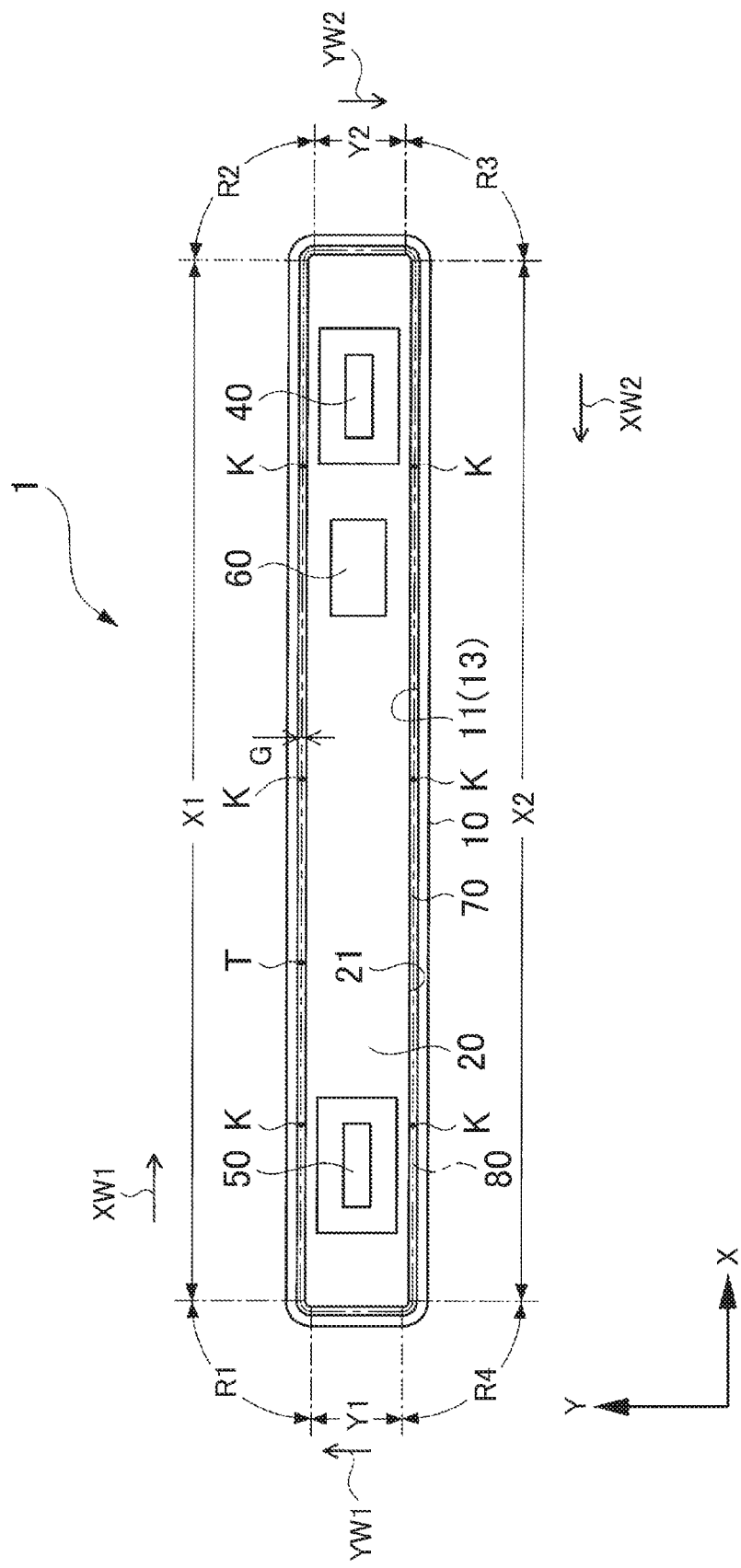
FIG. 24 is a plan view of the battery used for explaining a laser beam scan control in a joining control according to the fourth embodiment.

The present embodiment will be described with reference to FIG. 24. FIG. 24 is a plan view of the battery 1 as with FIG. 11. However, in FIG. 24, the arrangement of the start position T and the tentative positions K is different from that in FIG. 11. Specifically, in the present embodiment, the position of the start position T is set in the longitudinal section X1 as shown in FIG. 24. In the present embodiment, the number of the tentative positions K is six positions that are less than eight positions in FIG. 11, as shown in FIG. 24.

In the present embodiment, as with the second embodiment, the tentative-fixing step and the joining step are carried out in this order. This means that the tentative-fixing step is carried out first. The tentative-fixing step of the present embodiment is carried out through the tentative-fixing control by the welding apparatus 100 as with the second embodiment, except for the number of the tentative positions K that is less than that in the second embodiment.

Subsequently, in the joining step of the present embodiment, the laser welding is carried out by using the welding apparatus 100 to carry out the laser beam scan along the welding line 80 in a clockwise direction from the start position T indicated on the longitudinal section X1 by one round. In the present embodiment, in the joining control, the scan control is carried out to control the Galvano scanner 150 to execute the laser beam scan along the welding line 80.

Specifically, the controller 180 of the present embodiment starts the scan control through the positive longitudinal scan control. In the first positive longitudinal scan control, no laser beam is applied toward a part of the longitudinal section X1 located on the short-length section Y1 side from the start position T. Hence, in the scan control, after the positive short-length scan control, in order to irradiate the part of the longitudinal section X1 located on the short-length section Y1 side from the start position T with the laser beam, the positive longitudinal scan control to scan the section in the arrow direction XW1 with the laser beam is carried out once again. Specifically, in the scan control, the controller 180 of the present embodiment carries out the positive longitudinal scan control, the second curved-scanning control, the negative short-length scan control, the third curved-scanning control, the negative longitudinal scan control, the fourth curved-scanning control, the positive short-length scan control, the first curved-scanning control, and the positive longitudinal scan control in this order.

In the present embodiment, the controller 180 controls the sliding unit 140 to be set at the slide position A after the joining control is started until the initial time passes; and after the initial time passes, the controller 180 controls the sliding unit 140 to slidingly move to the slide position C. Through this, in the present embodiment, it is also configured to prevent the laser-passing from occurring in the vicinity of the start position T. Also in the present embodiment, the sliding movement of the sliding unit 140 is carried out without stopping the emission of the laser beam from the laser oscillator 110. Through this, in the present embodiment, it is also possible to vary the distribution profile of the power density of the irradiation pattern P in a shorter time, thus reducing the time required for the laser welding.

By starting the joining control of the present embodiment from the start position T, it is possible to reduce deformation of the sealing plate 20 more than that in the second embodiment. Specifically, in the second embodiment having the start position T in the short-length section Y1, for example, when the joined portion is formed at the start position T, the deviation between the inner wall surface 13 of the opening 11 of the case body 10 and the side surface 21 of the sealing plate 20 might become greater in the short-length section Y2. The short-length section Y2 is located at a diagonal position to the start position T, and thus the distance thereof is far from the start position T. Therefore, for example, if deformation is caused to a part of the sealing plate 20 located in the vicinity of the start position T, the deformation in the vicinity of the start position T grows to a greater deformation in the short-length section Y2 that is diagonal to the start position T.

To the contrary, in the present embodiment, since the start position T is set in the longitudinal section X1, any position on the welding line 80 has a shorter distance from the start position T than that of the second embodiment. Hence, in the present embodiment, even if deformation due to formation of the joined portion occurs in the vicinity of the start position T in the longitudinal section X1, the deformation at this start position T is prevented from causing a greater deviation between the inner wall surface 13 of the opening 11 of the case body 10 and the side surface 21 of the sealing plate 20 on the welding line 80. Accordingly, the present embodiment is capable of more properly forming the joined portion on the welding line 80 than the second embodiment.

In addition, in the present embodiment, since the deviation between the case body 10 and the sealing plate 20 in the joining control is suppressed, it is possible to reduce the number of the tentative positions K in the tentative-fixing control. The tentative-fixed portions are provided for the purpose of suppressing the deviation between the case body 10 and the sealing plate 20 in the joining control; therefore, as the deviation becomes smaller, less tentative-fixed portions can be required. Hence, in the present embodiment, it is possible to complete the tentative-fixing control in a shorter time. This is because the number of the tentative positions K can be reduced.

As described above in details, in the present embodiment, the joining control and the scan control in the joining step are carried out from the start position T located in the longitudinal section X1. Hence, it is possible to further suppress generation of defects in the joining step. In addition, the number of the tentative positions K in the tentative-fixing step can be reduced. Accordingly, the tentative-fixing step can be carried out in a shorter time.

Figure 25:
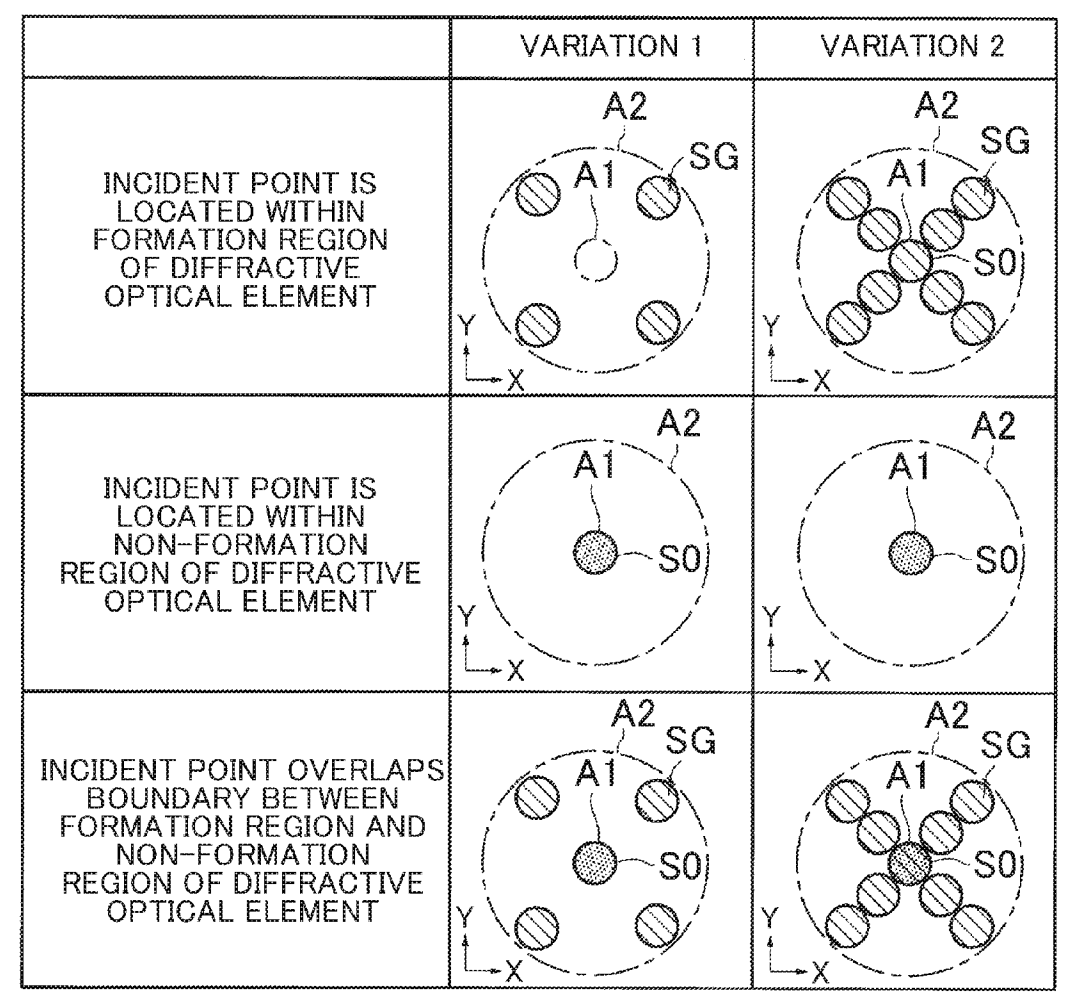

[Variations] Variations of the aforementioned embodiments will be described as follows. First, variations of the irradiation pattern will be explained. FIG. 25 shows Variations 1, 2 of the irradiation pattern. In a table for Variations 1, 2 in FIG. 25, an upper row of the table shows the respective irradiation patterns each formed when the incident point LP is located within the formation region 131 of the diffractive optical element 130. A middle row of the table shows the respective irradiation patterns each formed when the incident point LP is located within the non-formation region 132 of the diffractive optical element 130. Furthermore, a lower row of the table shows the respective irradiation patterns each formed when the incident point LP overlaps the boundary 133 between the formation region 131 and the non-formation region 132 of the diffractive optical element 130. As shown in FIG. 25, in each of Variations 1, 2, the irradiation pattern formed when the incident point LP is located within the formation region 131 of the diffractive optical element 130 is different from those in the aforementioned embodiments. On the other hand, when the incident point LP is located within the non-formation region 132 of the diffractive optical element 130, each of Variations 1, 2 has the irradiation pattern including the central spot S0 located in the central region A1, as with the aforementioned embodiments.

Specifically, the irradiation pattern as shown in the upper row of Variation 1 in FIG. 25 includes the outer edge spot group SG fewer than those of the irradiation pattern P as shown in FIG. 5. In Variation 1, the formation region 131 of the diffractive optical element 130 may be deemed to include the diffraction grating that radiates the radiated beams regarding the respective spots of the outer edge spot group SG as shown in the upper row of FIG. 25. In the irradiation pattern as shown in the lower row of Variation 1 in FIG. 25, both the outer edge spot group SG and the central spot S0 emerge. Accordingly, in Variation 1 as with the aforementioned embodiments, in the laser welding, it is possible to form irradiation patterns having various distribution profiles of the power densities by changing the position of the incident point LP on the diffractive optical element 130.

In the irradiation pattern as shown in the upper row of Variation 2 in FIG. 25, the central spot S0 is formed in addition to the outer edge spot group SG of the irradiation pattern P as shown in FIG. 5. In Variation 2, the formation region 131 of the diffractive optical element 130 may be deemed to include the diffraction grating that radiates the radiated beam regarding the spots of the outer edge spot group SG and the central spot S0 as shown in the upper row of FIG. 25. In Variation 2, as shown in FIG. 25, both the irradiation pattern in the upper row and the irradiation pattern in the lower row have the same number and the same arrangements of the respective spots. However, in Variation 2, different from the irradiation pattern in the upper row, in the irradiation pattern in the lower row, the central spot S0 has a higher power density than that of the outer edge spot group SG. Hence, also in Variation 2 as with the aforementioned embodiments, in the laser welding, it is possible to form irradiation patterns having various distribution profiles of the power densities by changing the position of the incident point LP on the diffractive optical element.

The X axis and the Y axis are added to the irradiation pattern of each Variation 1, 2 in FIG. 25 as with those in FIG. 5, FIG. 6, and FIG. 7 according to the aforementioned embodiments. The laser welding using the irradiation pattern of each Variation 1, 2 may be carried out in the same manner as the laser welding using each irradiation pattern P in FIG. 5, FIG. 6, and FIG. 7 according to the aforementioned embodiments. Through this, it is possible to carry out the laser welding through the flexible control.

Figure 26:
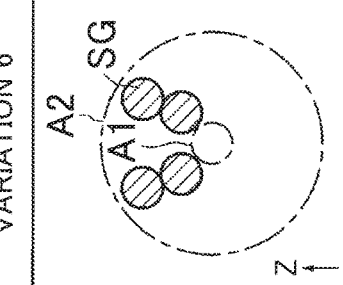
FIG. 26 is a drawing showing irradiation patterns according to Variations different from those of FIG. 25.

Next, variations of the irradiation pattern different from those in FIG. 25 will be described with reference to FIG. 26. In a table for respective Variations 3 to 6 in FIG. 26, an upper row of the table shows the respective irradiation patterns each formed when the incident point LP is located within the formation region 131 of the diffractive optical element 130. A middle row of the table shows the respective irradiation patterns each formed when the incident point LP is located within the non-formation region 132 of the diffractive optical element 130. Furthermore, a lower row of the table shows the respective irradiation patterns each formed when the incident point LP overlaps the boundary 133 between the formation region 131 and the non-formation region 132 of the diffractive optical element 130. As shown in FIG. 26, in each of Variations 3 to 6, the irradiation pattern formed when the incident point LP is located within the formation region 131 of the diffractive optical element 130 is different from those in the aforementioned embodiments. On the other hand, when the incident point LP is located within the non-formation region 132 of the diffractive optical element 130, each of Variations 3 to 6 has the irradiation pattern including the central spot S0 located in the central region A1, as with the aforementioned embodiments.

Specifically, the irradiation pattern as shown in the upper row of Variation 3 in FIG. 26 includes the outer edge spot group SG corresponding to the outer edge spots S11, S12, S41, S42 of the irradiation pattern P as shown in FIG. 5. Each irradiation pattern as shown in the upper row of Variations 4, 5 in FIG. 26 has fewer outer edge spot group SG than that in Variation 3, and has a different arrangement thereof from that in Variation 3. The irradiation pattern as shown in the upper row of Variation 6 in FIG. 26 has the same number of the outer edge spot group SG as that in Variation 3, but has a different arrangement thereof from that in Variation 3.

In the irradiation pattern as shown in the lower row of each of Variations 3 to 6 in FIG. 26, both the outer edge spot group SG as shown in the upper row and the central spot S0 as shown in the middle row emerge. Hence, in each of Variations 3 to 6, as with the aforementioned embodiments, in the laser welding, it is also possible to form the various irradiation patterns having different distribution profiles of the power densities by changing the position of the incident point LP on the diffractive optical element 130. This means that it is possible to carry out the laser welding through the flexible control. In each of Variations 3 to 6, the formation region 131 of the diffractive optical element 130 may be deemed to include the diffraction grating that radiates the radiated beam regarding each spot of the outer edge spot group SG as shown in the upper row of FIG. 26.

In the case of carrying out the scan control in the laser welding using the irradiation pattern of each of Variation 3 to 6, in FIG. 26, a direction indicated by an arrow Z added to each irradiation pattern may be set to be the scan direction. For example, if the scan control is carried out in the laser welding using the irradiation pattern of Variation 4, the scan control may be carried out in the manner as shown in FIG. 27.

Figure 27:
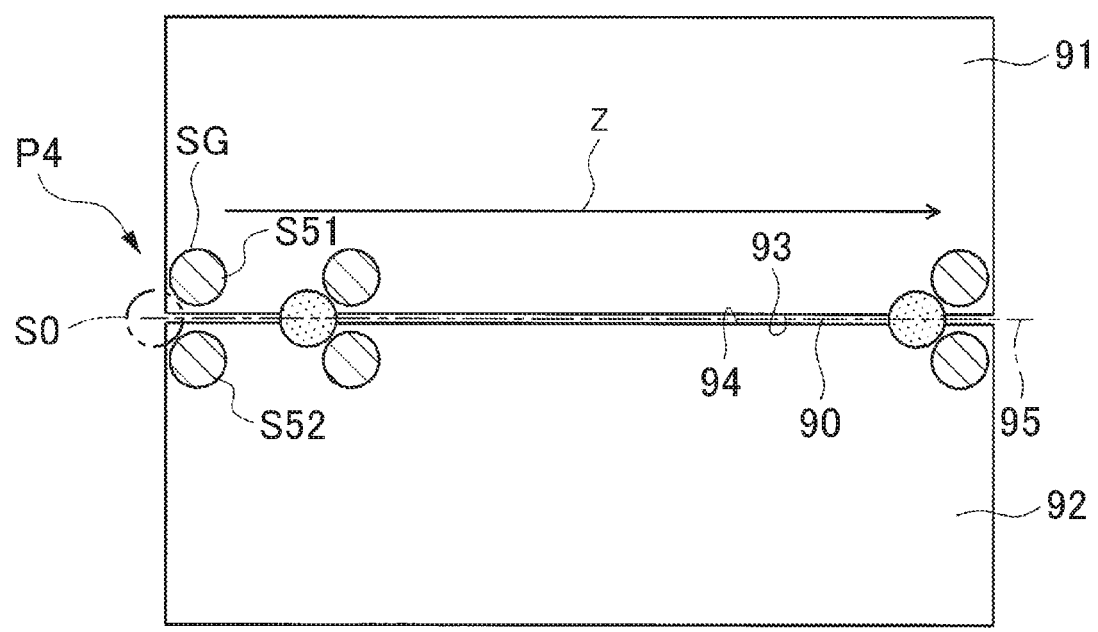
FIG. 27 is a drawing explaining how the laser welding is carried out with the irradiation patterns according to Variations of FIG. 26.

FIG. 27 shows that a welding line 95 of a facing position 90 at which to-be-joined surfaces 93, 94 of two joint target members 91, 92 face each other is a straight line section. FIG. 27 shows an irradiation pattern P4 regarding Variation 4. The irradiation pattern P4 is configured by the central spot S0, and the outer edge spot group SG formed by a first outer edge spot S51 and a second outer edge spot S52 that respectively form apexes of a triangle together with the central spot S0.

In FIG. 27, the left end is a start position of the joining control and the scan control, and as indicated by the arrow Z, the scan direction of the laser beam scan is a rightward direction. Hence, as shown in FIG. 27, in the scan control using the irradiation pattern P4, the intermediate part between the first outer edge spot S51 and the second outer edge spot S52, and the central spot S0 are brought to pass through the welding point on the welding line 95 in the order of the intermediate part between the first outer edge spot S51 and the second outer edge spot S52, and the central spot S0.

Through this, in the scan control using the irradiation pattern P4, the first outer edge spot S51 and the second outer edge spot S52 are formed frontward of the central spot S0 in the scan direction as indicated by the arrow Z. In addition, the first outer edge spot S51 is formed on the joint target member 91 frontward of the central spot S0, and the second outer edge spot S52 is formed on the joint target member 92 frontward of the central spot S0, respectively.

In FIG. 27, after the joining control is started, and until the initial time when the gap frontward of the central spot S0 is charged with the welding portion formed by the first outer edge spot S51 and the second outer edge spot S52 passes, the incident point LP may be set to be located within the formation region 131. After the initial time passes, the position of the incident point LP may be changed while the laser beam is radiated so as to set the incident point LP at a position overlapping the boundary 133 between the formation region 131 and the non-formation region 132. The scan control may be started while the position of the incident point LP is further changed. Through this, it is possible to prevent occurrence of the laser-passing so as to suppress generation of defects, and join the two joint target members 91, 92 together along the welding line 95 in a shorter time.

Figure 28:
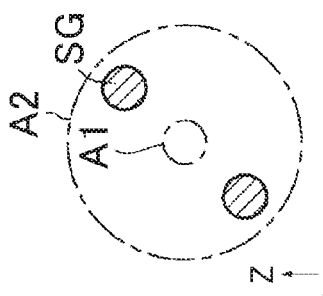
FIG. 28 is a drawing showing irradiation patterns according to Variations different from those of FIG. 25 and FIG. 26.

Hereinafter, variations of the irradiation pattern different from those in FIG. 25 and FIG. 26 will be described with reference to FIG. 28. In a table for respective Variations 7 to 9 in FIG. 28, an upper row of the table shows the respective irradiation patterns of Variations 7 to 9 each formed when the incident point LP is located within the formation region 131 of the diffractive optical element 130. A middle row of the table shows the respective irradiation patterns each formed when the incident point LP is located within the non-formation region 132 of the diffractive optical element 130. Furthermore, a lower row of the table shows the respective irradiation patterns each formed when the incident point LP overlaps the boundary 133 between the formation region 131 and the non-formation region 132 of the diffractive optical element 130. As shown in FIG. 28, in each of Variations 7 and 9, the irradiation pattern formed when the incident point LP is located within the formation region 131 of the diffractive optical element 130 is different from those in the aforementioned embodiments and Variations 1 to 6. In Variation 8, the area and the arrangement of the outer edge spot group SG in the irradiation pattern are the same as those of Variation 3. However, as shown in FIG. 28, in the Variation 8, the direction of the arrow Z that is the scan direction is different from that of Variation 3. In each of Variations 7 to 9, the irradiation pattern includes the central spot S0 located within the central region A1, as with the aforementioned embodiments if the incident point LP is located within the non-formation region 132 of the diffractive optical element 130.

Specifically, the irradiation pattern as shown in the upper row of Variation 7 in FIG. 28 includes the outer edge spot group SG corresponding to the outer edge spots S11, S12, S31, S32 of the irradiation pattern P as shown in FIG. 5. The irradiation pattern as shown in the upper row of Variation 8 in FIG. 28 includes the outer edge spot group SG corresponding to the outer edge spots S11, S12, S21, S22 of the irradiation pattern P as shown in FIG. 5. In the irradiation pattern as shown in the upper row of the Variation 9 in FIG. 28, the number of the outer edge spot group SG is fewer than that of Variation 7, and the arrangement thereof is different from that of Variation 7.

In Variation 8, only the rotational position is different from that of Variation 3, and the area and the arrangement of the outer edge spot group SG are the same as those of Variation 3. Hence, with respect to each irradiation pattern of Variation 3 and Variation 8, the distribution profile of the power density becomes the same between Variation 3 and Variation 8 if the ratio of the power density of the central spot S0 and the ratio of the power density of the outer edge spot group SG become the same between Variation 3 and Variation 8.

In each of Variations 7 to 9, in the irradiation pattern as shown in the lower row in FIG. 28, both the outer edge spot group SG as shown in the upper row and the central spot S0 as shown in the middle row emerge. Hence, in each of Variations 7 to 9, as with the aforementioned embodiments, in the laser welding, it is possible to form various irradiation patterns having different distribution profiles of the power densities by changing the position of the incident point LP on the diffractive optical element 130. This means that it is possible to carry out the laser welding through the flexible control. In each of Variations 7 to 9, the formation region 131 of the diffractive optical element 130 may be deemed to include the diffraction grating that radiates the radiated beam regarding each spot of the outer edge spot group SG as shown in the upper row in FIG. 28.

In the case of carrying out the scan control in the laser welding using the irradiation pattern of each Variation 7 to 9, in FIG. 28, the direction as indicated by the arrow Z added to each irradiation pattern may be used as the scan direction. For example, if the scan control is carried out in the laser welding using the irradiation pattern of Variation 9, the scan control may be carried out in a manner as shown in FIG. 29.

Figure 29:
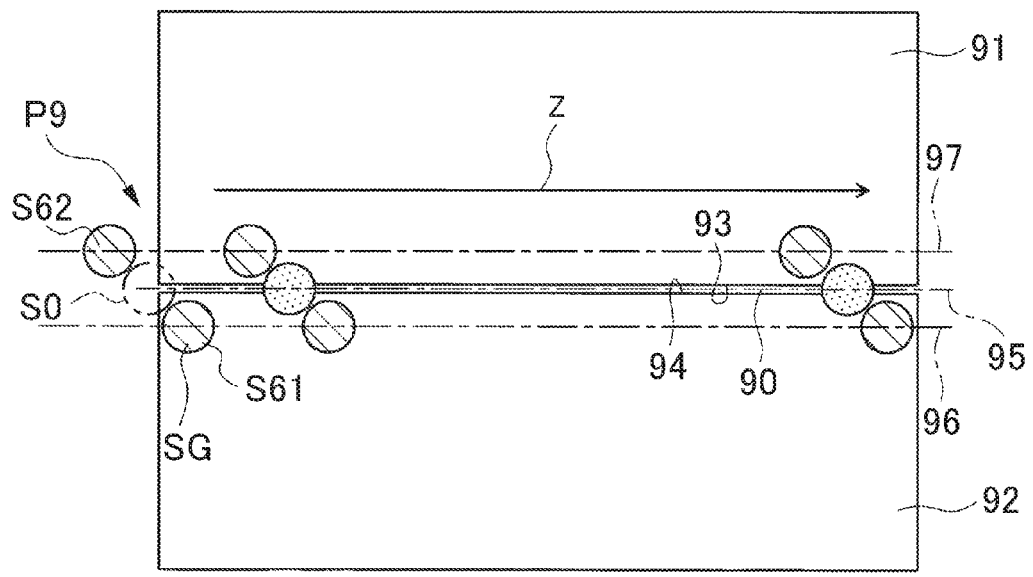
FIG. 29 is a drawing explaining how the laser welding is carried out with the irradiation patterns according to Variations of FIG. 28.

FIG. 29 shows that the welding line 95 of the facing position 90 at which the to-be-joined surfaces 93, 94 of the two joint target members 91, 92 face each other is in a straight section. FIG. 29 shows an irradiation pattern P9 regarding Variation 9. The irradiation pattern P9 is configured by the central spot S0, and the outer edge spot group SG formed by a first outer edge spot S61 and a second outer edge spot S62 located at different positions.

In FIG. 29, the left end is the start position of the joining control and the scan control, and the scan direction of the laser beam is a rightward direction as indicated by the arrow Z. As shown in FIG. 29, in the scan control using the irradiation pattern P9, the central spot S0 may be moved along the welding line 95. Furthermore, in the scan control, the first outer edge spot S61 may be moved frontward of the central spot S0 along a first track 96 provided parallel with the welding line 95. In addition, in the scan control, the second outer edge spot S62 may be moved rearward of the central spot S0 along a second track 97 provided parallel with the welding line 95.

Through this, in the scan control using the irradiation pattern P9, the first outer edge spot S61 is formed frontward of the central spot S0 in the scan direction as indicated by the arrow Z. In addition, the second outer edge spot 62 is formed rearward of the central spot S0 in the scan direction as indicated by the arrow Z. Furthermore, the first outer edge spot S61 is formed on the joint target member 92 frontward of the central spot S0, and the second outer edge spot S62 is formed on the joint target member 91 rearward of the central spot S0, respectively.

In FIG. 29, at the start time of the joining control, the incident point LP may be set to be located within the formation region 131 of the diffractive optical element 130 until the initial time when the gap located frontward of the central spot S0 is charged with the molten portion formed by the first outer edge spot S61 passes. After the initial time passes, the position of the incident point LP may be changed while the laser beam is radiated so as to set the incident point LP at a position overlapping the boundary 133 between the formation region 131 and the non-formation region 132. The scan control may be started while the position of the incident point LP is further changed. Through this, it is possible to prevent occurrence of the laser-passing so as to suppress generation of defects, and join the two joint target members 91, 92 together along the welding line 95 in a shorter time.

In the scan control of FIG. 29 using the irradiation pattern P9, it is also possible to suppress rapid temperature reduction of the molten portion formed after the central spot S0 passes by using the second outer edge spots S62. Through this, it is possible to carry out the laser welding while suppressing generation of cracks and the like.

If the laser welding is carried out on the welding line 80 in a rectangular shape of the battery 1 by using the irradiation pattern of each Variation 3 to 9, different from the aforementioned embodiments, it may be configured to carry out the scan control while varying the rotational position between the battery 1 and the irradiation pattern P. Specifically, if the laser welding is carried out by using the irradiation pattern of each Variation 3 to 9, the laser beam scan may be carried out while the irradiation pattern is rotated so as to direct the direction of the arrow Z along the welding line 80. Hence, the diffractive optical element 130 may be rotated relative to the battery 1, for example. Alternatively, the battery 1 may be rotated relative to the diffractive optical element 130, for example.

Subsequently, variations of the diffractive optical element will be described. In the aforementioned embodiments, there have been explained examples using the diffractive optical element 130 configured by the formation region 131 that includes the diffraction grating at the center thereof and the non-formation region 132 that includes no diffraction grating therein and outwardly surrounds the formation region 131. However, for example, as shown in FIG. 30, there may be used a diffractive optical element 230 including a first formation region 231 and a second formation region 232 each of which includes the diffraction grating.

If the irradiation pattern P in each of FIG. 5, FIG. 6, FIG. 7 is formed by using the diffractive optical element 230, the diffraction grating that radiates the radiated beam regarding the outer edge spot group SG of FIG. 5 from the incident point LP of the incident beam Li may be formed in the first formation region 231. In addition, the diffraction grating that radiates the radiated beam regarding the central spot S0 of FIG. 7 from the incident point LP of the incident beam Li may be formed in the second formation region 232.

Figure 30:
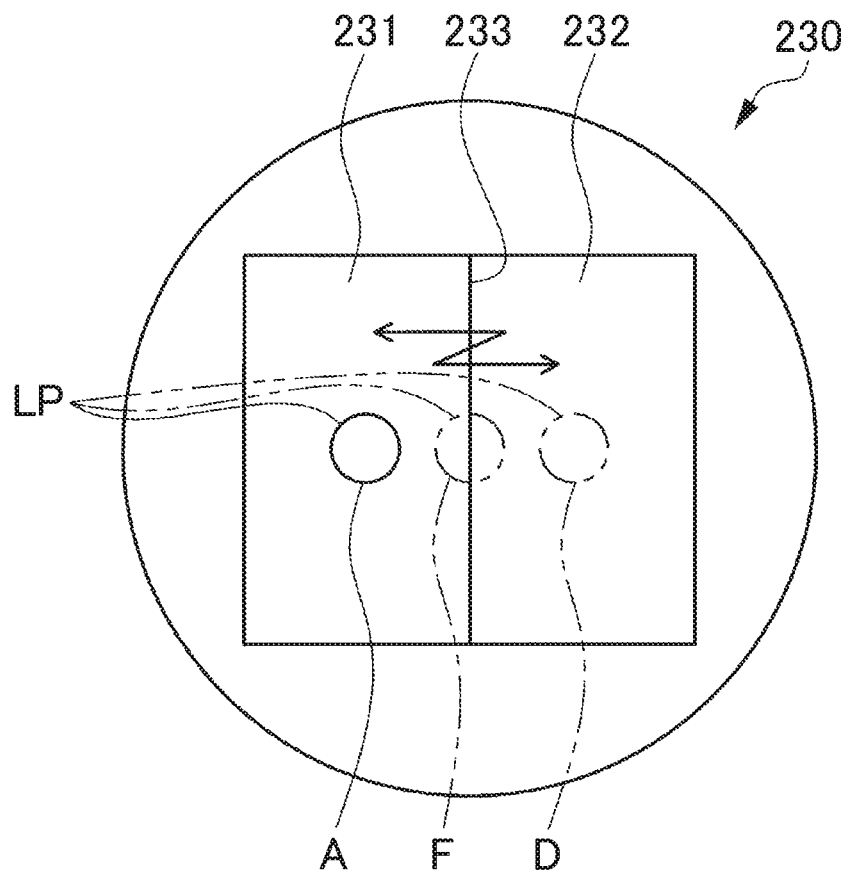
FIG. 30 is a drawing explaining Variations of the diffractive optical element.

The sliding unit is set at the slide position A as shown in FIG. 30 so as to locate the incident point LP within the first formation region 231 of the diffractive optical element 230, thereby forming the irradiation pattern P as shown in FIG. 5. The sliding unit is set at the slide position D as shown in FIG. 30 so as to locate the incident point LP within the second formation region 232 of the diffractive optical element 230, thereby forming the irradiation pattern P as shown in FIG. 7. Furthermore, the sliding unit is set at the slide position F as shown in FIG. 30 so as to locate the incident point LP at a position overlapping a boundary 233 between the first formation region 231 and the second formation region 232 of the diffractive optical element 230, thereby forming the irradiation pattern P as shown in FIG. 6.

In the case of using the diffractive optical element 230 instead of using the diffractive optical element 130, it is also possible to vary the irradiation pattern P to have several different distribution profiles of the power densities, as with the case of using the diffractive optical element 130.

The present embodiment is merely used as an example of the present invention, and is not intended to limit the present invention at all. Accordingly, the present invention can naturally be modified and changed variously within the scope of the present invention. For example, in a spot welding that forms a spotted welded portion on a joined point of a facing portion at which to-be-joined surfaces of two joint target members face each other, it is unnecessary to carry out the laser beam scan. Specifically, for example, the irradiation of the welding point with the laser beam in the joining control may be started after the sliding unit 140 is set at the slide position A; and after the initial time passes, the sliding unit 140 may be controlled to slidingly move from the slide position A to the slide position C. At this time, the welding point may be set within the central region A1 in the irradiation pattern P. Through this, after the joining control is started until the initial time passes, it is possible to suppress the laser-passing through gaps by using the outer edge spot group SG, thus suppressing generation of defects. After the initial time passes and the gap is charged, it is possible to form the spotted joined portion having a sufficient depth at each welding point by using the central spot S0 in a shorter time.

For example, the laser beam scan along the welding line can also be carried out by moving the joint target members relative to the laser beam. In addition, the laser beam scan on the welding line can be carried out by relatively moving both the welded target members and the laser beam.

For example, in the aforementioned embodiments, the position of the incident point of the incident beam on the diffractive optical element is changed by the slide movement of the sliding unit 140. However, the position of the incident point of the incident beam on the diffractive optical element may be changed by using another configurations different from the configuration of using the sliding unit 140. For example, a rotating member to rotate the diffractive optical element around the rotational axis provided parallel with the optical axis of the incident beam may be used at a position different from the optical axis of the incident beam. Hence, the position of the incident point of the incident beam on the diffractive optical element can also be changed by rotation of the rotating member. Alternatively, the position of the incident point of the incident beam on the diffractive optical element may be changed by moving the incident beam relative to the diffractive optical element. In this case, it may be considered to move an optical fiber located upstream of the diffractive optical element in the optical path of the laser beam. It may also be configured to provide a reflecting mirror at an upstream position of the diffractive optical element in the optical path of the laser beam so as to change an angle of the diffractive optical element relative to the optical path of the laser beam, thereby changing the position of the incident point of the incident beam on the diffractive optical element. The position of the incident point of the incident beam on the diffractive optical element may also be changed by relatively moving both the diffractive optical element and the optical path of the laser beam. However, as with the aforementioned embodiments, the welding apparatus can be configured in a simple structure by using the sliding unit to slidingly move the diffractive optical element.

For example, in the aforementioned embodiments, it has been described that the position of the incident point of the incident beam on the diffractive optical element is selectively changed between the position within the formation region 131 and the position overlapping the boundary 133. However, for example, the position of the incident point of the incident beam on the diffractive optical element may be changed within a range in which the position overlaps the boundary 133. In such a case, by changing the position of the incident point of the incident beam on the diffractive optical element, it is possible to vary the distribution profile of the power density in the irradiation pattern.

Of the aforementioned embodiments, only the third embodiment describes the example of changing the laser output value of the laser oscillator. Naturally, however, in the other embodiments than the third embodiment, the laser output value of the laser oscillator may be changed as long as the distribution profile of the power density can be improved, or the like.

In each of the aforementioned embodiments, there has been explained in details the case of using the transmission-type diffractive optical element in which the diffraction grating that radiates the transmitted laser beam is formed. However, the present invention is not limited to such a transmission-type diffractive optical element, and is also applicable to the case of using a reflecting-type diffractive optical element in which the diffraction grating that radiates the reflected laser beam is formed.

In each of the aforementioned embodiments, there has been explained the case of using the spots of the irradiation pattern, each having a circular shape. However, the irradiation pattern may be configured by spots, each having any other shape than a circular shape, such as a polygonal shape like a triangle and an oval shape.

In each of the aforementioned embodiments, there has been specifically explained the case of using the case body and the sealing plate both of which are made of aluminum, as the joint target members. However, the material is not limited to aluminum, and the present invention is applicable to a combination of any other materials as long as the materials can be joined together by laser welding. Naturally, the present invention is also applicable to laser welding for joint target members other than a battery.

What is claimed is:

1. A laser welding apparatus that irradiates a welding point with a laser beam so as to form a joined portion where joint target members are joined together at an irradiation position with the laser beam, the laser welding apparatus comprising:
an emitter that emits the laser beam, the laser beam emitted from the emitter being defined as an incident beam;

a diffractive optical element that radiates a radiated beam toward the irradiation position from an incident point of the incident beam;

an incident-point changing unit that changes a position of the incident point; and a controller that controls the emitter and the incident-point changing unit, wherein the diffractive optical element includes a first region and a second region that are adjacently disposed, the first region is a region in which a diffraction grating is formed, the diffraction grating radiating the radiated beam having a first distribution profile of a power density that is different from a distribution profile of a power density of the incident beam, the second region is a region that has a surface profile different from a surface profile of the first region, and radiates the radiated beam having a second distribution profile of a power density that is different from the first distribution profile of the power density, and the controller carries out a joining control to control the incident-point changing unit to move at least one point in the incident point across a boundary between the first region and the second region during the emission of the laser beam from the emitter, wherein the second region is a region in which no diffraction grating is formed.

2. The laser welding apparatus according to claim 1, wherein the first region is a region that radiates the radiated beam including parts having a maximum power density in the first distribution profile of the power density within an outer edge region different from a central region that is a part having a maximum power density in the second distribution profile of the power density.

3. The laser welding apparatus according to claim 2, wherein in the joining control, the controller controls the welding point at the irradiation position to be located within the central region, controls the incident-point changing unit to set the position of the incident point to be closer to the second region than the position of the incident point before a predetermined initial time passes is after the initial time passes from a start of emission of the laser beam from the emitter, and controls the irradiation position not to move relative to the joint target members during the emission of the laser beam from the emitter.

4. The laser welding apparatus according to claim 2, further comprising a moving unit that moves at least one of the irradiation position and the joint target members relative to the other thereof, wherein in the joining control, the controller carries out a scan control to control the moving unit to move the irradiation position such that a welding line formed by plural continuous welding points extends through the central region.

5. The laser welding apparatus according to claim 4, wherein in the joining control, the controller controls the incident-point changing unit to set the position of the incident point to be closer to the second region than the position of the incident point before a predetermined initial time passes is after the initial time passes from a start of emission of the laser beam from the emitter.

6. The laser welding apparatus according to claim 4, wherein the second region is a region where a central spot is formed in the central region by the radiated beam, the first region is a region where a first outer edge spot and a second outer edge spot are formed by the radiated beam in the outer edge region, the first outer edge spot and the second outer edge spot respectively forming apexes of a triangle together with the central spot, and in the scan control, the controller controls such that an intermediate part between the first outer edge spot and the second outer edge spot, and the central spot are brought to pass through the welding point on the welding line in the order of the intermediate part between the first outer edge spot and the second outer edge spot, and the central spot.

7. The laser welding apparatus according to claim 4, wherein the second region is a region where a central spot is formed in the central region by the radiated beam, the first region is a region where four outer edge spots that respectively form apexes of a rectangle surrounding the central spot are formed in the outer edge region by the radiated beam, and in the scan control, the controller controls such that an intermediate part between a first outer edge spot and a second outer edge spot that are adjacently arranged among the outer edge spots, the central spot, and an intermediate part between a third outer edge spot and a fourth outer edge spot that are the outer edge spots other than the first outer edge spot and the second outer edge spot are respectively brought to pass through the welding point on the welding line in the order of the intermediate part between the first outer edge spot and the second outer edge spot that are adjacently arranged among the outer edge spots, the central spot, and the intermediate part between the third outer edge spot and the fourth outer edge spot that are the outer edge spots other than the first outer edge spot and the second outer edge spot.

8. The laser welding apparatus according to claim 4, wherein the second region is a region where a central spot is formed in the central region by the radiated beam, the first region is a region where a first outer edge spot and a second outer edge spot located at a different position from that of the first outer edge spot are formed in the outer edge region by the radiated beam, and in the scan control, the controller controls the central spot to move along the welding line, controls the first outer edge spot to move frontward of the central spot along a first outer edge track that is a track parallel with the welding line, and controls the second outer edge spot to move rearward of the central spot along a second outer edge track that is a track parallel with the welding line.

9. The laser welding apparatus according to claim 4, wherein before the joining control is carried out, the controller carries out a tentative-fixing control to irradiate a part of each tentative position on the welding line with the laser beam so as to form a tentative-fixed portion at the tentative position, and in the tentative-fixing control, the controller controls the incident-point changing unit to set the position of the incident point to be within the first region.

10. The laser welding apparatus according to claim 4 further comprising a gap-outputting unit that detects a gap at the welding point on the welding line formed by bringing the joint target members to face each other and outputs the detection of the gap, wherein in the joining control, when the gap at the welding point detected by the gap-outputting unit is equal to a predetermined gap threshold value or more, the controller carries out a laser control to control the incident-point changing unit to set the position of the incident point to be closer to the first region than the position of the incident point is when the outputted gap is less than the gap threshold value.

11. The laser welding apparatus according to claim 4, wherein when the welding line is in a rectangular shape as a whole, the controller starts the scan control from a start position, the start position being the welding point located in a longer side of the welding line, and after the start, the controller carries out the scan control along the welding line by one round to the start position.

12. The laser welding apparatus according to claim 1, wherein the emitter adjusts a laser output value that is an output value of the emitted laser beam during the emission of the laser beam.

13. A laser welding apparatus that irradiates a welding point with a laser beam so as to form a joined portion where joint target members are joined together at an irradiation position with the laser beam, the laser welding apparatus comprising:

an emitter that emits the laser beam, the laser beam emitted from the emitter being defined as an incident beam;

a diffractive optical element that radiates a radiated beam toward the irradiation position from an incident point of the incident beam;

an incident-point changing unit that changes a position of the incident point; and a controller that controls the emitter and the incident-point changing unit, wherein the diffractive optical element includes a first region and a second region that are adjacently disposed, the first region is a region in which a diffraction grating is formed, the diffraction grating radiating the radiated beam having a first distribution profile of a power density that is different from a distribution profile of a power density of the incident beam, the second region is a region that has a surface profile different from a surface profile of the first region, and radiates the radiated beam having a second distribution profile of a power density that is different from the first distribution profile of the power density, and the controller carries out a joining control to control the incident-point changing unit to move at least one point in the incident point across a boundary between the first region and the second region during the emission of the laser beam from the emitter, wherein the first region is a region that radiates the radiated beam including parts having a maximum power density in the first distribution profile of the power density within an outer edge region different from a central region that is a part having a maximum power density in the second distribution profile of the power density.

14. The laser welding apparatus according to claim 13, wherein in the joining control, the controller controls the welding point at the irradiation position to be located within the central region, controls the incident-point changing unit to set the position of the incident point to be closer to the second region than the position of the incident point before a predetermined initial time passes is after the initial time passes from a start of emission of the laser beam from the emitter, and controls the irradiation position not to move relative to the joint target members during the emission of the laser beam from the emitter.

15. The laser welding apparatus according to claim 13, further comprising a moving unit that moves at least one of the irradiation position and the joint target members relative to the other thereof, wherein in the joining control, the controller carries out a scan control to control the moving unit to move the irradiation position such that a welding line formed by plural continuous welding points extends through the central region.

16. The laser welding apparatus according to claim 15, wherein in the joining control, the controller controls the incident-point changing unit to set the position of the incident point to be closer to the second region than the position of the incident point before a predetermined initial time passes is after the initial time passes from a start of emission of the laser beam from the emitter.

17. The laser welding apparatus according to claim 15, wherein the second region is a region where a central spot is formed in the central region by the radiated beam, the first region is a region where a first outer edge spot and a second outer edge spot are formed by the radiated beam in the outer edge region, the first outer edge spot and the second outer edge spot respectively forming apexes of a triangle together with the central spot, and in the scan control, the controller controls such that an intermediate part between the first outer edge spot and the second outer edge spot, and the central spot are brought to pass through the welding point on the welding line in the order of the intermediate part between the first outer edge spot and the second outer edge spot, and the central spot.

18. The laser welding apparatus according to claim 15, wherein the second region is a region where a central spot is formed in the central region by the radiated beam, the first region is a region where four outer edge spots that respectively form apexes of a rectangle surrounding the central spot are formed in the outer edge region by the radiated beam, and in the scan control, the controller controls such that an intermediate part between a first outer edge spot and a second outer edge spot that are adjacently arranged among the outer edge spots, the central spot, and an intermediate part between a third outer edge spot and a fourth outer edge spot that are the outer edge spots other than the first outer edge spot and the second outer edge spot are respectively brought to pass through the welding point on the welding line in the order of the intermediate part between the first outer edge spot and the second outer edge spot that are adjacently arranged among the outer edge spots, the central spot, and the intermediate part between the third outer edge spot and the fourth outer edge spot that are the outer edge spots other than the first outer edge spot and the second outer edge spot.

19. The laser welding apparatus according to claim 15, wherein
   the second region is a region where a central spot is formed in the central region by the radiated beam,
   the first region is a region where a first outer edge spot and a second outer edge spot located at a different position from that of the first outer edge spot are formed in the outer edge region by the radiated beam, and
   in the scan control, the controller controls the central spot to move along the welding line, controls the first outer edge spot to move frontward of the central spot along a first outer edge track that is a track parallel with the welding line, and controls the second outer edge spot to move rearward of the central spot along a second outer edge track that is a track parallel with the welding line.

20. The laser welding apparatus according to claim 15, wherein
   before the joining control is carried out, the controller carries out a tentative-fixing control to irradiate a part of each tentative position on the welding line with the laser beam so as to form a tentative-fixed portion at the tentative position, and
   in the tentative-fixing control, the controller controls the incident-point changing unit to set the position of the incident point to be within the first region.

21. The laser welding apparatus according to claim 15, further comprising
   a gap-outputting unit that detects a gap at the welding point on the welding line formed by bringing the joint target members to face each other and outputs the detection of the gap, wherein
   in the joining control, when the gap at the welding point detected by the gap-outputting unit is equal to a predetermined gap threshold value or more, the controller carries out a laser control to control the incident-point changing unit to set the position of the incident point to be closer to the first region than the position of the incident point is when the outputted gap is less than the gap threshold value.

22. The laser welding apparatus according to claim 15, wherein
   when the welding line is in a rectangular shape as a whole, the controller starts the scan control from a start position, the start position being the welding point located in a longer side of the welding line, and after the start, the controller carries out the scan control along the welding line by one round to the start position.

23. The laser welding apparatus according to claim 13, wherein
   the emitter adjusts a laser output value that is an output value of the emitted laser beam during the emission of the laser beam.

* * * * *